(12) United States Patent
Tomidokoro et al.

(10) Patent No.: US 7,113,296 B1
(45) Date of Patent: Sep. 26, 2006

(54) IMAGE FORMING DEVICE MANAGEMENT SYSTEM

(75) Inventors: Nobuaki Tomidokoro, Kanagawa (JP); Tetsuo Asakawa, Tokyo (JP); Shohzoh Miyawaki, Saitama (JP); Hiroshi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/195,604

(22) Filed: Nov. 19, 1998

(30) Foreign Application Priority Data

| Nov. 25, 1997 | (JP) | ................................. | 9-322840 |
| Nov. 28, 1997 | (JP) | ................................. | 9-328789 |
| Nov. 28, 1997 | (JP) | ................................. | 9-328837 |
| Nov. 28, 1997 | (JP) | ................................. | 9-328842 |
| Nov. 28, 1997 | (JP) | ................................. | 9-328843 |
| Mar. 16, 1998 | (JP) | ............................... | 10-065787 |
| Sep. 4, 1998  | (JP) | ............................... | 10-251670 |

(51) Int. Cl.
*G06F 15/00* (2006.01)

(52) U.S. Cl. .................... 358/1.15; 358/1.14; 358/405; 358/437; 399/8

(58) Field of Classification Search ............... 358/1.15, 358/1.14, 400, 401, 405, 404, 434, 435, 436, 358/437, 438, 439, 442, 444, 468; 399/8, 399/9, 10, 11
See application file for complete search history.

(56) References Cited

U.S. PATENT DOCUMENTS

| 5,084,875 | A | * | 1/1992 | Weinberger et al. ........... 714/46 |
| 5,237,427 | A | * | 8/1993 | Mizutori ..................... 358/406 |
| 5,373,349 | A | * | 12/1994 | Ito ................................ 399/8 |
| 5,444,517 | A |   | 8/1995 | Nagashima |
| 5,459,552 | A |   | 10/1995 | Ohira |
| 5,485,246 | A |   | 1/1996 | Hayashi et al. |
| 5,510,876 | A |   | 4/1996 | Hayashi et al. |
| 5,546,164 | A |   | 8/1996 | Hayashi et al. |
| 5,583,615 | A | * | 12/1996 | Hashimoto et al. ............. 399/8 |
| 5,689,416 | A | * | 11/1997 | Shimizu et al. ............... 700/80 |
| 5,694,201 | A |   | 12/1997 | Hayashi et al. |
| 5,739,921 | A | * | 4/1998 | Kitajima ..................... 358/442 |
| 5,812,900 | A |   | 9/1998 | Hashimoto et al. |
| 5,815,652 | A | * | 9/1998 | Ote et al. ..................... 714/31 |
| 5,893,005 | A | * | 4/1999 | Ogura ........................ 399/11 |
| 5,949,553 | A | * | 9/1999 | Iimori ........................ 358/444 |
| 6,009,538 | A | * | 12/1999 | Goodwin, III et al. ....... 714/25 |
| 6,459,504 | B1 | * | 10/2002 | Murano et al. ............. 358/406 |

FOREIGN PATENT DOCUMENTS

| EP | 0 768 582 | | 4/1997 |
| EP | 0768582 A1 | * | 4/1997 |
| JP | 61-219254 | | 9/1986 |
| JP | 2-34864 | | 2/1990 |
| JP | 5-145600 | | 6/1993 |

(Continued)

*Primary Examiner*—Joseph R. Pokrzywa
(74) *Attorney, Agent, or Firm*—Oblon, Spivak, McClelland, Maier & Neustadt, P.C.

(57) ABSTRACT

An image forming device management system includes a plurality of image forming devices, a central service station which provides a maintenance service for the image forming devices, and a communication control unit which is connected to each of the image forming devices by a signal line, the communication control unit connecting one of the image forming devices to the central service station via a communication network. In the system, each of the image forming devices includes a message unit which outputs a signal line separation message when the image forming device has no signal from the central service station or the communication control unit over a predetermined period.

15 Claims, 70 Drawing Sheets

FOREIGN PATENT DOCUMENTS

| | | |
|---|---|---|
| JP | 5-276260 | 10/1993 |
| JP | 6-152770 | 5/1994 |
| JP | 6-237330 | 8/1994 |
| JP | 6-326790 | 11/1994 |
| JP | 6-329298 | 11/1994 |
| JP | 7-203108 | 8/1995 |
| JP | 8-116399 | 5/1996 |
| JP | 8-331355 | 12/1996 |

* cited by examiner

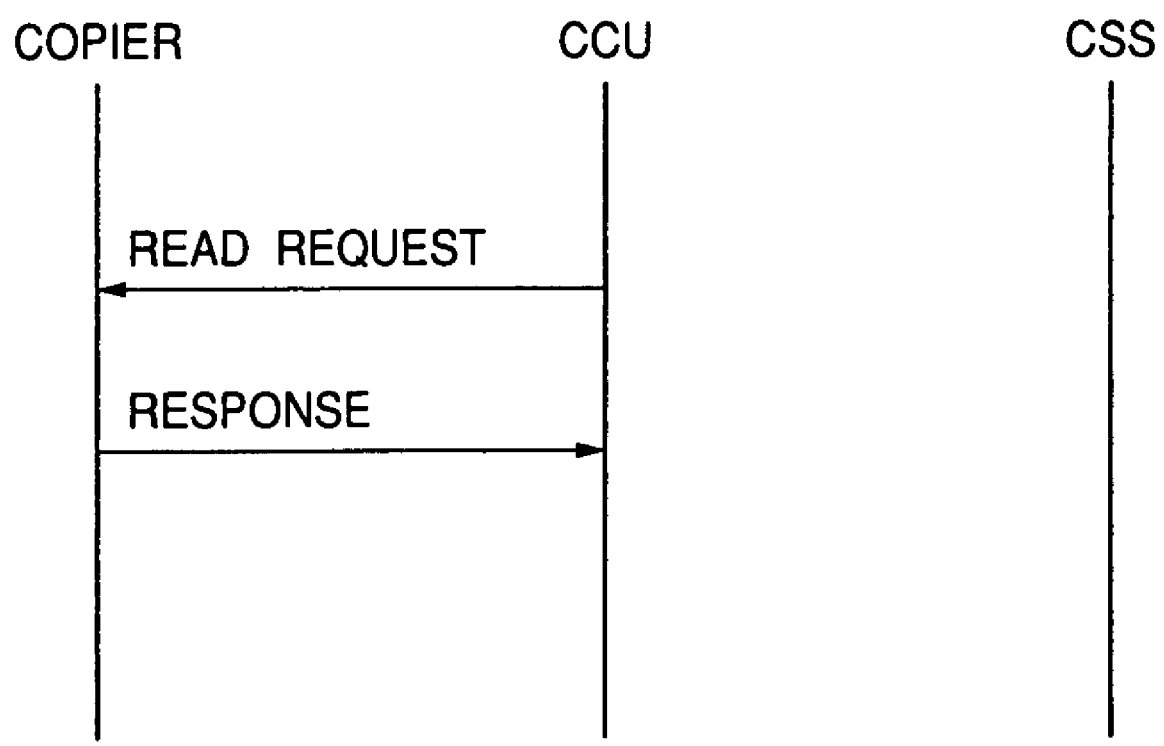

FIG.11

| | PARAMETERS | | DATA LENGTH |
|---|---|---|---|
| ADDRESS-1 COPIER | MODEL NO. | | 6 |
| | SERIAL NO. | | 10 |
| | CHECK SUM. | | 4 |
| ADDRESS-2 COPIER | MODEL NO. | | 6 |
| | SERIAL NO. | | 10 |
| | CHECK SUM. | | 4 |
| ADDRESS-3 COPIER | MODEL NO. | | 6 |
| | SERIAL NO. | | 10 |
| | CHECK SUM. | | 4 |
| ADDRESS-4 COPIER | MODEL NO. | | 6 |
| | SERIAL NO. | | 10 |
| | CHECK SUM. | | 4 |
| ADDRESS-5 COPIER | MODEL NO. | | 6 |
| | SERIAL NO. | | 10 |
| | CHECK SUM. | | 4 |
| REMOTE MESSAGE TRANSMISSION BY REMOTE MESSAGE KEY | DESTINATION TEL NO. | | 32 |
| | NO. OF REDIALS | | 2 |
| | REDIAL PERIOD | | 3 |
| | CONDITIONS OF DATA TRANSMISSION TO CSS IN REMOTE MESSAGE TRANSMISSION | NO. OF JAMS | 1 |
| | | NO. OF S/D ERRORS | 1 |
| | | NO. OF COPIES | 1 |
| | | STATE OF COPIER | 1 |
| | CHECK SUM | | 4 |
| REMOTE MESSAGE TRANSMISSION BY SELF-DIAGNOSTIC ERROR | DESTINATION TEL NO. | | 32 |
| | NO. OF REDIALS | | 2 |
| | REDIAL PERIOD | | 3 |
| | CONDITIONS OF DATA TRANSMISSION TO CSS IN REMOTE MESSAGE TRANSMISSION | NO. OF JAMS | 1 |
| | | NO. OF S/D ERRORS | 1 |
| | | NO. OF COPIES | 1 |
| | | STATE OF COPIER | 1 |
| | CHECK SUM | | 4 |
| REMOTE MESSAGE TRANSMISSION BY ADVANCE WARNING | DESTINATION TEL NO. | | 32 |
| | NO. OF REDIALS | | 2 |
| | REDIAL PERIOD | | 3 |
| | CONDITIONS OF DATA TRANSMISSION TO CSS IN REMOTE MESSAGE TRANSMISSION | NO. OF JAMS | 1 |
| | | NO. OF S/D ERRORS | 1 |
| | | NO. OF COPIES | 1 |
| | | STATE OF COPIER | 1 |
| | TIME OF NOTIFICATION | | 4 |
| | CHECK SUM | | 4 |
| TOTAL COUNTER VALUE TRANSMIT PROCESS | TIME OF TOTAL COUNTER VALUE COLLECTION | | 4 |
| | DESTINATION TEL NO. | | 32 |
| | DATE AND TIME OF TRANSMISSION | | 6 |
| | CHECK SUM | | 4 |
| SETTING OF TELEPHONE | DIAL MODE SETTING (PULSE OR TONE) | | 1 |
| | DIAL PULSE PERIOD | | 1 |
| | CHECK SUM | | 4 |

FIG. 12A

MESSAGE FROM COPIER 100 TO CCU 200

| MESSAGE CODE | NO. OF JAMS | | | | NO. OF S/D ERRORS | | | | NO. OF COPIES | | | | STATE OF COPIER | | | |
|---|---|---|---|---|---|---|---|---|---|---|---|---|---|---|---|---|
| | TOTAL | PART A | PART B | ... | TOTAL | TYPE A | TYPE B | ... | TOTAL | SIZE A | SIZE B | ... | STATE A | STATE B | STATE C | ... |

FIG. 12B

MESSAGE FROM CCU 200 TO CSS 300

| MODEL NO. | SERIAL NO. | MESSAGE CODE | NO. OF S/D ERRORS | | | | STATE OF COPIER | | | | TIME OF OCCURRENCE |
|---|---|---|---|---|---|---|---|---|---|---|---|
| | | | TOTAL | TYPE A | TYPE B | ... | STATE A | STATE B | STATE C | ... | |

FIG. 12C

RESPONSE FROM CCU 200 TO COPIER 100

| RESPONSE CODE | CONTENTS OF RESPONSE |
|---|---|
| | |

FIG.14A

READ REQUEST FROM CSS 300 TO CCU 200

| CCU DEVICE CODE | READ REQUEST CODE | ITEM CODE |
|---|---|---|

RESPONSE FROM CCU 200 TO CSS 300

| CCU DEVICE CODE | READ RESPONSE CODE | ITEM CODE | READ DATA |
|---|---|---|---|

FIG.14B

WRITE REQUEST FROM CSS 300 TO CCU 200

| CCU DEVICE CODE | WRITE REQUEST CODE | ITEM CODE | WRITE DATA |
|---|---|---|---|

RESPONSE FROM CCU 200 TO CSS 300

| CCU DEVICE CODE | WRITE RESPONSE CODE | ITEM CODE | WRITTEN DATA |
|---|---|---|---|

FIG.14C

EXECUTE REQUEST FROM CSS 300 TO CCU 200

| CCU DEVICE CODE | EXECUTE REQUEST CODE | ITEM CODE | SUBSIDIARY PARAMETER |
|---|---|---|---|

RESPONSE FROM CCU 200 TO CSS 300

| CCU DEVICE CODE | EXECUTE RESPONSE CODE | ITEM CODE | EXECUTION RESULT |
|---|---|---|---|

FIG.15A

READ REQUEST FROM CCU 200 TO COPIER 100

| READ REQUEST CODE | ITEM CODE |
|---|---|

FIG.15B

RESPONSE FROM COPIER 100 TO CCU 200

| READ RESPONSE CODE | ITEM CODE | READ DATA |
|---|---|---|

CONNECTION DETECTING LINE

FIG.61

| NAME | PARAMETER CODE | RD | WR | EXE | LOWER LIMIT | UPPER LIMIT | MEMORY ADDRESS | NO. OF BYTES |
|---|---|---|---|---|---|---|---|---|
| #1 TRAY S/F COUNTER | 11000000001 | 1 | 0 | 0 | — | — | 1000H | 4 |
| #2 TRAY S/F COUNTER | 11000000002 | 1 | 0 | 0 | — | — | 1004H | 4 |
| #3 TRAY S/F COUNTER | 11000000003 | 1 | 0 | 0 | — | — | 1008H | 4 |
| #4 TRAY S/F COUNTER | 11000000004 | 1 | 0 | 0 | — | — | 100CH | 4 |
| #5 TRAY S/F COUNTER | 11000000005 | 0 | 0 | 0 | — | — | — | — |
| · · · | · · · | · · · | · · · | · · · | · · · | · · · | · · · | · · · |
| #1 TRAY S/F TIME ADJUST | 21000000001 | 1 | 1 | 0 | −20 | +20 | 2000H | 1 |
| #2 TRAY S/F TIME ADJUST | 21000000002 | 1 | 1 | 0 | −20 | +20 | 2001H | 1 |
| #3 TRAY S/F TIME ADJUST | 21000000003 | 1 | 1 | 0 | −20 | +20 | 2002H | 1 |
| #4 TRAY S/F TIME ADJUST | 21000000004 | 1 | 1 | 0 | −20 | +20 | 2003H | 1 |
| #5 TRAY S/F TIME ADJUST | 21000000005 | 0 | 0 | 0 | — | — | — | — |
| · · · | · · · | · · · | · · · | · · · | · · · | · · · | · · · | · · · |

IMAGE FORMING DEVICE MANAGEMENT SYSTEM

BACKGROUND OF THE INVENTION (1) Field of the Invention

The present invention relates to an image forming device management system in which a plurality of image forming devices, such as copiers, facsimiles, or printers, are linked through a communication device to a central service station, and each image forming device can automatically transmit a message to the central service station while the image forming devices can be remotely controlled by the central service station.

(2) Description of the Related Art

As disclosed in Japanese Laid-Open Patent Application Nos. 8-116399, 6-329298 and 8-331355, there is known an image forming device management system in which a plurality of image forming devices are linked through a communication device to a central service station.

Japanese Laid-Open Patent Application No. 8-116399 discloses a system in which a plurality of image forming devices connected to a communication control unit via a signal line, located on a user site, are linked to a central service station at a remote location through a communication network.

In the system of the above publication, when the signal line between the image forming device and the communication control unit is in a disconnected state, the central service station is unable to communicate with the image forming device. Hence, as the central service station is unable to detect whether the image forming device is in a disconnected state, it is difficult for the central service station to speedily provide a maintenance service for the image forming device during its disconnected state.

Japanese Laid-Open Patent Application No. 6-329298 discloses an image forming device maintenance system in which, when a jam of an image forming device (or a copier) occurs, a determination as to whether the copier requires a maintenance service is made on the side of the copier based on its troubled condition. If it is determined that the maintenance service is required, the copier automatically transmits a service request to a central service station via a communication device. According to the system of the above publication, when the service request from the copier is received by the central service station, it is possible to have a serviceman speedily visit the user site and properly recover the troubled condition of the copier.

In the system of the above publication, every time the determination that the maintenance service of the copier is required is made, the service request is automatically transmitted from the copier to the central service station. For example, when a jam of the copier frequently occurs, the automatic service request transmission and receiving must be repeated many times by the system of the above publication. Hence, the system of the above publication is likely to be in a situation that the automatic service request transmission and receiving is performed too many times although it is not necessary.

Japanese Laid-Open Patent Application No. 8-331355 discloses a method of automatically transmitting a maintenance service start message and a maintenance service end message from an image forming device on a user site to a central service station at a remote location when a maintenance service of the image forming device on the user site is initiated and terminated by a serviceman.

However, it is difficult for the method of the above publication to carry out an automatic message transmission of the image forming device in an appropriate situation during the maintenance operation of the image forming device by the serviceman.

In addition to the maintenance service start/end messages, there are other messages which should be automatically transmitted to the central service station even during the maintenance service of the image forming device (or the copier). For example, when a lack of replenishment parts, such as toner, occurs, it is desirable to automatically transmit a replenishment part supply request from the copier to the central service station even during the maintenance service of the copier. Further, there are further messages which should not be automatically transmitted to the central service station during the maintenance service of the copier. For example, when a certain error of the copier occurs after the start of the maintenance service of the copier, it is undesirable to automatically transit its error message from the copier to the central service station because the serviceman has already visited the user site. Hence, there is a demand for an image forming device maintenance system which starts an automatic message transmission only in an appropriate situation when a maintenance operation of the copier is performed by a serviceman.

Further, statistical data of the copier related to its troubled condition may be changed during a maintenance service by a serviceman, and it is necessary to reset the statistical data of the copier at the end of the maintenance service. If it is not reset, the copier may erroneously transmit an error message to the central service station, because of the changed data, after the maintenance service of the copier.

Further, as disclosed in Japanese Laid-Open Patent Application No. 5-276260, there is known a facsimile management system in which a facsimile is linked to a central service station (or a communication terminal), and the central service station can write information to or read information from operating parameters retained in an internal memory of the facsimile. When accessing the internal memory of the facsimile, it is necessary to designate an absolute address of the internal memory at which an operating parameter is retained.

Similar to the facsimile management system of the above type, there is known an image forming device management system in which a plurality of image forming devices, such as copiers, connected to a communication device on a user site, such as a customer office, are linked through a public switched network to a central service station at a remote location, such as a sales or service location.

The above-described image forming device management system is intended to efficiently and speedily provide a service for the image forming devices by carrying out (1) a communication control of the central service station to the image forming devices, (2) a communication control of each of the image forming devices to the central service station, and (3) a control of the communication device by itself.

Further, there is known an image forming device management system having a block billing function. The block billing function is provided for the image forming device management system to establish a charge for a predetermined number of copy sheets as a contract for use of an image forming device.

However, it is difficult for the above-dscribed image forming device management to provide an efficient operation of the block billing function or a precise management of the image forming devices. It is difficult to provide an easy-to-use image forming device management system for the user.

For example, there are various kinds of image forming devices which are connected to an image forming device management system having a block billing function. An address of the memory of each of the image forming devices for retaining an operating parameter is different from one another if the image forming devices are of different models or of different versions.

In the image forming device management system, such as that of Japanese Laid-Open Patent Application No. 5-276260 mentioned above, it is necessary to designate an absolute address of the memory of one image forming device (at which an operating parameter is retained) when accessing the memory of the image forming device. However, if the image forming devices connected to the system are of different kinds, then it is necessary to deal with individual absolute addresses of the memory for each of different kinds of image forming devices. In this case, the management method for such image forming devices will be considerably complicated. This makes it difficult to take actions to upgrade the image forming device management system.

Further, there is known an image forming device management system in which a maintenance service start message and a maintenance service end message are transmitted from an image forming device to a central service station when a message transmit operation is manually performed by a serviceman at the start and the end of the maintenance service of the image forming device. In the above-described system, the message transmission control is carried out when a service program, stored in the image forming device, is executed.

However, if the serviceman fails to perform the message transmit operation, the central service station does not receive the maintenance service start/end messages. In such a case, the central service station does not recognize a time the maintenance service of the image forming device is initiated or terminated by the serviceman. Hence, it is likely that the above-described system cannot provide a precise management of the image forming devices.

SUMMARY OF THE INVENTION

A first object of the present invention is to provide an image forming device management system which speedily provides a maintenance message for a user of one of image forming devices when a separation of a signal line between a communication control unit and the image forming device is detected.

A second object of the present invention is to provide an image forming device management system which effectively inhibits an automatic message transmission from one of a plurality of image forming devices to a central service station when a jam of the image forming device or the like occurs.

A third object of the present invention is to provide an image forming device management system which starts an automatic message transmission only in an appropriate situation when a maintenance service of an image forming device is performed by a serviceman.

A fourth object of the present invention is to provide an image forming device management system which efficiently carries out a block billing function.

A fifth object of the present invention is to provide an image forming device management system which provides a precise management of image forming devices by performing a block billing function in a simple manner.

A sixth object of the present invention is to provide an image forming device management system which provides an easy-to-use management operation for the user.

A seventh object of the present invention is to provide an image forming device management system which provides a simple management scheme for a central service station and need not deal with individual absolute addresses of the memory for each of different kinds of image forming devices.

An eighth object of the present invention is to provide an image forming device management system which is able to manage an accurate time of a start or an end of a maintenance service of each of image forming devices.

The above-mentioned first object of the present invention is achieved by an image forming device management system which includes a plurality of image forming devices, a central service station which provides a maintenance service for the image forming devices, and a communication control unit which is connected to each of the image forming devices by a signal line, the communication control unit connecting one of the image forming devices to the central service station via a communication network, wherein each of the image forming devices includes a message unit which outputs a signal line separation message when the image forming device has no signal from the central service station or the communication control unit over a predetermined period.

According to the present invention, when the image forming device of concern does not receive a signal from the central service station or the communication control unit over the predetermined period, the image forming device outputs the signal line separation message. This allows the user of the image forming device to recognize a separation of the signal line between the image forming device and the communication control unit. Hence, it is possible for the image forming device management system of the present invention to speedily provide a maintenance message for the user of the image forming device when a separation of a signal line between the image forming device and the communication control unit occurs.

The above-mentioned second object of the present invention is achieved by an image forming device management system which includes a plurality of image forming devices, a central service station which provides a maintenance service for the image forming devices, and a communication control unit connected to each of the image forming devices, the communication control unit connecting one of the image forming devices to the central service station via a communication network, wherein each of the image forming devices includes: a jam detection unit which detects a jam of the image forming device; an image formation detection unit which detects a normal end of image formation by the image forming device; a remote message unit which transmits a first remote message through the communication control unit to the central service station, the first remote message indicating that the jam of the image forming device is continuously detected for a predetermined number of copy sheets before the normal end of image formation by the image forming device is detected; and a remote message inhibition unit which inhibits the remote message unit from transmitting a subsequent remote message after the transmission of the first remote message until the normal end of image formation by the image forming device is detected.

According to the present invention, the remote message inhibition unit inhibits the automatic message transmission until the normal end of image formation is detected. It is possible to effectively inhibits the automatic message transmission from the image forming device to the central service station when a jam of the image forming device occurs.

The above-mentioned second object of the present invention is achieved by an image forming device management system which includes a plurality of image forming devices, a central service station which provides a maintenance service for the image forming devices, and a communication control unit connected to each of the image forming devices, the communication control unit connecting one of the image forming devices to the central service station via a communication network, wherein each of the image forming devices includes: a jam detection unit which detects a jam of the image forming device; an image formation detection unit which detects a normal end of image formation by the image forming device; a remote message unit which transmits a remote message through the communication control unit to the central service station, the remote message indicating that the jam of the image forming device is continuously detected for a predetermined number of copy sheets before the normal end of image formation by the image forming device is detected; a time counter which outputs a time count indicating a period of the jam of the image forming device; and a remote message inhibition unit which inhibits the remote message unit from transmitting the remote message when the time count output by the time counter exceeds a predetermined value.

According to the present invention, the remote message inhibition unit inhibits the automatic message transmission when the time count output by the time counter exceeds a predetermined value. It is possible to effectively inhibits the automatic message transmission from the image forming device to the central service station when a jam of the image forming device occurs.

The above-mentioned third object of the present invention is achieved by an image forming device management system which includes a plurality of image forming devices, a central service station which provides a maintenance service for the image forming devices, and a communication device which connects one of the image forming devices to the central service station via a communication network, wherein each of the image forming devices includes: a remote message unit which transmits a remote message through the communication device to the central service station when a maintenance service of the image forming device is initiated or terminated by a serviceman; and a non-volatile memory which retains a content of a serviceman visit flag, the serviceman visit flag indicating whether the maintenance service of the image forming device is initiated or terminated by the serviceman.

According to the present invention, each of the image forming devices in the image forming device management system includes the non-volatile memory which retains the content of the serviceman visit flag, the serviceman visit flag indicating whether the maintenance service of the image forming device is initiated or terminated by the serviceman. By using the non-volatile memory, it is possible to start an automatic message transmission only in an appropriate situation when a maintenance service of an image forming device is performed by a serviceman.

The above-mentioned fourth object of the present invention is achieved by an image forming device management system which includes a plurality of image forming devices, a central service station which provides a maintenance service for the image forming devices, and a communication device which connects one of the image forming devices to the central service station via a communication network, wherein each of the image forming devices includes: a receiving unit which receives a non-resettable copy count and a remote message cycle, both transmitted to the image forming device by the central service station through the communication device, the copy count indicating a predetermined number of copy sheets with respect to a contract for use of the image forming device, the remote message cycle indicating a frequency at which the image forming device transmits a remote message to the central service station; a first storage unit which stores the copy count and the remote message cycle received by the receiving unit; a second storage unit which stores a current copy count that is incremented every time an image formation of one copy sheet is performed by the image forming device; a control unit which sets the image forming device in a remote message enable state when a difference between the current copy count and the received copy count reaches an integral multiple of the remote message cycle; and a remote message unit which transmits the remote message through the communication device to the central service station after the image forming device is set in the remote message enable state by the control unit.

According to the present invention, the image forming device of concern is set in the remote message enable state when the difference between the current copy count and the received copy count reaches an integral multiple of the remote message cycle. The remote message unit transmits the remote message to the central service station after the image forming device is set in the remote message enable state. It is possible for the image forming device management system of the present invention to efficiently carry out a block billing function.

The above-mentioned fifth object of the present invention is achieved by an image forming device management system which includes a plurality of image forming devices, a central service station which provides a maintenance service for the image forming devices, and a communication device which connects one of the image forming devices to the central service station via a communication network, wherein each of the image forming devices includes: a receiving unit which receives a non-resettable copy count and a remote message cycle, both transmitted to the image forming device by the central service station through the communication device, the copy count indicating a predetermined number of copy sheets with respect to a contract for use of the image forming device, the remote message cycle indicating a frequency at which the image forming device transmits a remote message to the central service station; a first storage unit which stores the copy count and the remote message cycle received by the receiving unit; a second storage unit which stores a current copy count that is incremented every time an image formation of one copy sheet is performed by the image forming device; a control unit which sets the image forming device in a remote message enable state when a difference between the current copy count and the received copy count reaches an integral multiple of the remote message cycle; and a remote message unit which transmits the remote message through the communication device to the central service station after the image forming device is set in the remote message enable state by the control unit, and wherein the remote message transmitted to the central service station by the remote message unit includes a remote message purpose and the current copy count.

It is possible for the image forming device management system of the present invention to provide a precise management of the image forming devices by performing a block billing function in a simple manner.

The above-mentioned sixth object of the present invention is achieved by an image forming device management system which includes a plurality of image forming devices, each of the image forming devices having operating parameters stored in a memory of the image forming device, and absolute addresses of the memory where the respective operating parameters are stored being predetermined according to a kind of each operating parameter, a central service station which reads information from or writes information to the operating parameters of one of the image forming devices by transmitting an access request to said one of the image forming devices, and a communication device which connects one of the image forming devices to the central service station via a communication network, wherein the central service station includes: a parameter code transmitting unit which transmits a parameter code, indicating a kind of a particular one of the operating parameters, through the communication device to one of the image forming devices when transmitting an access request to said one of the image forming devices, and wherein each of the image forming devices includes: an address determination unit responsive to the access request which determines a particular absolute address of the memory of the image forming device in accordance with the parameter code transmitted by the code transmitting unit; and an access request processing unit which accesses the particular one of the operating parameters at the absolute address of the memory determined by the address determination unit.

According to the present invention, each of the image forming devices in the image forming device management system has the absolute addresses of the memory where the respective operating parameters are stored which are predetermined according to the kind of each operating parameter. The access request processing unit accesses one of the operating parameters at an absolute address of the memory determined by the address determination unit. It is possible to avoid dealing with individual absolute addresses of the memory for each of different kinds of image forming devices. It is possible to provide an easy-to-use management operation for the user.

The above-mentioned seventh object of the present invention is achieved by an image forming device management system which includes a plurality of image forming devices, each of the image forming devices having operating parameters stored in a memory of the image forming device, and absolute addresses of the memory where the respective operating parameters are stored being predetermined according to a kind of each operating parameter, a central service station which reads information from or writes information to the operating parameters of one of the image forming devices by transmitting an access request to said one of the image forming devices, and a communication device which connects one of the image forming devices to the central service station via a communication network, wherein the central service station includes: a parameter code transmitting unit which transmits a parameter code, indicating a kind of a particular one of the operating parameters, through the communication device to one of the image forming devices when transmitting an access request to said one of the image forming devices, and wherein each of the image forming devices includes: an address determination unit responsive to the access request which determines a particular absolute address of the memory of the image forming device in accordance with the parameter code transmitted by the code transmitting unit; and an access request processing unit which accesses the particular one of the operating parameters at the absolute address of the memory determined by the address determination unit, and wherein the image forming devices are of different models and share a common parameter code indicating an identical kind for the operating parameters of the individual image forming devices regardless of the model of each image forming device.

According to the above-described image forming device management system, it is possible to provide a simple management scheme for the central service station and need not deal with individual absolute addresses of the memory for each of different kinds of image forming devices.

The above-mentioned eighth object of the present invention is achieved by an image forming device management system which includes a plurality of image forming devices, a central service station which provides a maintenance service for the image forming devices, and a communication device which connects one of the image forming devices to the central service station via a communication network, wherein each of the image forming devices includes: a first request unit which outputs a mode shift request to the image forming device, the mode shift request initiating a shift of the image forming device to a maintenance mode; a maintenance mode start unit which sets the image forming device in the maintenance mode in response to the mode shift request output by the first request unit; a first remote message unit which transmits a first remote message through the communication device to the central service station in response to the mode shift request output by the first request means, the first remote message indicating a start of a maintenance service of the image forming device; a second request unit which outputs a maintenance end request to the image forming device, the maintenance end request terminating the maintenance mode of the image forming device; and a second remote message unit which transmits a second remote message through the communication device to the central service station in response to the maintenance end request output by the second request unit, the second remote message indicating an end of the maintenance service of the image forming device.

Further, the above-mentioned eighth object of the present invention is achieved by an image forming device management system which includes a plurality of image forming devices, a central service station which provides a maintenance service for the image forming devices, and a communication device which connects one of the image forming devices to the central service station via a communication network, wherein each of the image forming devices includes: a first request unit which outputs a mode shift request to the image forming device, a first display unit which displays a first mode shift key in response to the mode shift request output by the first request unit, a second request unit which initiates a shift of the image forming device to a maintenance mode when the first mode shift key displayed by the first display unit is turned ON; a maintenance mode start unit which sets the image forming device in the maintenance mode when the shift of the image forming device to the maintenance mode is initiated by the second request unit; a first remote message unit which transmits a first remote message through the communication device to the central service station when the shift of the image forming device to the maintenance mode is initiated by the second request unit, the first remote message indicating a start of a maintenance service of the image forming device; a third request unit which outputs a maintenance end request to the image forming device, the maintenance end request terminating the maintenance mode of the image forming device; and a second remote message unit which transmits a second remote message through the communication device to the central service station in response to the maintenance end request output by the second request unit, the second remote message indicating an end of the maintenance service of the image forming device.

It is possible for the above-described image forming device management system to manage an accurate time of the start or the end of the maintenance service of each of image forming devices by the serviceman.

BRIEF DESCRIPTION OF THE DRAWINGS

Other objects, features and advantages of the present invention will be more apparent from the following detailed description when read in conjunction with the accompanying drawings in which:

FIG. 5 is a diagram for explaining a communication sequence of a remote message transmission when a remote message key is turned ON;

FIG. 10 is a diagram for explaining a communication sequence when a read request is transmitted to the copier by the CCU;

FIG. 11 is a diagram for explaining various parameters which are set in the CCU;

FIG. 12A, FIG. 12B and FIG. 12C are diagrams for explaining data formats of messages when a remote message transmission is performed;

FIG. 14A, FIG. 14B and FIG. 14C are diagrams for explaining data formats of messages when a request is transmitted to the CCU by the CSS;

FIG. 15A and FIG. 15B are diagrams for explaining data formats of messages when a request is transmitted to the copier by the CCU;

FIG. 61 is a diagram for explaining a parameter code stored in a ROM of an image forming device in the fifth embodiment;

DETAILED DESCRIPTION OF THE PREFERRED EMBODIMENTS

A description will now be given of the preferred embodiments of the present invention with reference to the accompanying drawings.

1. First Embodiment 1.1 Structure Of System

Figure 1:
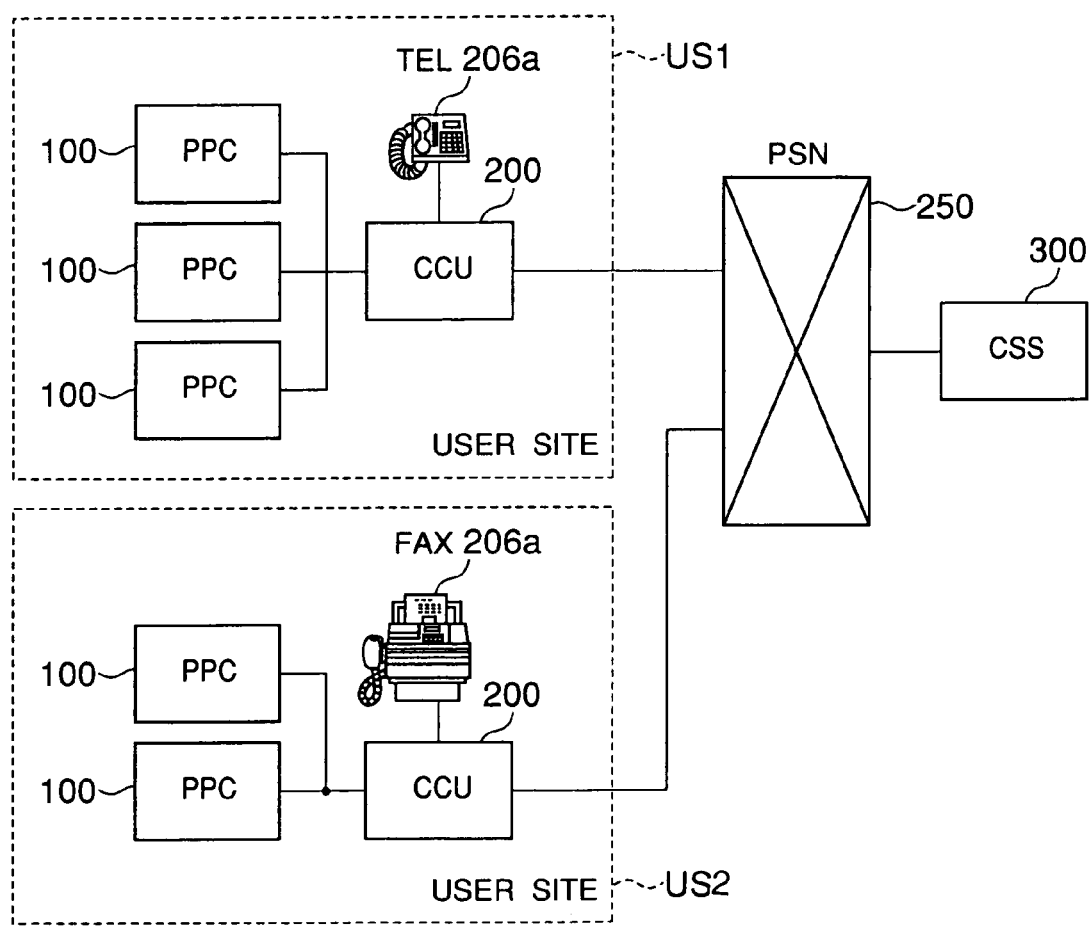
FIG. 1 is a block diagram of one embodiment of an image forming device management system of the present invention.

FIG. 1 shows a first embodiment of the image forming device management system of the present invention. As shown in FIG. 1, in the image forming device management system of the first embodiment, a plurality of image forming devices 100, such as plain paper copiers PPC (shown in FIG. 1) or printers (not shown in FIG. 1), are provided on each of a user site US1 and a user site US2. It is a matter of course that the image forming device management system of the present invention may include only one image forming device. Hence, the image forming device management system may include one or more image forming devices 100 provided therein. For the sake of convenience, one of the image forming devices 100 in the following description will be called the copier 100, unless otherwise specified.

In the image forming device management system of FIG. 1, a communication control unit CCU 200 is also provided on each of the user sites US1 and US2, and the plurality of image forming devices 100 of each user site are connected to the CCU 200. The CCU 200 of each user site is linked to a central service station CSS 300 at a remote location via a public switched network PSN 250. In the embodiment of FIG. 1, a telephone set 206a is connected to the CCU 200 of the user site US1, and a facsimile 206b is connected to the CCU 200 of the user site US2.

The CCU 200 in the first embodiment is, for example, a communication control device that is capable of being connected up to five image forming devices, and the interface between each image forming device 100 and the CCU 200 is provided by a multidrop connection which is in conformity with RS-485 standard. The communication sequence between each image forming device 100 and the CCU 200 is performed in accordance with basic data transmission procedures. The CCU 200 can communicate with one of the image forming devices 100 after a data link between the CCU 200 and the image forming device 100 is established by using a centralized polling/selecting control method. A specific device address can be set for each of the image forming devices 100 by setting an address setting switch (for example, the element 1031 in FIG. 2) of each image forming device 100, and a polling address and a selecting address can be set for each image forming device 100 in accordance with the specific device address.

1.2 Structure of Image Forming Device 1.2.1 Mechanical Structure

The copier 100 in the first embodiment is an analog-type image forming device in which an electrostatic latent image is formed on a photosensitive drum when an original image is optically read by a scanner. In the copier 100, a charger unit, a discharger unit, a developing unit, a transfer unit, a pre-transfer charger unit, a cleaning unit and a fixing unit, which are required to perform an electrophotographic process, are provided around the periphery of the photosensitive drum. Further, in the copier 100, a sheet supplying device and a sheet transporting device are provided. Such structure of the copier 100 is known in the prior art, and a detailed description thereof will be omitted.

In a control panel (not shown) of the copier 100, various keys, displays and controls are provided, including a timer key, a timer indicator, a program key, an ENTER key, ten keys, a guidance key, a guidance indicator, a sizing key, a sizing indicator, a centering key, a centering indicator, a paper offset key, a paper offset indicator, a both side indicator, a remote message key, and a remote message indicator. The remote message key and the remote message indicator are related to the present invention and provided within the copier 100. The remote message key and the remote message indicator will be described later. Further, in the control panel of the copier 100, a duplex copy key, a page copy indicator, a page copy indicator, a delete key, a delete indicator, a sheet-designated sizing key, a sheet-designated sizing indicator, a zoom key, a reduce key, an enlarge key, a normal size key, a sheet select key, an auto sheet select key, a density adjust key, an auto density set key, a clear/stop key, a start key, an interrupt key, a preheat indicator, a mode-clear/preheat key, and etc.

1.2.2 Electrical Structure

Figure 2:
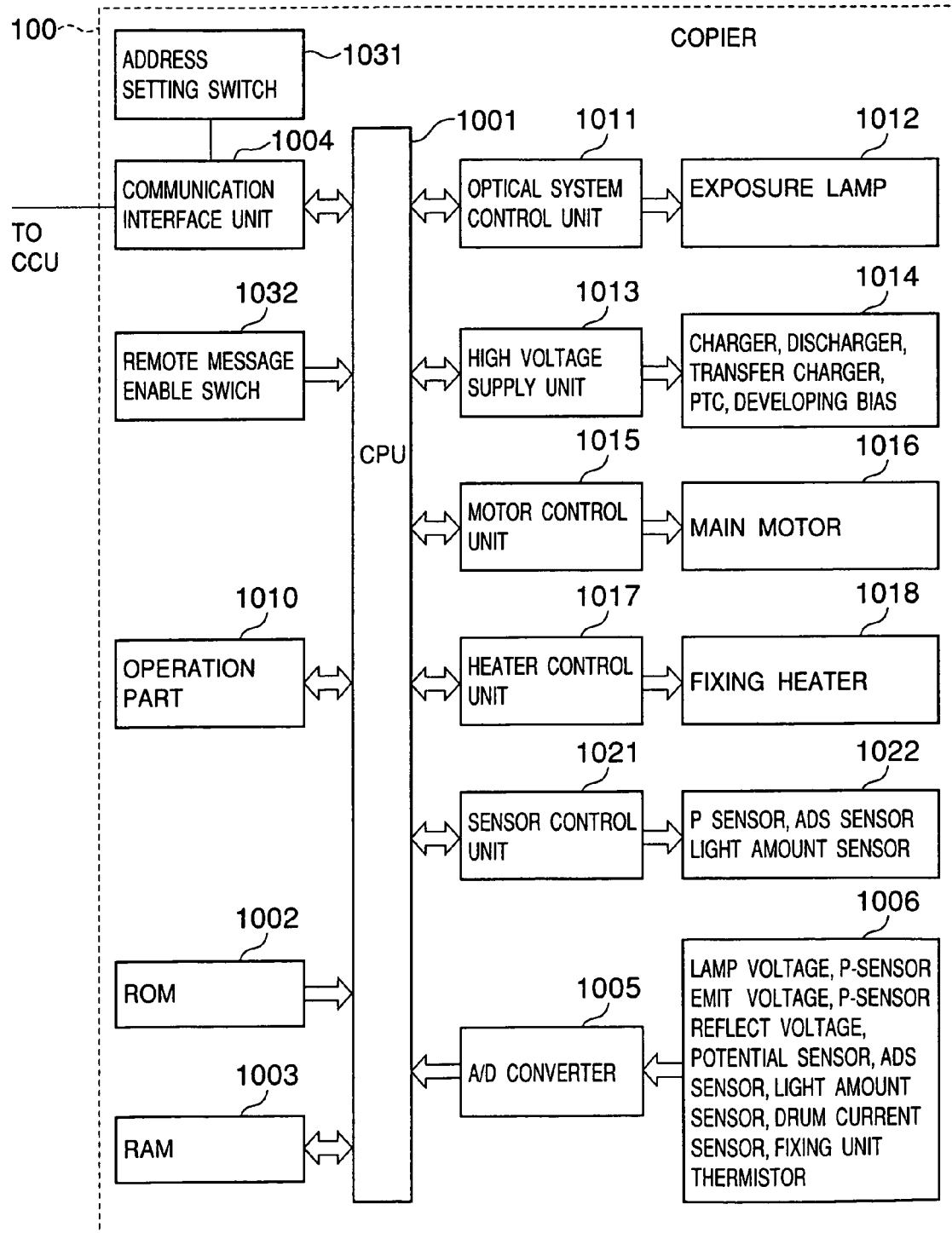
FIG. 2 is a block diagram of a control part of a copier in the image forming device management system of FIG. 1.

FIG. 2 shows a control part of one of the copiers 100 in the image forming device management system of the first embodiment. As shown in FIG. 2, the copier 100 is controlled by a CPU (central processing unit) 1001. A control program executed by the CPU 1001 and control data used for controlling the copier 100 are stored in a ROM (read-only memory) 1002. A RAM (random access memory) 1003 provides a working storage area for the CPU 1001 when executing the control program. A communication interface unit 1004 provides an interface between the copier 100 and the CCU 200 when the copier 100 transmits data to the CCU 200 and receives control data and control codes from the CCU 200.

In the copier 100 of FIG. 2, an A/D (analog-to-digital) converter 1005 converts various operating voltages of various sensors 1006 of the copier 100 into digital signals, and the digital signals are supplied to the CPU 1001. A lamp voltage of the scanner, a light emission voltage and a light receiving voltage of a P sensor (provided for adjusting a toner density), an output of an ADS (auto density setting) sensor, an output of a light amount sensor, an output of a current sensor of the photosensitive drum, and a voltage of a fixing unit thermistor are supplied to an input of the A/D converter 1005. In the copier 100 of FIG. 2, when a fixing temperature indicated by the voltage of the fixing unit thermistor is below a given-temperature, a copying operation of the copier 100 is inhibited.

In the copier 100 of FIG. 2, an operation part 1010 includes the above-described keys of the control panel. The above-mentioned remote message key is provided within the operation part 1010 of the copier 100. The CPU 1001 reads out the settings of the operation part 1010 when a power switch is turned ON. A remote message enable switch 1032 is provided in the copier 100, and the remote message enable switch 1032 is connected to the CPU 1001. When the remote message enable switch 1032 is turned ON during the ON state of the power switch, the CPU 1001 allows the copier 100 to perform a remote message transmission with respect to the CSS 300. When the remote message enable switch 1032 is turned OFF, the CPU 1001 inhibits the copier 100 from performing the remote message transmission. Further, the CPU 1001 outputs a control signal to each of the above-described indicators of the control panel.

In the copier 100 of FIG. 2, an optical system control unit 1011 is connected to the CPU 1001, and the optical system control unit 1011 controls an exposure lamp 1012 of the scanner. A high-voltage supply unit 1013 is connected to the CPU 1001, and the high-voltage supply unit 1013 supplies a high voltage to each of load resistors of various elements 1014 including the charger unit, the discharger unit, the transfer charger unit, the developing unit, and the PTC (pre-transfer charger) unit. A motor control unit 1015 is connected to the CPU 1001, and the motor control unit 1015 controls a main motor 1016. A heater control unit 1017 is connected to the CPU 1001, and the heater control unit 1017 controls a fixing heater 1018 of the fixing unit. A sensor control unit 1021 is connected to the CPU 1001, and the sensor control unit 1021 controls various sensors 1022. Specifically, the sensor control unit 1021 controls a light receiving gain of each of the light amount sensor, the ADS sensor and the P sensor, and controls a light emission voltage of the P sensor.

1.3 Communication Control Unit

Figure 3:
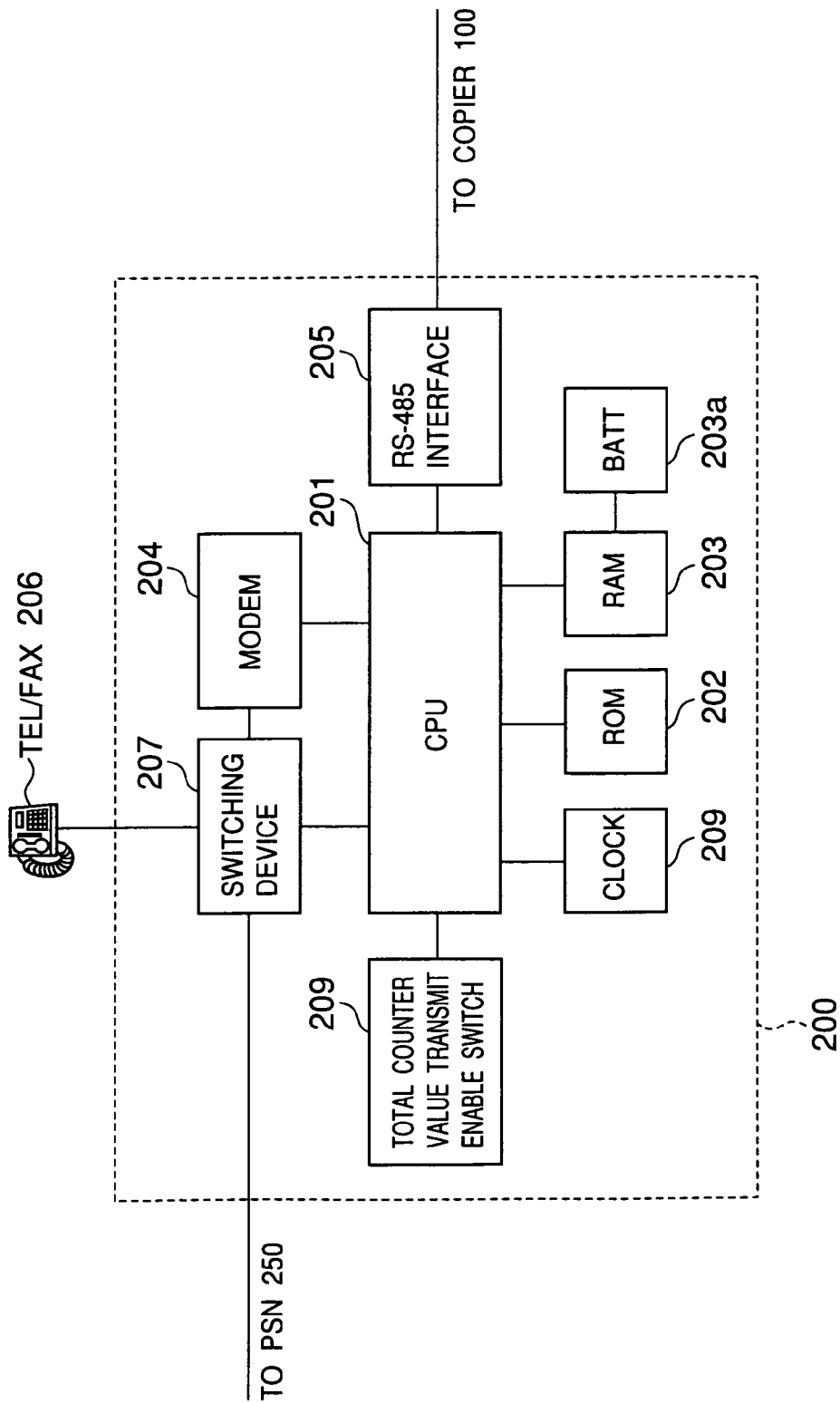
FIG. 3 is a block diagram of a communication control unit CCU in the image forming device management system of FIG. 1.

FIG. 3 shows the CCU 200 in the image forming device management system of the first embodiment. As shown in FIG. 3, the CCU 200 is controlled by a CPU 201 similar to the copier 100. A control program executed by the CPU 201 and control data used for controlling the CCU 200 are stored in a ROM 202. A RAM 203 provides a working storage area for the CPU 201 when executing the control program. A battery 203a is connected to the RAM 203, and the battery 203a serves to allow the RAM 203 to retain intermediate results of the execution of the control program even after a power switch is turned OFF.

Further, in the CCU 200 of FIG. 3, a switching device 207 is connected to the CPU 201, and the switching device 207 selects one of a connection of the telephone set 206a (or the facsimile 206b) and the PSN 25.0 and a connection of the CCU 200 and the PSN 250. Either the telephone set 206a or the facsimile 206b may be connected through the switching device 207.to the CCU 200. A modem 204 is connected to the CPU 201 and the switching device 207, and the model 204 provides a communication interface between the CCU 200 and the PSN 250 when the copier 100 transmits data to the CSS 300 via the PSN 250 and receives control data and control codes from the CSS 300 via the PSN 250. An RS-485 interface unit 205 provides the data transmission interface between the copier 100 and the CCU 200 which is in conformity with RS-485 standard. Further, in the CCU 200 of FIG. 3, a total counter value transmission enable switch 208 and a clock 209 are provided.

The CCU 200 receives data supplied by the copier 100, and transmits the data through the PSN 250 to the CSS 300. Further, the CCU 200 receives control codes and control data supplied by the CSS 300, and transmits them to the copier 100. The CCU 200 sends a control signal to the high-voltage supply unit 1013 of the copier 100 so as to control the ON/OFF of the power switch of the copier 100. The CCU 200 recognizes the identification of each of the copiers 100 which are connected the CCU 200 within the same user site. The CCU 200 deals with the remote message transmission of each of the copiers 100 connected to the CCU 200 within the same user site. The switching device 207 in the CCU 200 selects one of the connection of the telephone set 206a (or the facsimile 206b) and the PSN 250 and the connection of the CCU 200 and the PSN 250.

1.4 Central Service Station

Figure 4:
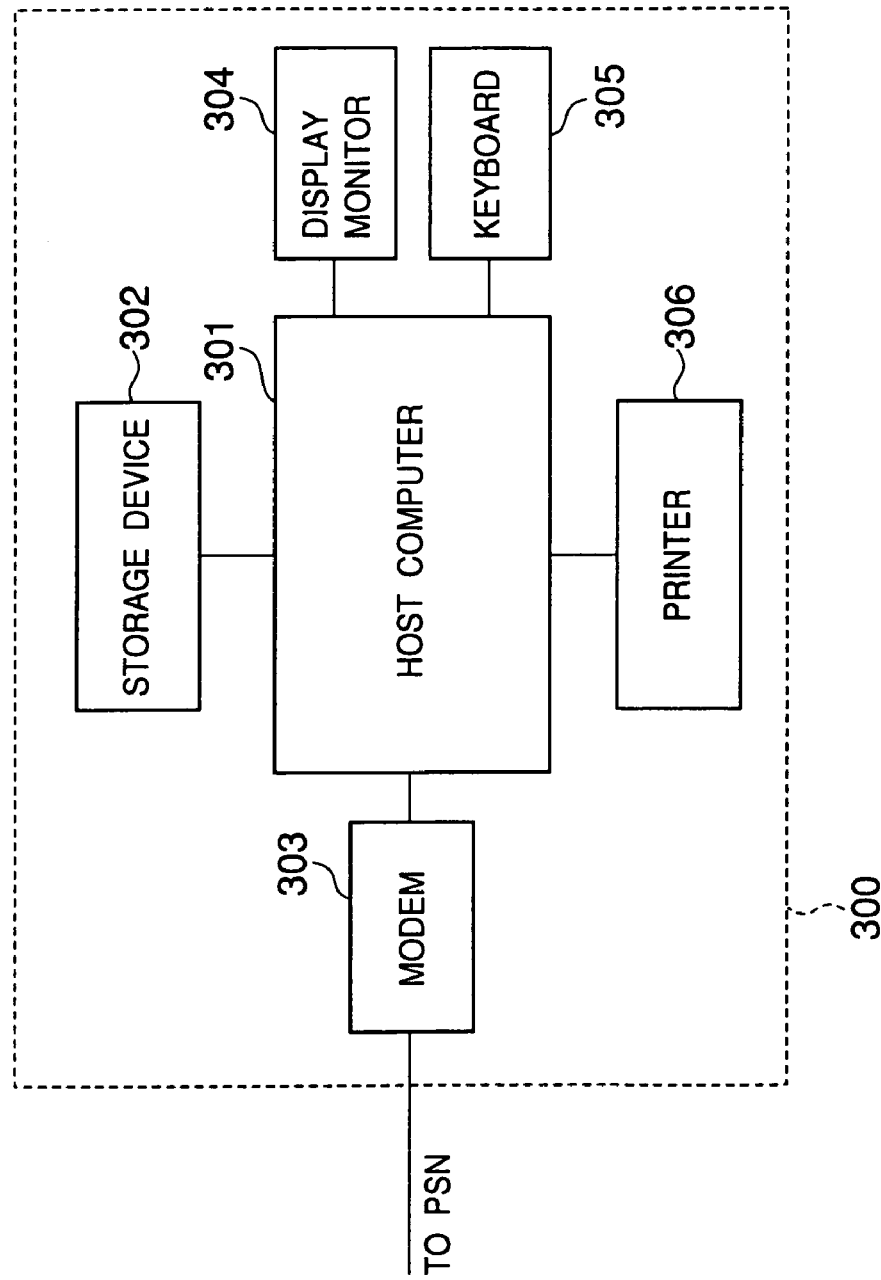
FIG. 4 is a block diagram of a central service station CSS in the image forming device management system of FIG. 1.

FIG. 4 shows the CSS 300 in the image forming device management system of the first embodiment. As shown in FIG. 4, the CSS 300 includes a host computer 301 which performs various management processes. A storage device 302 is connected to the host computer 301, and stores management data which is used by the host computer 301 when performing the management processes. A modem 303 is connected to the host computer 301, and provides a communication interface between the host computer 301 and the PSN 250 when the copier 100 transmits data to the CSS 300 via the PSN 250 and receives control data and control codes from the CSS 300 via the PSN 250. Further, in the CSS 300 of FIG. 4, a display monitor 304, a keyboard 305 and a printer 306 are provided.

1.5 Communication Sequences

Figure 5:
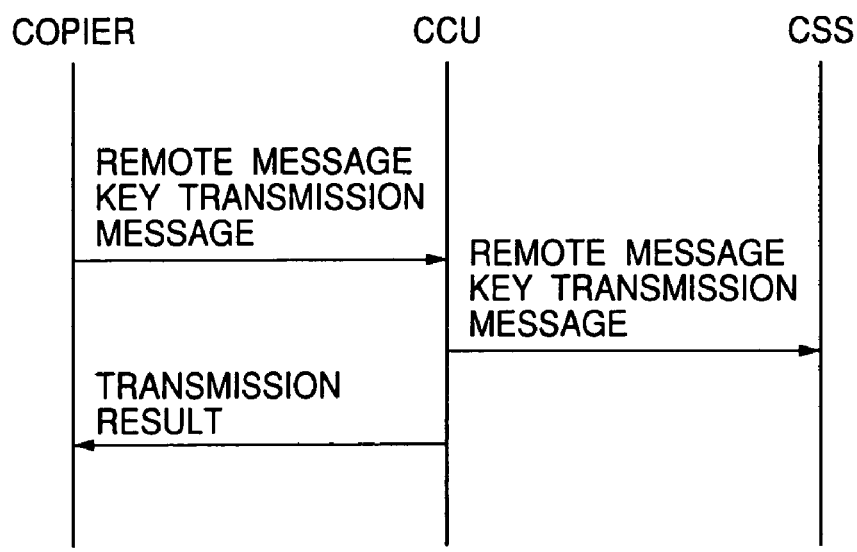

FIG. 5 shows a communication sequence of the remote message transmission when the remote message key is turned ON. When the remote message key, provided in the operation part 1010 of the copier 100, is turned ON, the copier 100 transmits a remote message key transmission message to the CCU 200, as shown in FIG. 5. The remote message key transmission message sent by the copier 100 is received by the CCU 200, and the CCU 200 originates a call to a predetermined telephone number of the CSS 300 via the PSN 250. When a data link between the CCU 200 and the CSS 300 is established, the CCU 200 transmits a remote message key transmission message to the CSS 300 via the PSN 250. The CSS 300 is usually installed at a service location remote from the user site. The message sent at this time to the CSS 300 by the CCU 200 is one of various kinds of messages sent to the CSS 300 by the CCU 200, and includes only data of preset parameters of the CCU 200 contained in the remote message key transmission message. The parameters of the CCU 200 can be set or rewritten by the CSS 300 through a data transmission from the CSS 300 to the CCU 200 via the PSN 250.

When the transmission of the message from the CCU 200 to the CSS 300 is performed, the CCU 200 transmits a transmission result to the copier 100 which is the originating station, the transmission result indicating a result of the transmission between the CCU 200 and the CSS 300. By receiving the transmission result sent by the CCU 200, the copier 100 is informed as to whether the transmission of the message normally ends or abnormally ends.

The copier 100 generally has a self-diagnostic function. For example, when an error of the fixing temperature or an error of adjustment controls in the copier 100 is detected as a result of the self-diagnostic testing, an error message or a serviceman call message is displayed in the copier 100.

Figure 6:
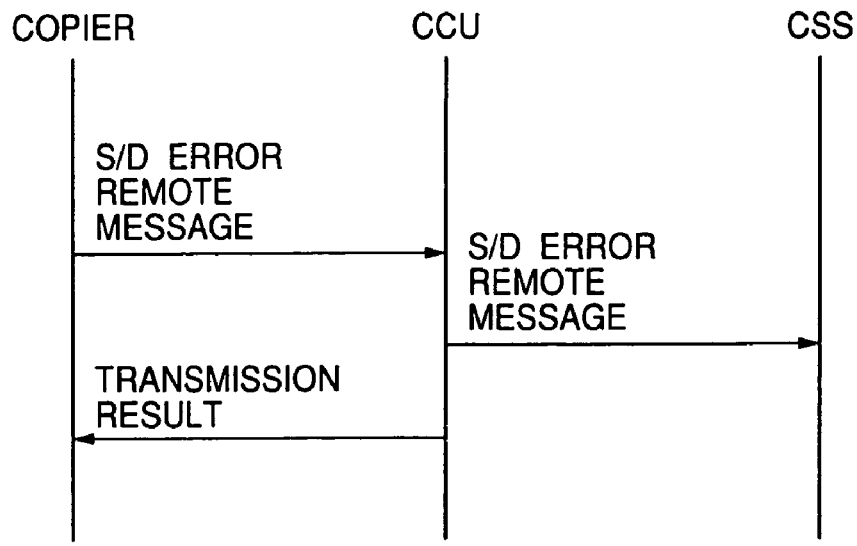
FIG. 6 is a diagram for explaining a communication sequence of a remote message transmission when a self-diagnostic error takes place.

FIG. 6 shows a communication sequence of the remote message transmission when a self-diagnostic error takes place. When a self-diagnostic (S/D) error is detected as a result of the S/D testing of the copier 100, the copier 100 transmits an S/D error remote message to the CCU 200, as shown in FIG. 6. The S/D error remote message sent by the copier 100 is received by the CCU 200, and the CCU 200 originates a call to a predetermined telephone number of the CSS 300 via the PSN 250. When a data link between the CCU 200 and the CSS 300 is established, the CCU 200 transmits an S/D error remote message to the CSS 300 via the PSN 250. When the transmission of the message from the CCU 200 to the CSS 300 is performed, the CCU 200 transmits a transmission result to the copier 100 which is the originating station, the transmission result indicating a result of the transmission between the CCU 200 and the CSS 300. By receiving the transmission result sent by the CCU 200, the copier 100 is informed as to whether the transmission of the message normally ends or abnormally ends.

The copier 100 generally has an advance warning function. For example, when no significant error is detected as a result of the self-diagnostic testing but the copier 100 determines that the copier 100 requires a maintenance service, an advance warning remote message is transmitted to the CSS 300 by the copier 100.

Figure 7:
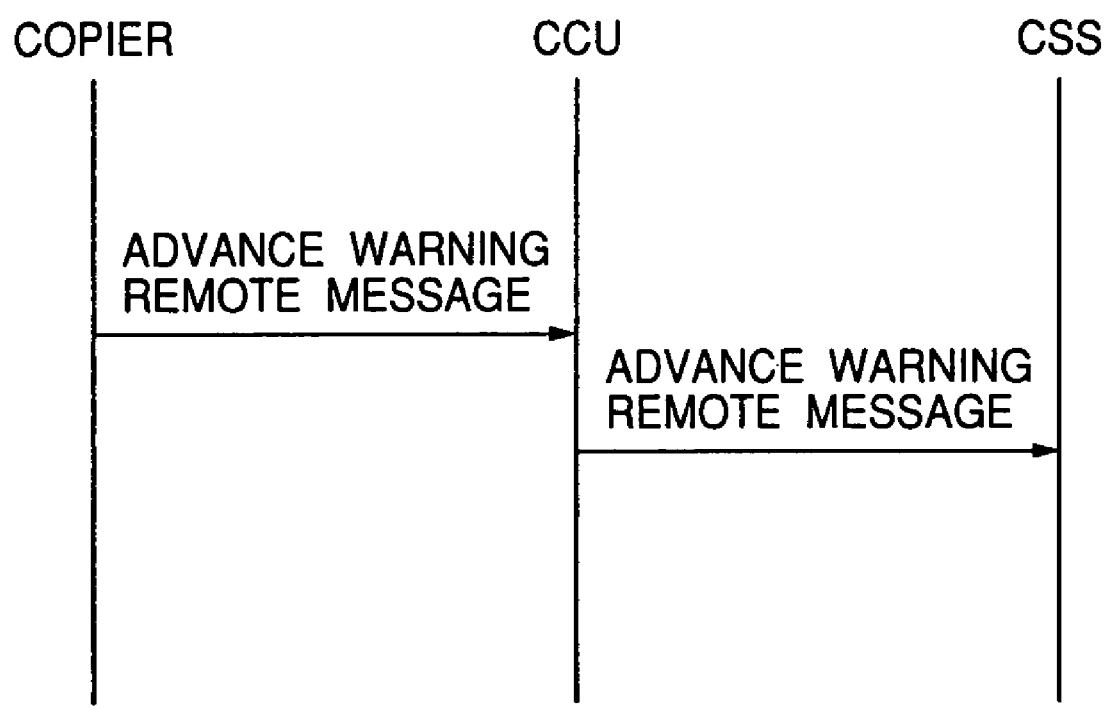
FIG. 7 is a diagram for explaining a communication sequence of a remote message transmission when an advance warning remote message is transmitted.

FIG. 7 shows a communication sequence of the remote message transmission when an advance warning remote message is transmitted. As shown in FIG. 7, the copier 100 transmits an advance warning remote message to the CCU 200. The advance warning remote message sent by the copier 100 is received by the CCU 200, and the CCU 200 originates a call to a predetermined telephone number of the CSS 300 via the PSN 250. When a data link between the CCU 200 and the CSS 300 is established, the CCU 200 transmits an advance warning remote message to the CSS 300 via the PSN 250. The CCU 200 in this case does not transmit a transmission result to the copier 100 (or the originating station) when the transmission of the message from the CCU 200 to the CSS 300 is performed.

When the S/D error remote message is sent to the CCU 200, the copier 100 in the first embodiment does not work. When the advance warning remote message is sent to the CCU 200, the copier 100 in the first embodiment is workable. Even during the transmission of the advance warning remote message, the copier 100 starts performing the copying operation if an original document is placed on the copier 100 and the start key is turned ON. However, when the load on the control part of the copier 100 will be excessively high if the copying operation is performed, the transmission of the advance warning remote message may be interrupted.

Generally, the degree of emergency for the advance warning remote message is lower than that for the A/D error remote message. It is possible to defer the transmission of the advance warning remote message from the CCU 200 to the CSS 300 until the frequency of use of the telephone set 206a or the facsimile 206b is kept at an adequately low level or until the traffic of the PSN 250 is kept at an adequately low level. The deferred time of the transmission of the message can be set by the CSS 300 through the communication between the CSS 300 and the CCU 200 via the PSN 250.

Figure 8A:
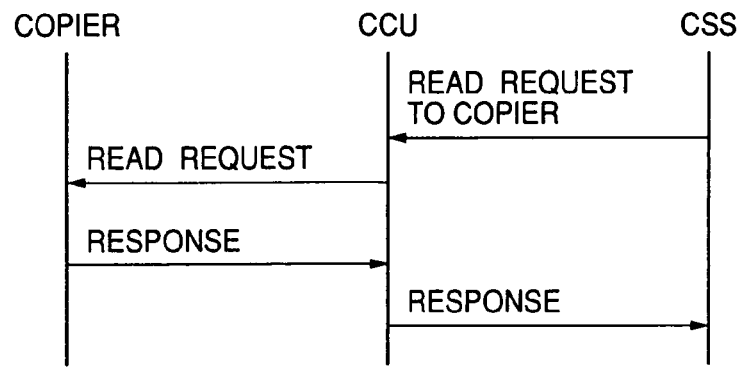
FIG. 8A, FIG. 8B and FIG. 8C are diagrams for explaining respective communication sequences when a read request, a write request and an execute-request are transmitted to the copier by the CSS.
Figure 8B:
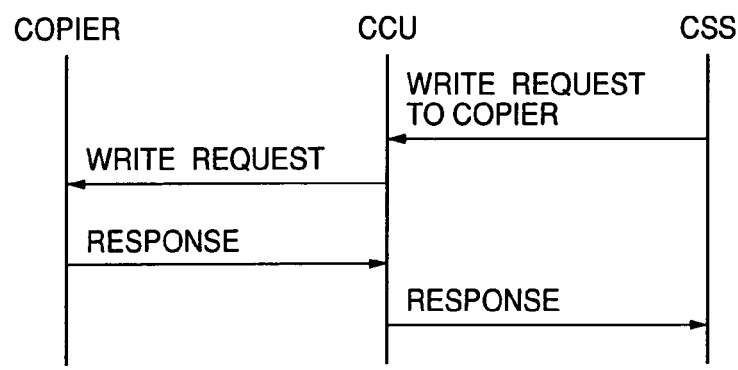
Figure 8C:
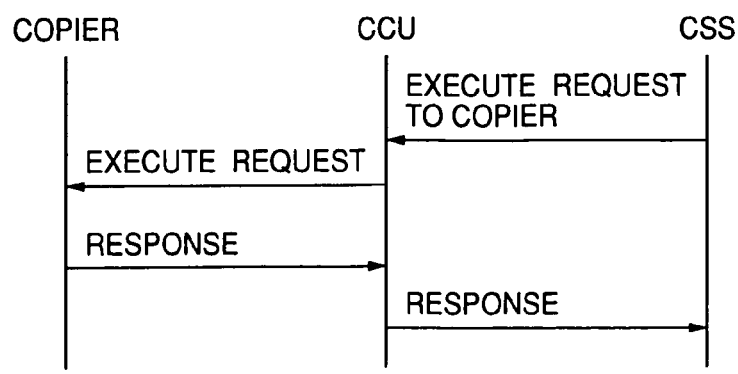

FIG. 8A, FIG. 8B and FIG. 8C show respective communication sequences when a read request, a write request and an execute request are transmitted to the copier 100 by the CSS 300.

The communication sequence of FIG. 8A is performed when a read request is transmitted to the copier 100 by the CSS 300. The read request is issued by the CSS 300 in order to read logging data of the copier 100, the settings of the parameters of the copier 100 or the outputs of the sensors of the copier 100. The communication sequence of FIG. 8B is performed when a write request is transmitted to the copier 100 by the CSS 300. The write request is issued by the CSS 300 in order to transmit new data from the CSS 300 to the copier 100 and write the new data to the parameters of the copier 100. The communication sequence of FIG. 8C is performed when an execute request is transmitted to the copier 100 by the CSS 300. The execute request is issued by the CSS 300 in order to have the copier 100 perform a testing operation.

In each of the communication sequences of FIG. 8A through FIG. 8C, the CSS 300 originates a call to a predetermined telephone number of the CCU 200 via the PSN 250. When a data link between the CCU 200 and the CSS 300 is established, the CSS 300 transmits a request to the CSS 300 via the PSN 250. The request sent by the CSS 300 includes an identification of a designation copier 100 to which the request is made by the CSS 300. When the request from the CSS 300 is received by the CCU 200, the CCU 200 transmits the request to the designation copier 100. When the request from the CCU 200 is received by the designation copier 100, the designation copier 100 processes the request and transmits a response to the request to the CCU 200. When the response from the designation copier 100 is received by the CCU 200, the CCU 200 transmits the response to the CSS 300 via the PSN 250. In this manner, the communication sequence for each request sent to the copier 100 by the CSS 300 is performed by the image forming device management system of the first embodiment.

Figure 9A:
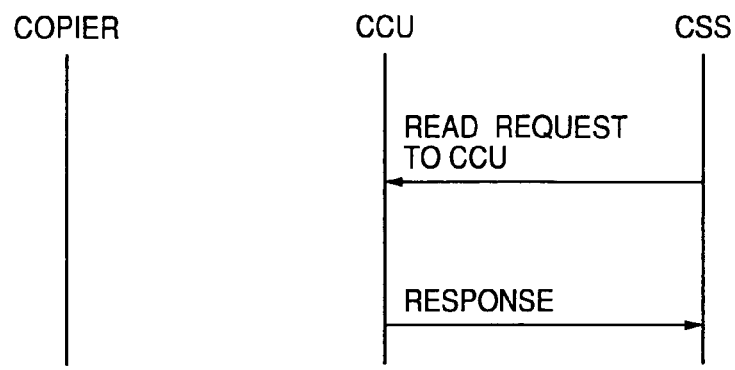
FIG. 9A, FIG. 9B and FIG. 9C are diagrams for explaining respective communication sequences when a read request, a write request and an execute request are transmitted to the CCU by the CSS.
Figure 9B:
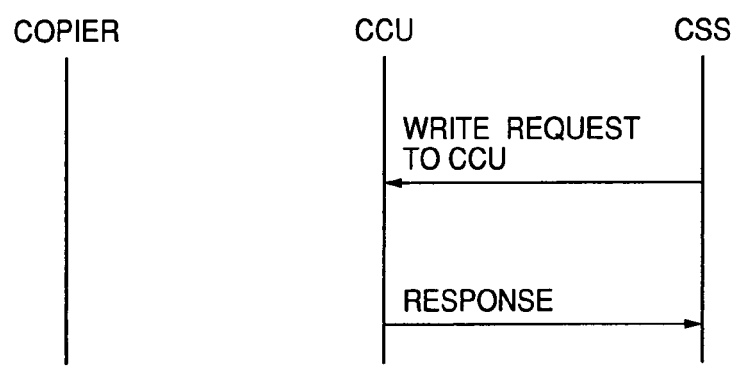
Figure 9C:
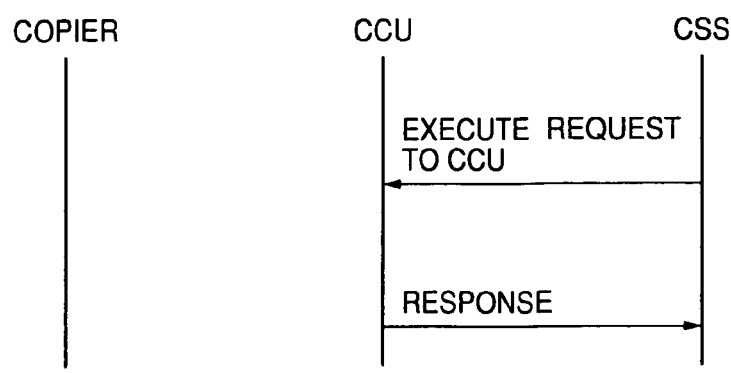

FIG. 9A, FIG. 9B and FIG. 9C show respective communication sequences when a read request, a write request and an execute request are transmitted to the CCU 200 by the CSS 300.

The communication sequence of FIG. 9A is performed when a read request is transmitted to the CCU 200 by the CSS 300. The read request is issued by the CSS 300 in order to read the settings of the parameters of the CCU 200 or the status of the CCU 200. Alternatively, the read request is issued by the CSS 300 in order to read the internal data of the copier 100 previously read by the CCU 200. The communication sequence of FIG. 9B is performed when a write request is transmitted to the CCU 200 by the CSS 300.

The write request is issued by the CSS 300 in order to transmit new data from the CSS 300 to the CCU 200 and write the new data to the parameters of the CCU 200. The communication sequence of FIG. 9C is performed when an execute request is transmitted to the CCU 200 by the CSS 300. The execute request is issued by the CSS 300 in order to have the CCU 200 perform a testing operation.

In each of the communication sequences of FIG. 9A through FIG. 9C, the CSS 300 originates a call to a predetermined telephone number of the CCU 200 via the PSN 250. When a data link between the CCU 200 and the CSS 300 is established, the CSS 300 transmits a request to the CSS 300 via the PSN 250. When the request from the CSS 300 is received by the CCU 200, the CCU 200 processes the request and transmits a response to the request to the CSS 300. In this manner, the communication sequence for each request sent to the CCU 200 by the CSS 300 is performed by the image forming device management system of the first embodiment.

FIG. 10 shows a communication sequence when a read request is transmitted to the copier 100 by the CCU 200.

The communication sequence of FIG. 10 is performed when a read request is transmitted to the copier 100 by the CCU 200. The read request is issued by the CCU 200 regardless of the CSS 300, in order to read the logging data of the copier 100, the settings of the parameters of the copier 100 or the outputs of the sensors of the copier 100. In the communication sequence of FIG. 10, the CCU 200 transmits a read request to the copier 100. When the read request from the CCU 200 is received by the copier 100, the copier 100 processes the request and transmits a response to the request to the CCU 200. In this manner, the data of the copier 100 is read by the CCU 200. Further, the data of the copier 100 previously read by the CCU 200 is read by the CSS 300 by performing the communication sequence of FIG. 9A.

FIG. 11 shows various parameters which are set in the CCU 200 in the image forming device management system of the first embodiment. Suppose that device addresses 1 through 5 are assigned to the image forming devices 100 (or the copiers 100) in the image forming device management system of FIG. 1.

As shown in FIG. 11, the parameters, set in the CCU 200 are grouped into six blocks, including an image forming device block, a remote message key transmission block, an S/D error remote message block, an advance warning remote message block, a total counter value transmission block, and a telephone setting block. In the image forming device block, a model number and a serial number are retained with respect to each of the respective copiers 100. When a message is transmitted from a particular one of the copiers 100 to the CCU 200, the CCU 200 adds the model number and serial number (or the parameters corresponding to that copier 100) to the message as the identification of that copier 100, and transmits the message, including the identification of the copier 100, to the CSS 300. When an access request, including an identification of a destination copier 100, is transmitted to the CCU 200 by the CSS 300, the CCU 200 selects a particular one of the copiers 100 by the identification of the copier included in the request, and transmits the request to the selected one of the copiers 100.

With respect to each of the remote message key transmission block, the S/D error remote message block and the advance warning remote message block, a destination telephone number, the number of redials, a redial period, and conditions of data transmission to the CSS 300 in the remote message transmission are retained in the CCU 200 as shown in FIG. 11. In addition, in the advance warning remote message block, a notification time (at which a remote message is transmitted to the CSS 300) is further retained in the CCU 200.

Further, in the total counter value transmission process block in the parameters of the CCU 200, a total counter value collection time, a destination telephone number, and transmission date and time are retained as shown in FIG. 11. In the telephone setting block, a dial mode setting (a dial pulse or a dial tone), and a dial pulse period setting are retained. Further, with respect to each of the respective blocks in the parameters of the CCU 200, a check sum is provided for an error detection. The parameters of the CCU 200 can be set or rewritten by the CSS 300 through a data transmission from the CSS 300 to the CCU 200 via the PSN 250. Alternatively, a portable special device for parameter setting may be connected to the CCU 200 so as to set or rewrite the parameters of the CCU 200 by using the special device. In the image forming device management system of the present invention, a total counter of the copier 100 is usually non-resettable, and the total counter value output by the total counter is an accumulated value incremented from an initial value, and indicates a total of copy sheets for which image formation is performed by the copier 100.

1.6 Data Format of Messages

FIG. 12A, FIG. 12B and FIG. 12C show data formats of messages when a remote message transmission is performed.

FIG. 12A shows a data format of a remote message sent from the copier 100 to the CCU 200. As shown in FIG. 12A, the remote message includes a message code in the first field, and the number of jams, the number of self-diagnostic (S/D) errors, the number of copy sheets and a state of the copier in the subsequent fields. The message code in the first field indicates which of a remote message key transmission, an S/D error remote message transmission and an advance warning remote message transmission is related to that remote message. The state of the copier in the final field indicates various states of the copier, including a lack of a replenishment part, such as toner, oil or paper, an output of a certain sensor, a setting of an adjustment point, and a state of connection of the copier elements.

FIG. 12B shows a data format of a remote message sent from the CCU 200 to the CSS 300. As shown in FIG. 12B, the remote message includes a model number and serial number in the first field, and the message code, the number of S/D errors, the state of the copier and an occurrence time in the subsequent fields. The model number and the serial number in the first field are specific to the originating copier 100. The message code, the number of jams, the number of S/D errors, the number of copy sheets, and the state of the copier in the subsequent fields are the same as those of the message sent from the copier 100. The occurrence time in the final field indicates a time the remote message is produced, and this time is output by the clock 209 of the CCU 200. The contents of the subsequent fields (except the final field) of the remote message sent from the CCU 200 to the CSS 300 may vary according to the parameters of the CCU 200. In the example of FIG. 12B, the parameters of the CCU 200 are set such that the remote message includes only the message code, the number of the S/D errors and the state of the copier.

FIG. 12C shows a data format of a response sent from the CCU 200 to the copier 100. As shown in FIG. 12C, the response includes a response code in the first field and the contents of the response in the final field.

Figure 13A:
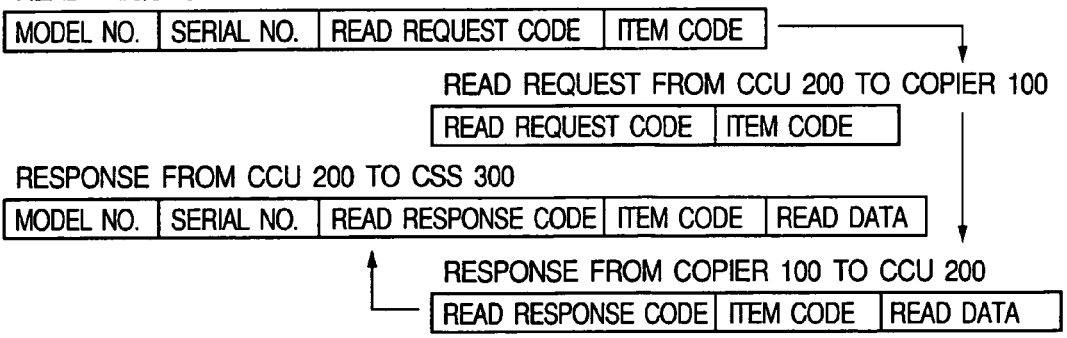
FIG. 13A, FIG. 13B and FIG. 13C are diagrams for explaining data formats of messages when a request is transmitted to the copier by the CSS.
Figure 13B:
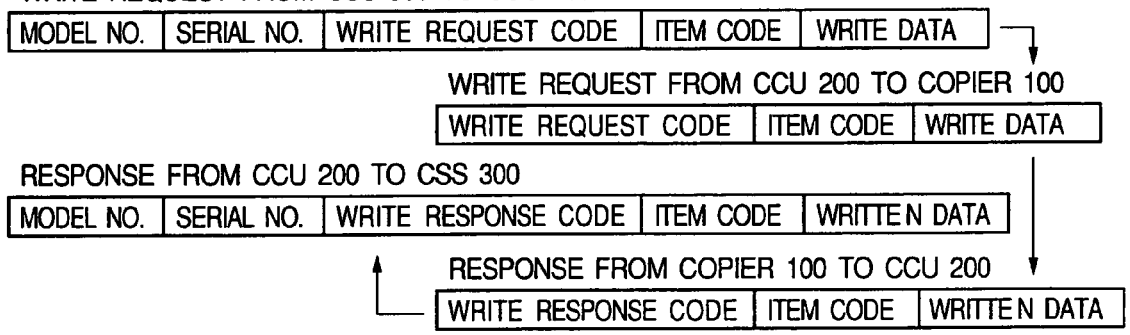
Figure 13C:
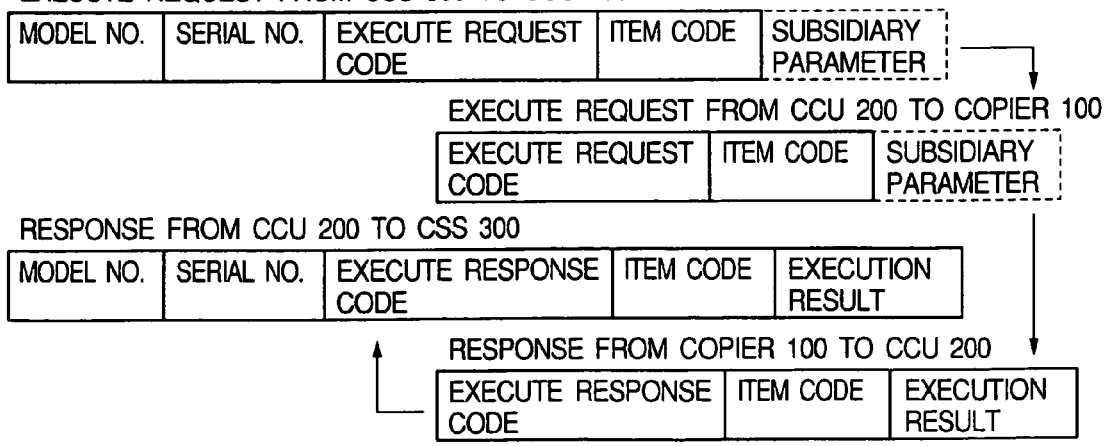

FIG. 13A, FIG. 13B and FIG. 13C show respective data formats of messages when an access request is transmitted to the copier 100 (or the destination copier 100) by the CSS 300.

FIG. 13A shows respective data formats of each of a read request sent from the CSS 300 to the CCU 200, a read request sent from the CCU 200 to the copier 100, a response sent from the copier 100 to the CCU 200, and a response sent from the CCU 200 to the CSS 300. As shown in FIG. 13A, the read request, sent to the CCU 200 by the CSS 300, includes a model number and serial number in the first field, and a read request code and an item code in the subsequent fields. The model number and the serial number in the first field of this message indicates an identification of the copier 100 which is to be accessed by the CSS 300 by the read request. The read request, sent to the copier 100 by the CCU 200, includes the read request code in the first field and the item code in the second field, which are the same as corresponding ones of the read request sent to the CCU 200 by the CSS 300.

Further, as shown in FIG. 13A, the response, sent to the CCU 200 by the copier 100, includes a read response code in the first field, and an item code and a read data in the subsequent fields. The read data in the final field of this message indicates the result in response to the access request made by the CSS 300. The response, sent to the CSS 300 by the CCU 200, includes the model number and the serial number in the first field, and the read response code, the item code and the read data in the subsequent fields. The model number and the serial number in the first field of this message indicate the identification of the copier 100.

FIG. 13B shows respective data formats of each of a write request sent from the CSS 300 to the CCU 200, a write request sent from the CCU 200 to the copier 100, a response sent from the copier 100 to the CCU 200 and a response sent from the CCU 200 to the CSS 300. As shown in FIG. 13B, the messages in the write request case are essentially the same as corresponding messages in the read request case of FIG. 13A except for the following points. Both the write request sent to the CCU 200 by the CSS 300 and the write request sent to the copier 100 by the CCU 200 additionally include a writing data in the respective final fields. Both the response sent to the CCU 200 by the copier 100 and the response sent to the CSS 300 by the CCU 200 include the written data in the respective final fields instead of the read data in the response of FIG. 13A. Usually, the written data of the response sent by the copier 100 is the same as the writing data of the write request sent by the CSS 300. However, when the writing data received from the CSS 300 is out of an effective data range of the copier 100, the written data of the response sent by the copier 100 may be rounded within the effective data range.

FIG. 13C shows respective data formats of each of an execute request sent from the CSS 300 to the CCU 200, an execute request sent from the CCU 200 to the copier 100, a response sent from the copier 100 to the CCU 200 and a response sent from the CCU 200 to the CSS 300. As shown in FIG. 13C, the messages in the execute request case are essentially the same as corresponding messages in the read request case of FIG. 13A except for the following points. Both the execute request sent to the CCU 200 by the CSS 300 and the execute request sent to the copier 100 by the CCU 200 additionally include a subsidiary parameter in the respective final fields. The subsidiary parameter indicates a supplementary command parameter of the execute request other than the item code. Both the response sent to the CCU 200 by the copier 100 and the response sent to the CSS 300 by the CCU 200 include the execution result in the respective final fields instead of the read data in the responses of FIG. 13A.

FIG. 14A, FIG. 14B and FIG. 14C show data formats of messages when an access request is transmitted to the CCU 200 by the CSS 300.

As shown in FIG. 14A through FIG. 14C, the messages in the CSS-to-CCU access request case are essentially the same as corresponding messages in the CSS-to-copier access request case of FIG. 13A through FIG. 13C except for the following points. Both the access requests sent to the CCU 200 by the CSS 300 and the responses sent to the CSS 300 by the CCU 200 include a CCU device code in the respective first fields as an identification of the CCU 200 instead of the identification (or the model number and the serial number) of the copier 100 in the CSS-to-copier access request case of FIG. 13A through FIG. 13C.

FIG. 15A and FIG. 15B show data formats of messages when a read request is transmitted to the copier 100 by the CCU 200.

As shown in FIG. 15A, the read request sent to the copier 100 by the CCU 200 in the CCU-to-copier case is the same as the corresponding message in the CSS-to-copier read request case of FIG. 13A. As shown in FIG. 15B, the response sent to the CCU 200 by the copier 100 in the CCU-to-copier case is the same as the corresponding message in the CSS-to-copier response case of FIG. 13A. Hence, the copier 100 deals with the messages in the same manner for both the CCU-to-copier read access case and the CSS-to-copier read access case.

1.7 Remote Message Transmission Process 1.7.1 Remote Message Transmission Process by Copier Next, a description will be given of a remote message transmission process performed by the copier 100 in the first embodiment, with reference to FIG. 16 through FIG. 19.

Figure 16:
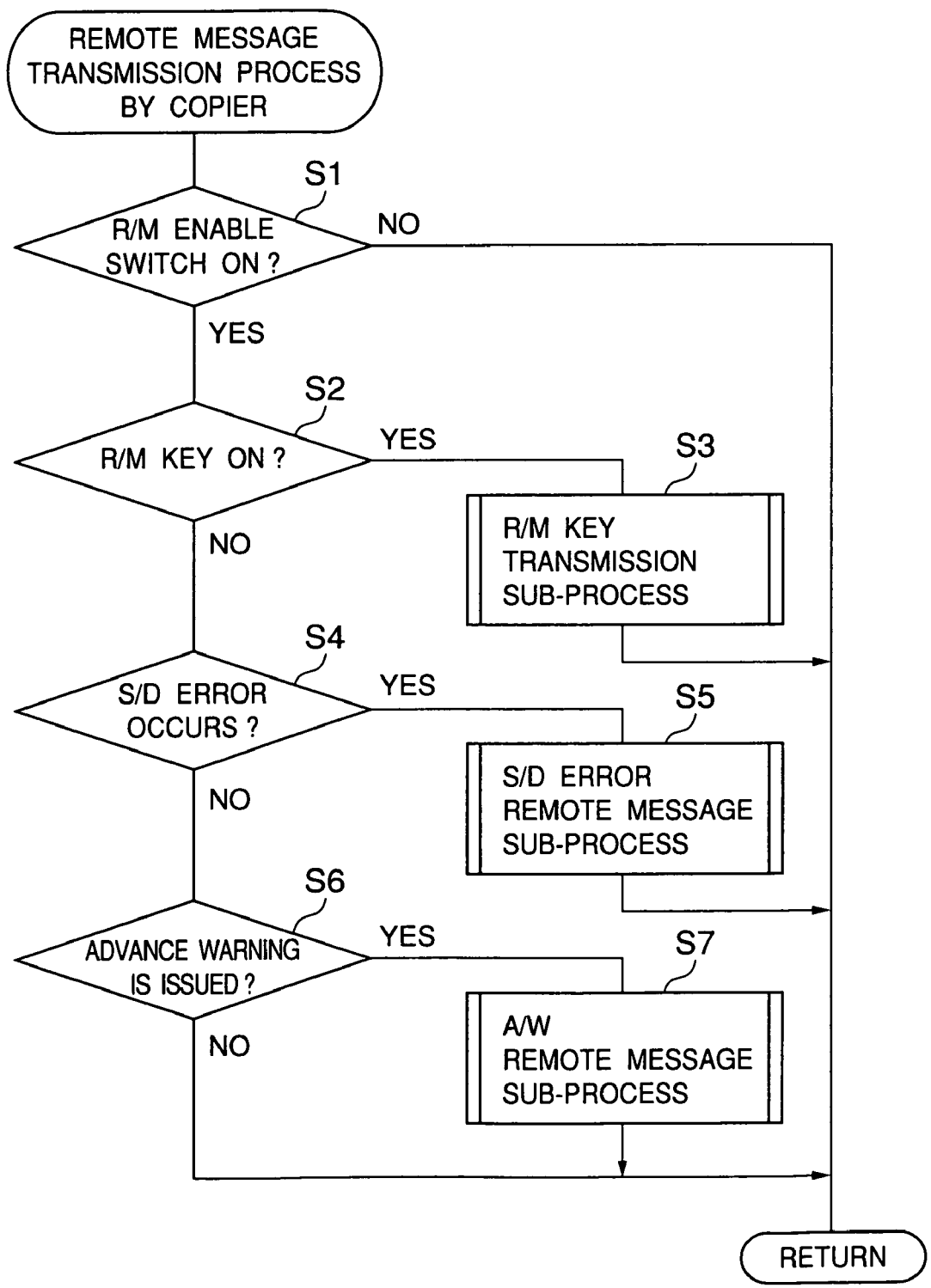
FIG. 16 is a flowchart for explaining a remote message transmission process performed by a control unit of the copier.

FIG. 16 shows a remote message transmission process performed by the CPU 1001 of the copier 100 of FIG. 1 in the first embodiment. As shown in FIG. 16, at the start of the remote message transmission process, the CPU 1001 of the copier 100 at step S1 determines whether the remote message (R/M) enable switch 1032 (FIG. 2) is in its ON state.

When the result at the step S1 is affirmative, the CPU 1001 at step S2 determines whether the remote message key of the operation part 1010 (FIG. 2) is in its ON state. Otherwise, the remote message transmission process of FIG. 16 at the present cycle ends.

When the result at the step S2 is affirmative, the CPU 1001 at step S3 performs a remote message (R/M) key transmission sub-process. The control of the CPU 1001 is transferred to a start of the R/M key transmission sub-process shown in FIG. 17, which will be described below.

When the result at the step S2 is negative, the CPU 1001 at step S4 determines whether a self-diagnostic (S/D) error has occurred. When the result at the step S4 is affirmative, the CPU 1001 at step S5 performs a self-diagnostic (S/D) error remote message sub-process. The control of the CPU 1001 is transferred to a start of the S/D error remote message sub-process shown in FIG. 18, which will be described below.

When the result at the step S4 is negative, the CPU 1001 at step S6 determines whether an advance warning has been issued. When the result at the step S6 is affirmative, the CPU 1001 at step S7 performs an advance warning (A/W) remote message sub-process. The control of the CPU 1001 is transferred to a start of the A/W remote message sub-process shown in FIG. 19, which will be described below. Otherwise, the remote message transmission process of FIG. 16 at the present cycle ends.

Figure 17:
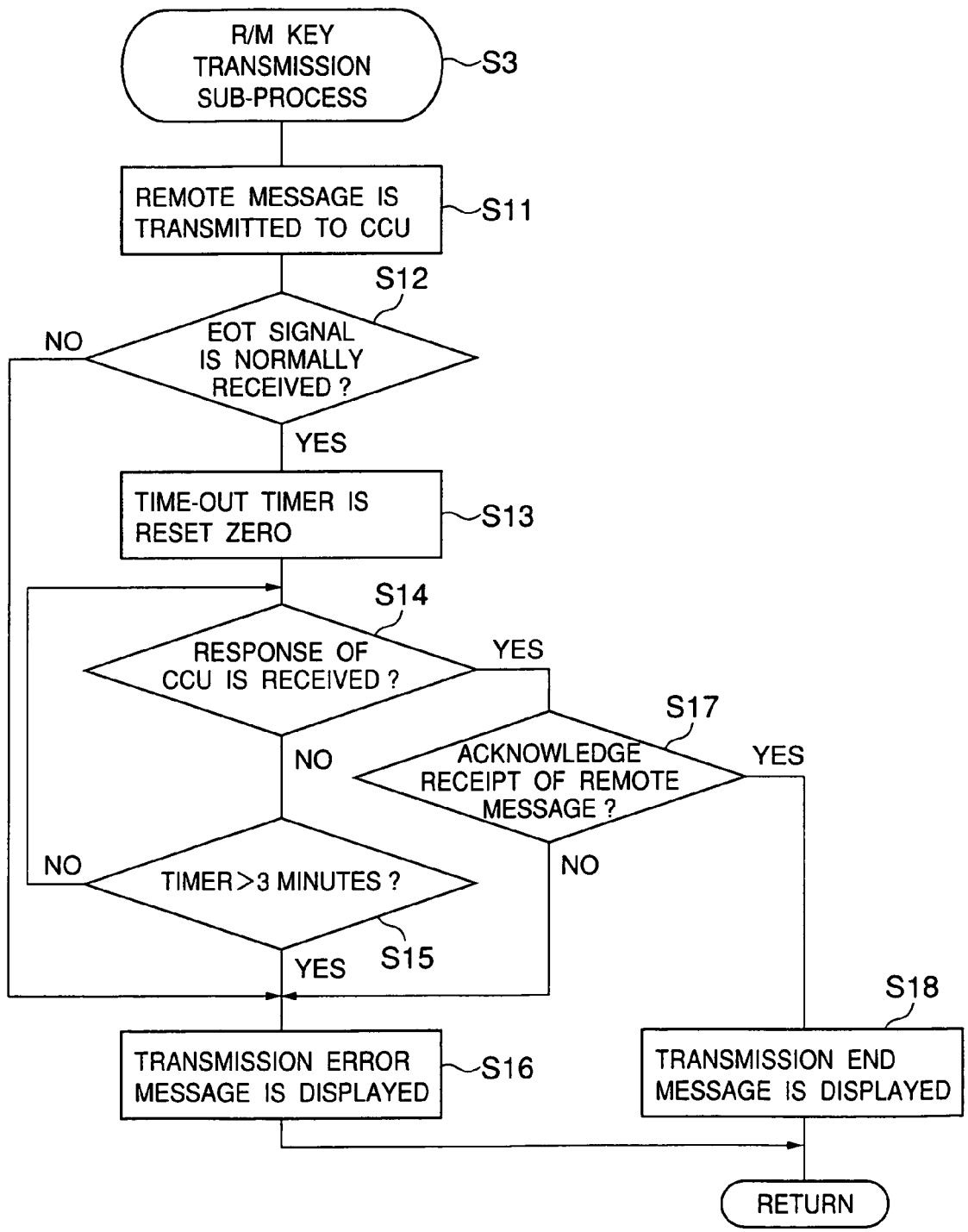
FIG. 17 is a flowchart for explaining a remote message key transmission sub-process in the remote message transmission process of FIG. 16.

FIG. 17 shows a remote message (R/M) key-transmission sub-process in the remote message transmission process of FIG. 16.

As shown in FIG. 17, at the start of the R/M key transmission sub-process, the CPU 1001 at step S11 transmits a remote message to the CCU 200 in response to the ON state of the remote message key. After the step S11 is performed, the CPU 1001 at step S12 determines whether an end-of-transmission (EOT) signal from the CCU 200 is normally received by the copier 100.

When the result at the step S12 is affirmative, the CPU 1001 at step S13 resets a time-out timer to zero. Otherwise the CPU 1001 at step S16 displays a transmission error message on the operation part 1010 and does not perform the step S13.

After the step S13 is performed (or the time-out timer is reset to zero), the CPU 1001 at step S14 determines whether a response message sent by the CCU 200 in reply to the R/M key remote message has been received by the copier 100. The CPU 1001 at step S15 determines whether the time-out timer exceeds a given waiting period (for example, three minutes).

When the result at the step S15 is affirmative (the time-out timer exceeds three minutes), the CPU 1001 performs the above step S16 (in which the transmission error message is displayed). Otherwise the CPU repeats the above step S14.

When the result at the step S14 is affirmative (or the response message of the CCU 200 is received), the CPU 1001 at step S17 determines whether the response message of the CCU 200 indicates an acknowledgement of receipt of the remote message sent to the CCU 200 by the copier 100.

When the result at the step S17 is negative, the CPU 1001 performs the above step S16 (or the transmission error message is displayed on the operation part 1010). On the other hand, when the result at the step S17 is affirmative, the CPU 1001 at step S18 displays a transmission end message for the transmitted remote message on the operation part 1010. After the step S18 is performed, the R/M key transmission sub-process ends.

Figure 18:
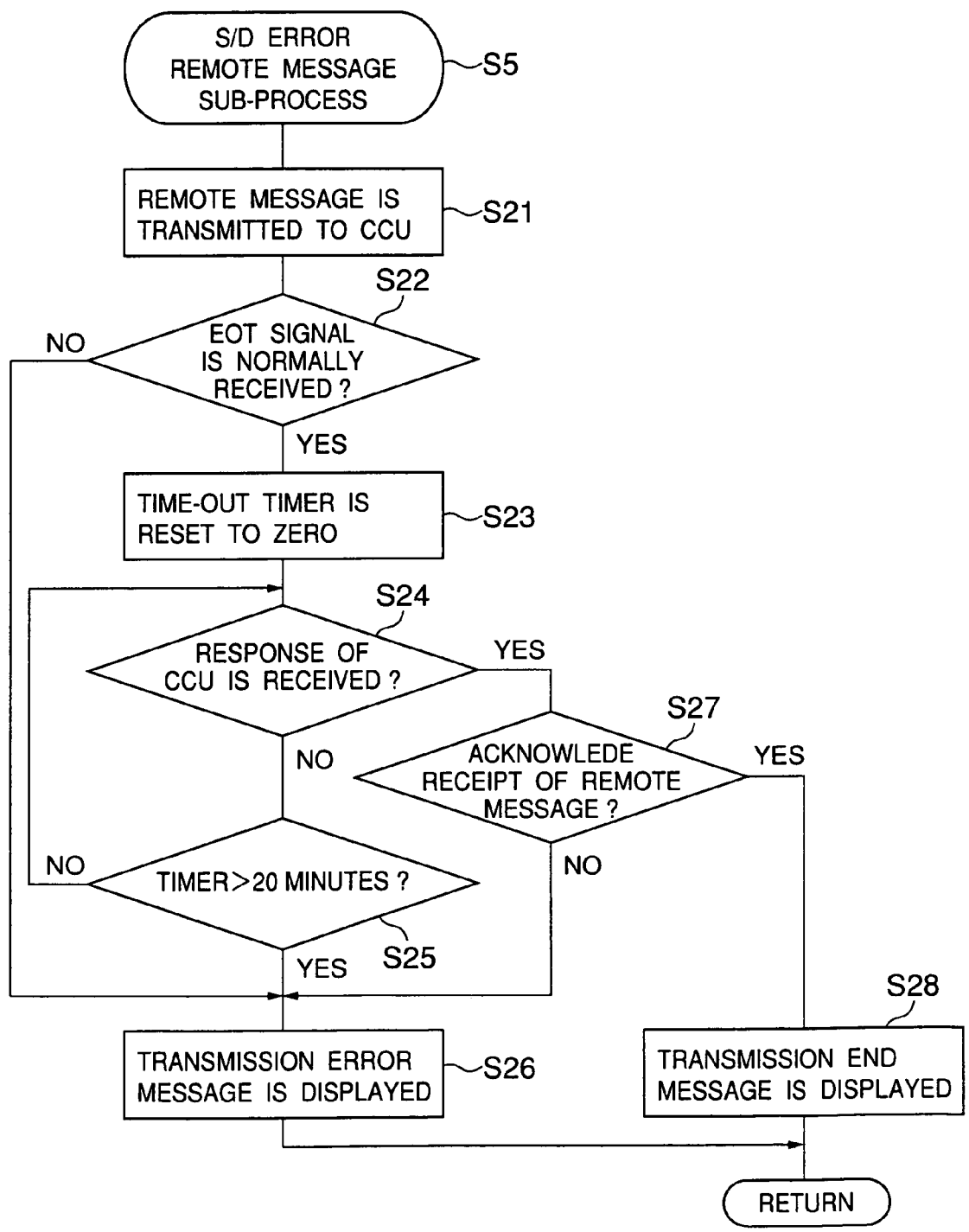
FIG. 18 is a flowchart for explaining a self-diagnostic error remote message sub-process in the remote message transmission process of FIG. 16.

FIG. 18, shows a self-diagnostic (S/D) error remote message sub-process in the remote message transmission process of FIG. 16.

As shown in FIG. 18, at the start, of the S/D error remote message sub-process, the CPU 1001 at step S21 transmits a remote message to the CCU 200 in response to the self-diagnostic error having occurred. After the step S21 is performed, the CPU 1001 at step S22 determines whether an end-of-transmission (EOT) signal from the CCU 200 is normally received by the copier 100.

When the result at the step S22 is affirmative, the CPU 1001 at step S23 resets a time-out timer to zero. Otherwise the CPU 1001 at step S26 displays a transmission error message on the operation part 1010 and does not perform the step S23.

After the step S23 is performed (or the time-out timer is reset to zero), the CPU 1001 at step S24 determines whether a response message sent by the CCU 200 in reply to the S/D error remote message has been received by the copier 100. The CPU 100 at step S25 determines whether the time-out timer exceeds a given waiting period (for example, twenty minutes).

When the result at the step S25 is affirmative (the time-out timer exceeds twenty minutes), the CPU 1001 performs the above-mentioned step S26 (in which the transmission error message is displayed). Otherwise the CPU repeats the step S24.

When the result at the step S24 is affirmative (or the response of the CCU 200 is received), the CPU 1001 at step S27 determines whether the response message of the CCU 200 indicates an acknowledgement of receipt of the remote message sent by the copier 100.

When the result at the step S27 is negative, the CPU 1001 performs the above step S26 (or the transmission error message is displayed on the operation part 1010). On the other hand, when the result at the step S27 is affirmative, the CPU 1001 at step S28 displays a transmission end message for the transmitted remote message on the operation part 1010. After the step S28 is performed, the A/W remote message sub-process ends.

Figure 19:
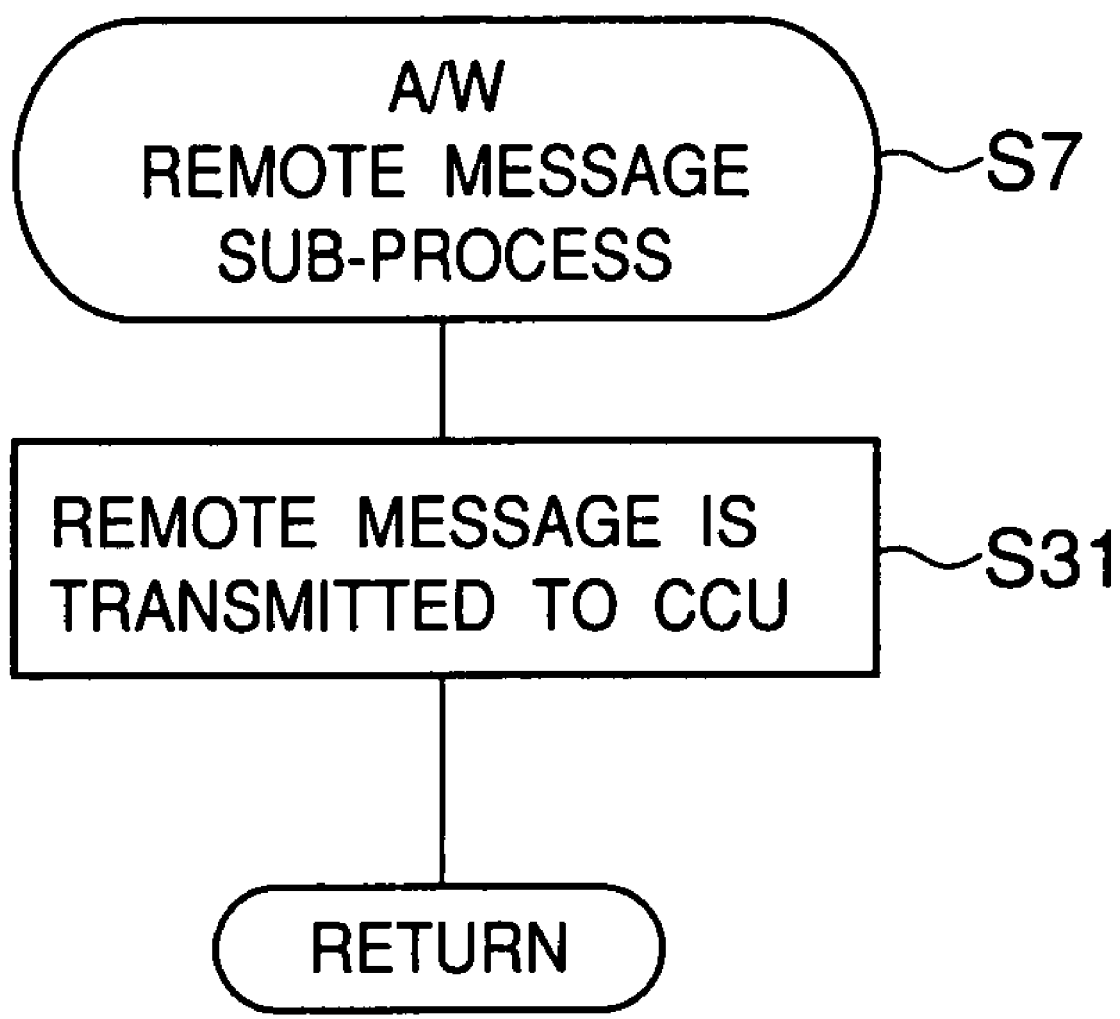
FIG. 19 is a flowchart for explaining an advance warning remote message sub-process in the remote message transmission process of FIG. 16.

FIG. 19 shows an advance warning (A/W) remote message sub-process in the remote message transmission process of FIG. 16.

As shown in FIG. 19, at the start of the A/W remote message sub-process, the CPU 1001 at step S31 transmits a remote message to the CCU 200 in response to the advance warning. After the step S31 is performed, the A/W remote message sub-process of FIG. 19 ends.

1.7.2 Access Request From CCU to Copier

A description will be given of a remote message transmission process performed by the copier 100 when an access request is transmitted to the copier 100.

Figure 20:
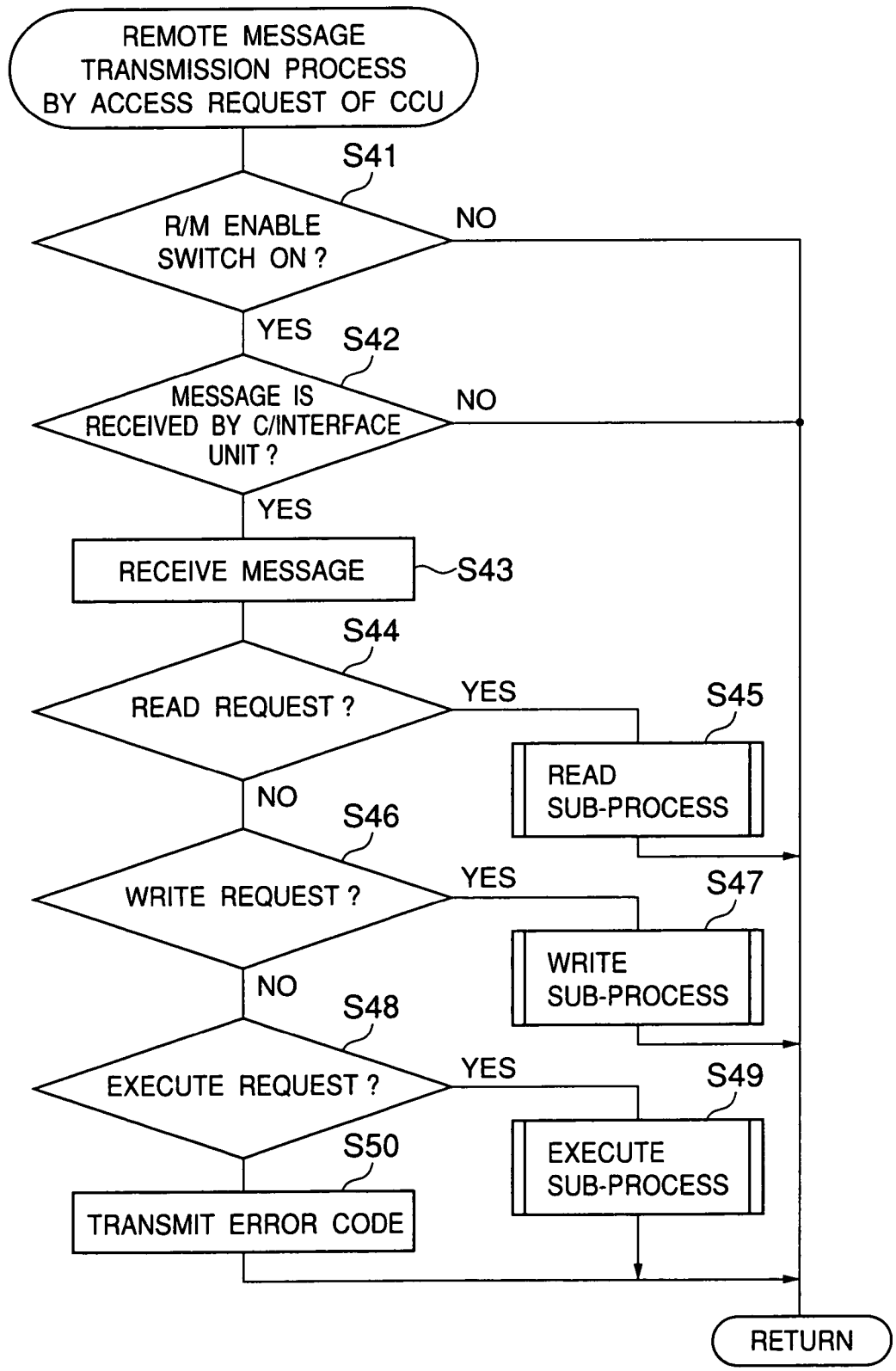
FIG. 20 is a flowchart for explaining a remote message transmission process performed by the control unit of the copier when a request is transmitted to the copier by the CCU.

FIG. 20 shows a remote message transmission process performed by the copier 100 when an access request is sent to the copier 100 by the CCU 200.

As shown in FIG. 20, at the start of the remote message transmission process, the CPU 1001 of the copier 100 at step S41 determines whether the remote message enable switch 1032 (FIG. 2) is in its ON state.

When the result at the step S41 is affirmative (or the switch 1032 is in the ON state), the CPU 1001 at step S42 determines whether the communication interface unit 1004 contains an access request sent to the copier 100 by the CCU 200. Otherwise the CPU 1001 ends the remote message transmission process of FIG. 20 and does not perform the step S42.

When the result at the step S42 is affirmative, the CPU 1001 at step S43 receives the access request contained in the communication interface unit 1004. After the step S43 is performed, the CPU 1001 at step S44 determines whether the received access request is a read request sent to the copier 100 by the CCU 200.

When the result at the step S44 is affirmative, the CPU 1001 at step S45 performs a read sub-process. The control of the CPU 1001 is transferred to a start of the read sub-process shown in FIG. 21, which will be described below.

When the result at the step S44 is negative, the CPU 1001 at step S46 determines whether the received access request is a write request sent to the copier 100 by the CCU 200.

When the result at the step S46 is affirmative, the CPU 1001 at step S47 performs a write sub-process. The control of the CPU 1001 is transferred to a start of the write sub-process shown in FIG. 22, which will be described below.

When the result at the step S46 is negative, the CPU 1001 at step S48 determines whether the received access request is an execute request sent to the copier 100 by the CCU 200.

When the result at the step S48 is affirmative, the CPU 1001 at step S49 performs an execute sub-process. The control of the CPU 1001 is transferred to a start of the execute sub-process shown in FIG. 23, which will be described below. Otherwise it is determined that the received access request does not match any request code, and the CPU 1001 at step S50 transmits an error code from the copier 100 to the CCU 200. After the step S50 is performed, the remote message transmission process of FIG. 20 at the present cycle ends.

Figure 21:
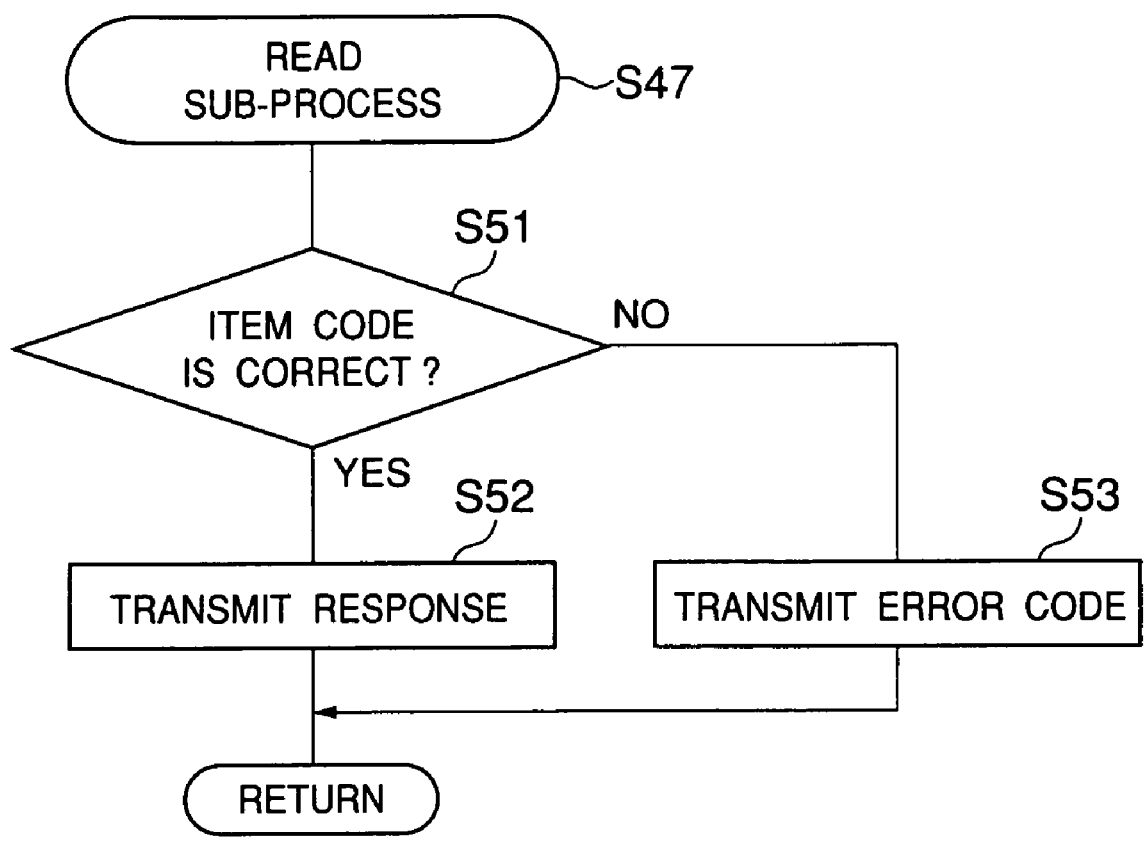
FIG. 21 is a flowchart for explaining a read sub-process in the remote message transmission process of FIG. 20.

FIG. 21 shows a read sub-process in the remote message transmission process of FIG. 20.

As shown in FIG. 21, at the start of the read sub-process, the CPU 1001 at step S51 determines whether the item code of the received request correctly matches a predetermined code. When the result at the step S51 is affirmative, the CPU 1001 at step S52 transmits a response to the received request to the CCU 200. On the other hand, when the result at the step S51 is negative, it is determined that the item code of the received request does not match the predetermined code, and the CPU 1001 at step S53 transmits an error code to the CCU 200.

After the step S52 or the step S53 is performed, the read sub-process at the present cycle ends.

Figure 22:
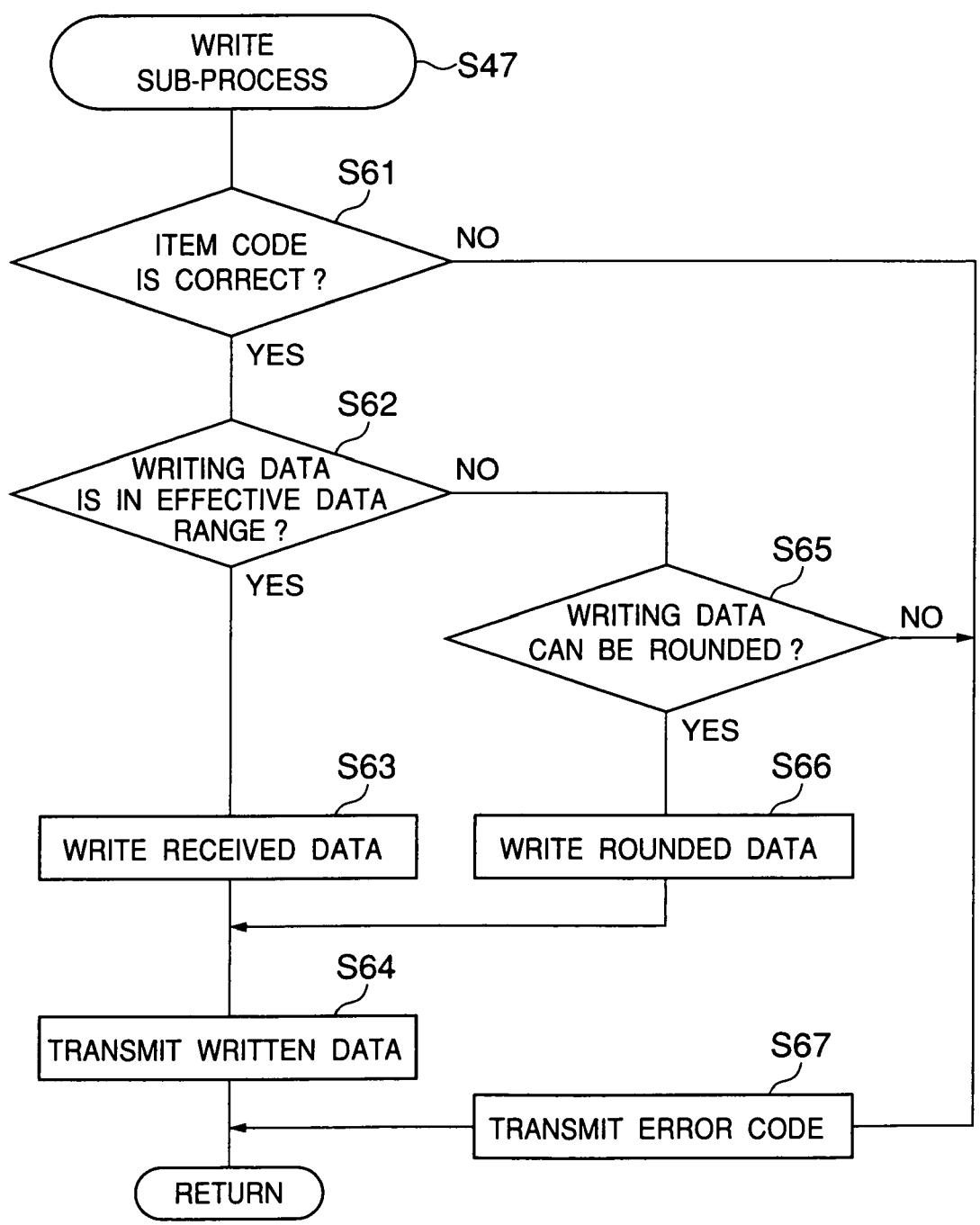
FIG. 22 is a flowchart for explaining a write sub-process in the remote message transmission process of FIG. 20.

FIG. 22 shows a write sub-process in the remote message transmission process of FIG. 20.

As shown in FIG. 22, at the start of the write sub-process, the CPU 1001 at step S61 determines whether the item code of the received write request correctly matches a predetermined code. When the result at the step S61 is affirmative, the CPU 1001 at step S62 determines whether the writing data of the received write request is in an effective data range of the copier 100.

When the result at the step S62 is affirmative, the CPU 1001 at step S63 writes the writing data of the received write request to the copier 100. After the step S63 is performed, the CPU 1001 at step S64 transmits a response, including the written data, to the CCU 200. After the step S64 is performed, the CPU 1001 ends the write sub-process of FIG. 22.

When the result at the step S62 is negative, the CPU 1001 at step S65 determines whether the writing data of the received write request can be rounded within the effective data range of the copier 100.

When the result at the step S65 is affirmative, the CPU 1001 at step S66 writes the rounded writing data to the copier 100. After the step S66 is performed, the CPU 1001 performs the above step S64. On the other hand, when the result at the step S65 is negative, the CPU 1001 at step S67 transmits an error code to the CCU 200. After the step S67 is performed, the CUP 1001 ends the write sub-process of FIG. 22.

Figure 23:
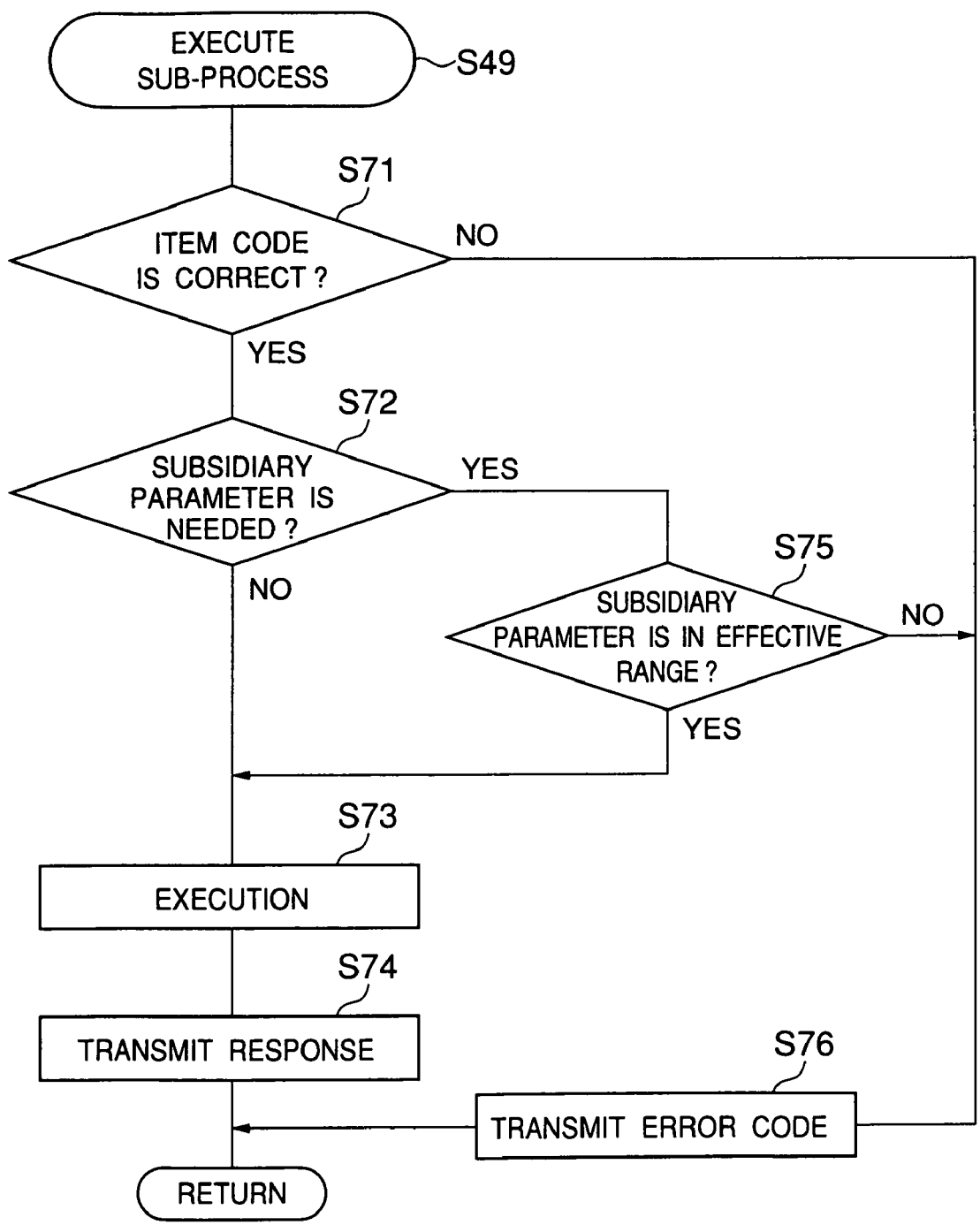
FIG. 23 is a flowchart for explaining an execute sub-process in the remote message transmission process of FIG. 20.

FIG. 23 shows an execute sub-process in the remote message transmission process of FIG. 20.

As shown in FIG. 23, at the start of the execute sub-process, the CPU 1001 at step S71 determines whether the item code of the received execute request correctly matches a predetermined code. When the result at the step S71 is negative, the CPU 1001 at step S76 transmits an error code to the CCU 200. On the other hand, when the result at the step S71 is affirmative, the CPU 1001 at step S72 determines whether the received-execute request needs a subsidiary parameter.

When the result at the step S72 is negative, the CPU 1001 at step S73 executes an operation on the copier 100 in accordance with the received execute request. After the step S73 is performed, the CPU 1001 at step S74 transmits a response, including the execution result, to the CCU 200 from the copier 100. After the step S74 is performed, the CPU 1001 ends the execute sub-process of FIG. 23.

When the result at the step S72 is affirmative, the CPU 1001 at step S75 determines whether the subsidiary parameter of the received request is in an effective range of the copier 100.

When the result at the step S75 is affirmative, the CPU 1001 performs the above steps S73 and S74. On the other hand, when the result at the step S75 is negative, the CPU 1001 performs the above step S76 in which an error code is transmitted to the CCU 200. After the step S76 is performed, the CPU 1001 ends the execute sub-process of FIG. 23.

1.7.3 Communication Sequences of CCU and Copier

Figure 24:
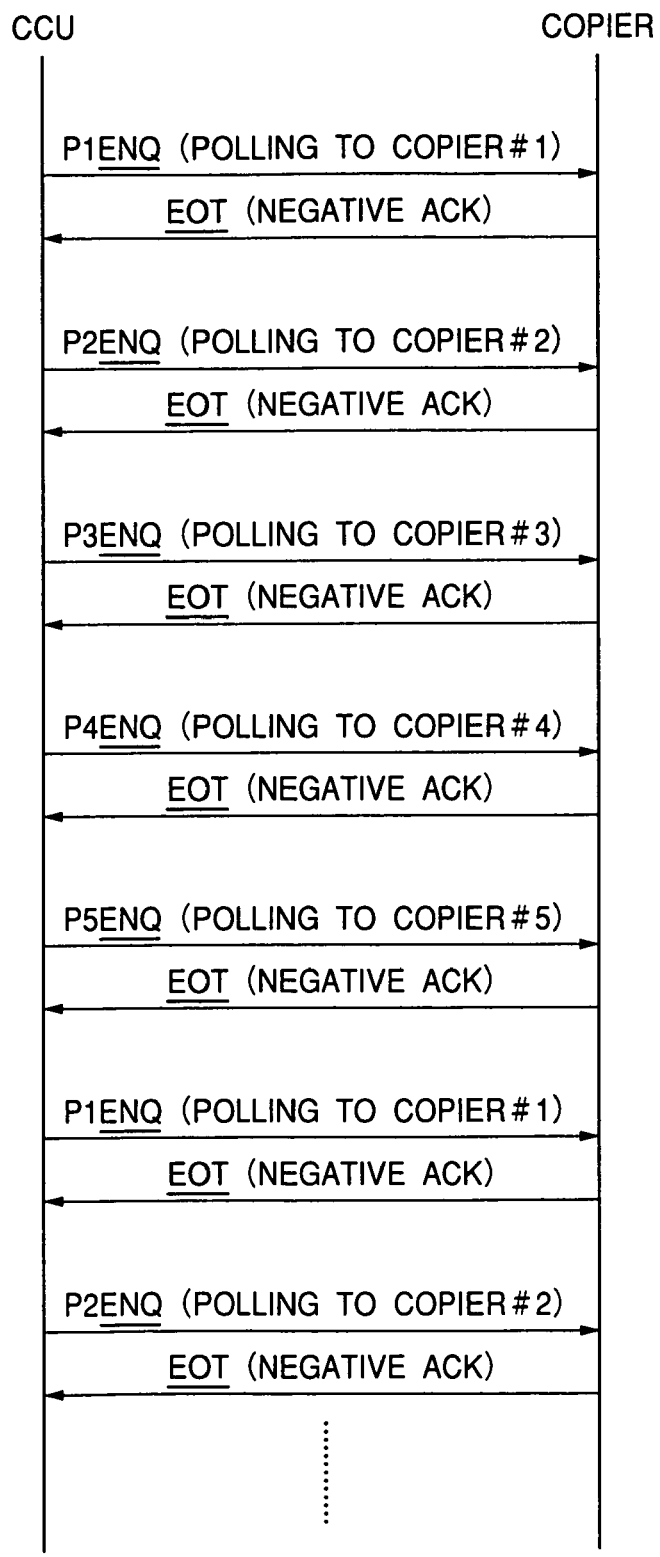
FIG. 24 is a diagram for explaining a communication sequence of the CCU and the copier during an idle condition.

FIG. 24 shows a communication sequence of the CCU 200 and the copier 100 during an idle condition. Suppose that the five copiers 100 are connected to the CCU 200, and the copiers 100 and the CCU 200 are in the idle condition.

As shown in FIG. 24, a polling (ENQ) of the CCU 100 to a specific one of the copiers 100 is sequentially performed for all the copiers 100 by using a polling address of the specific one of the copiers 100. If there is no message which should be transmitted to the CCU 200, each of the copiers 100 sends back a negative acknowledgement (EOT) to the CCU 200 in response to the polling. If the EOT signal is received from all the copiers 100, the CCU 200 repeats the polling process.

Figure 25:
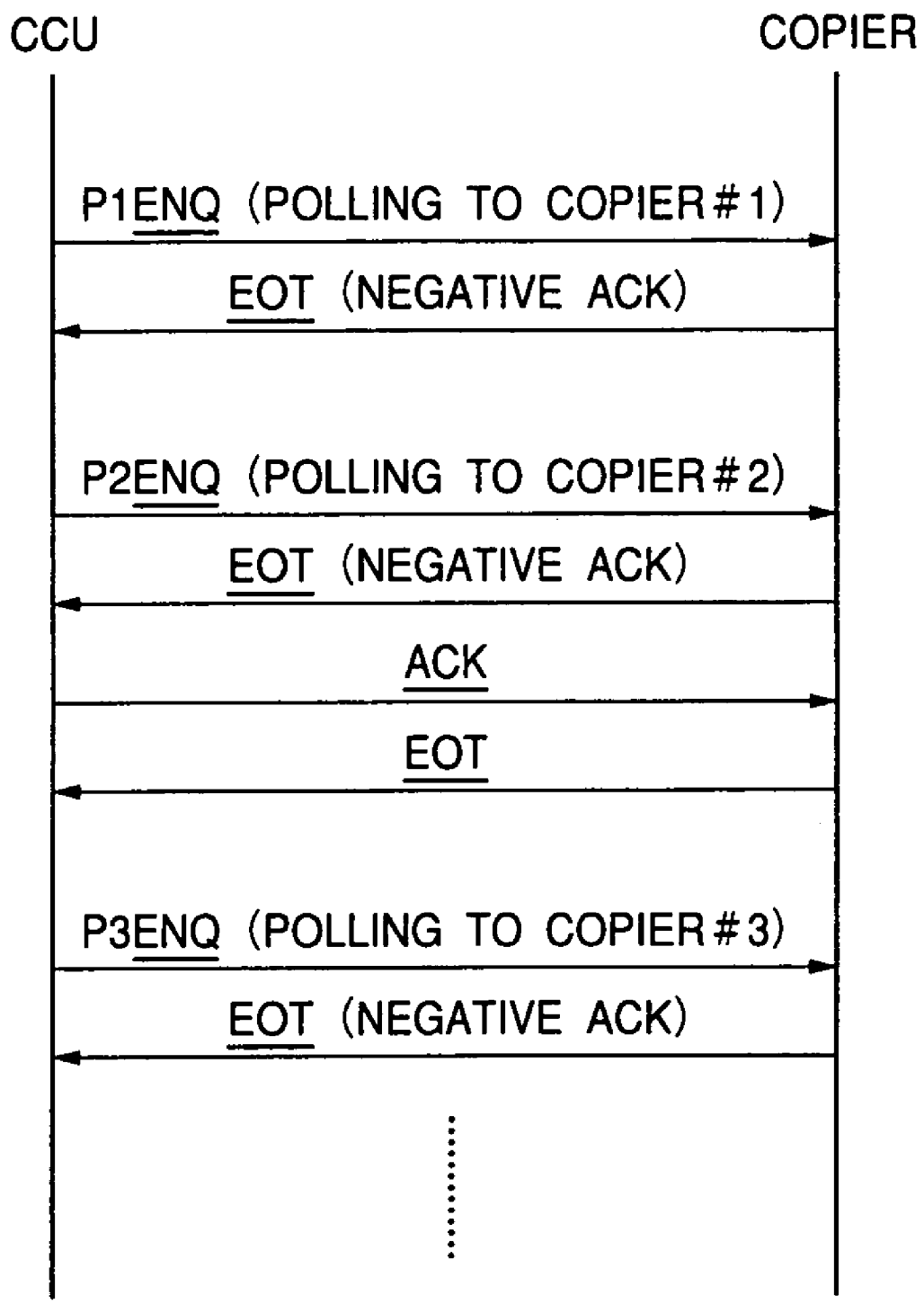
FIG. 25 is a diagram for explaining a communication sequence of the CCU and the copier during a remote message transmission.

FIG. 25 shows a communication sequence of the CCU 200 and the copier 100 during a remote message transmission. Suppose that there is a remote message which should be transmitted from the copier#2 100 to the CCU 200, and the copier#2 100 has a polling address "2".

As shown in FIG. 25, after the polling (P2ENQ) of the CCU 200 to the copier#2 is performed by using the polling address "2", the copier#2 transmits the message through the RS-485 interface 205 to the CCU 200. After the transmission of the message, the CCU 200 transmits an acknowledgment (ACK) to the copier#2 at the polling address "2". After the ACK signal is received, the copier#2 transmits the EOT signal to the CCU 200.

Figure 26:
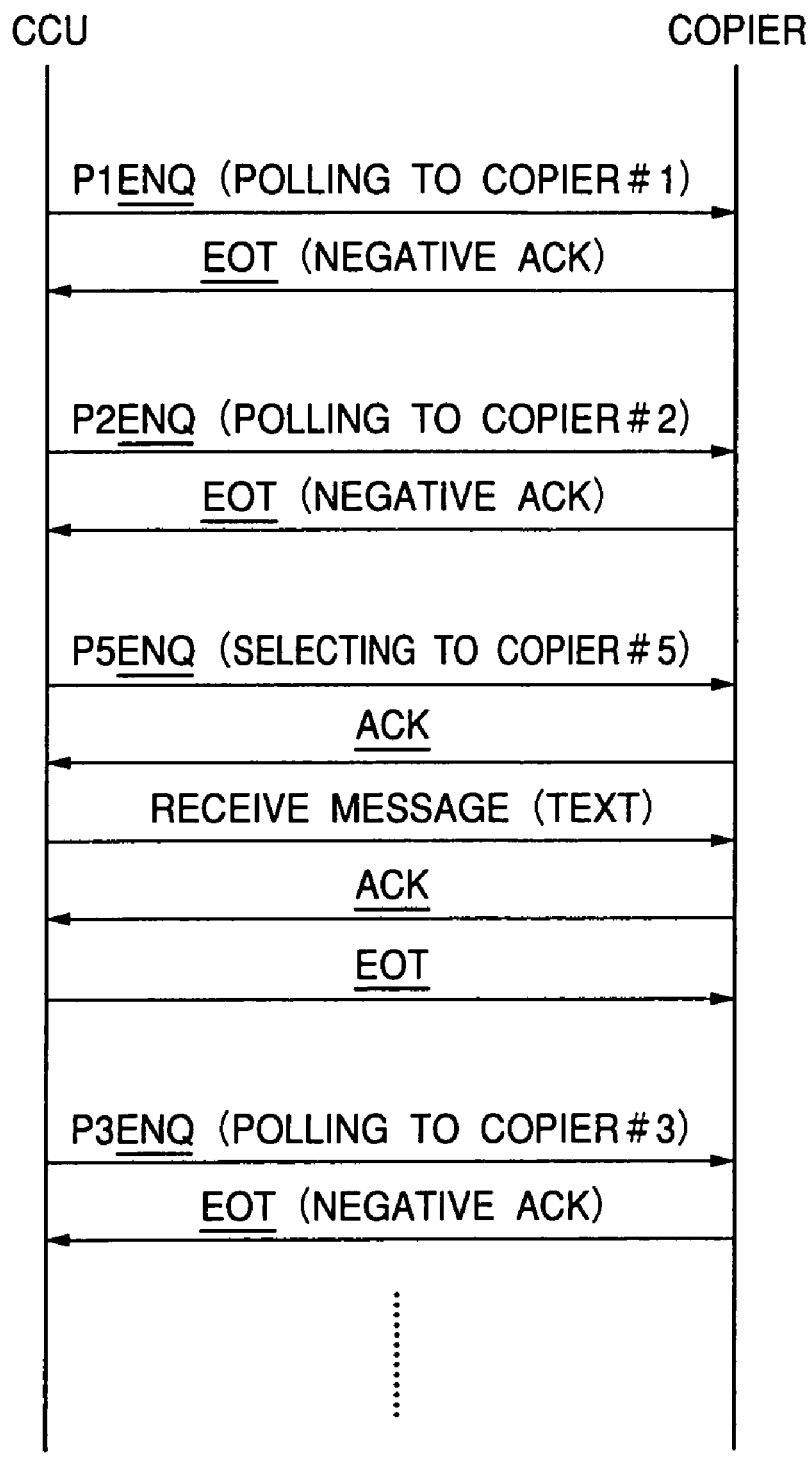
FIG. 26 is a diagram for explaining a communication sequence of the CCU and the copier during a remote message receiving.

FIG. 26 shows a communication sequence of the CCU 200 and the copier 100 during a remote message receiving. Suppose that there is a transmission result message which should be transmitted from the CCU 200 to the copier#5 100, and the copier#5 100 has a selecting address "5".

As shown in FIG. 26, after the polling process for all the copiers 100 is terminated by the CCU 200, a selecting (P5ENQ) of the CCU 200 to the copier#5 100 is performed by using the selecting address "5". After the selecting is performed, the copier#5 100 at the selecting address "5" transmits an acknowledgement (ACK) to the CCU 200. The CCU-200 transmits the transmission result message-through the RS-485 interface 205 to the copier#5 100 at the selecting address "5". After the transmission of the message, the copier#5 100 at the selecting address "5" transmits an acknowledgment (ACK) to the CCU 200. After the ACK signal is received, the CCU 200 transmits the EOT signal to the copier#5 100 at the selecting address "5". Then, the control of the CCU 200 is transferred to the polling process.

Figure 27:
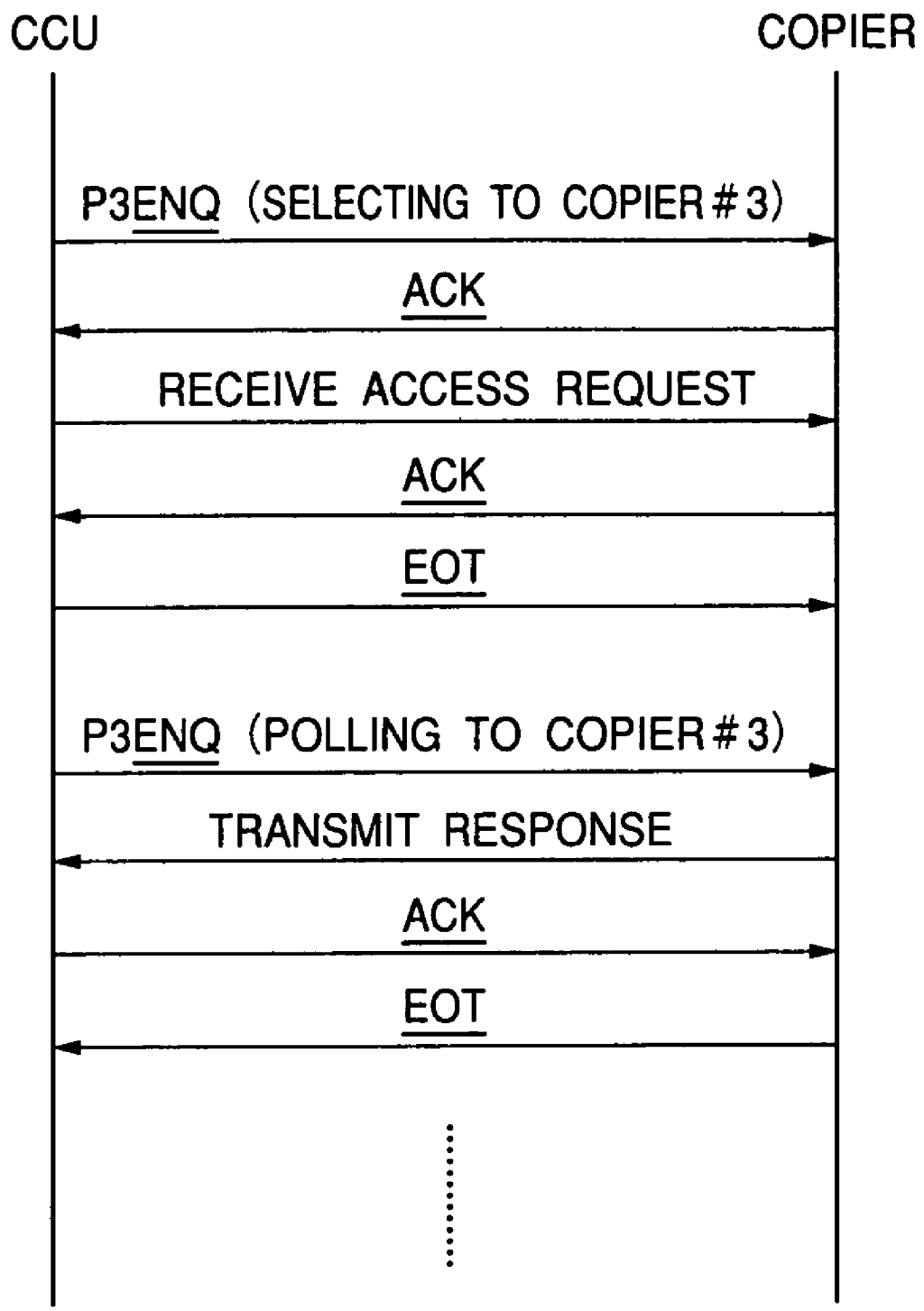
FIG. 27 is a diagram for explaining a communication sequence of the CCU and the copier when an access request is transmitted to the copier.

FIG. 27 shows a communication sequence of the CCU 200 and the copier 100 when an access request is transmitted to the copier 100 by the CCU 200 (or by the CSS 300). Suppose that the access request is transmitted to the copier#3 100 by the CCU 200 or the CSS 300, and the copier#3 100 has a selecting address "3".

As shown in FIG. 27, after the selecting (P3ENQ) of the CCU 200 to the copier#3 100 is performed by using the selecting address "3", the copier#3 100 at the selecting address "3" transmits an acknowledgement (ACK) to the CCU 200. The CCU 200 transmits the access request (which is one of a read request, a write request and an execute request) through the RS-485 interface 205 to the copier#3 100 at the selecting address "3". After the transmission of the access request, the copier#3 100 at the selecting address "3" transmits an acknowledgment (ACK) to the CCU 200. After the ACK signal is received, the CCU 200 transmits the EOT signal to the copier#3 100 at the selecting address "3". Then, the control of the CCU 200 is transferred to the polling process for the copier#3 100 at the address "3".

Figure 28:
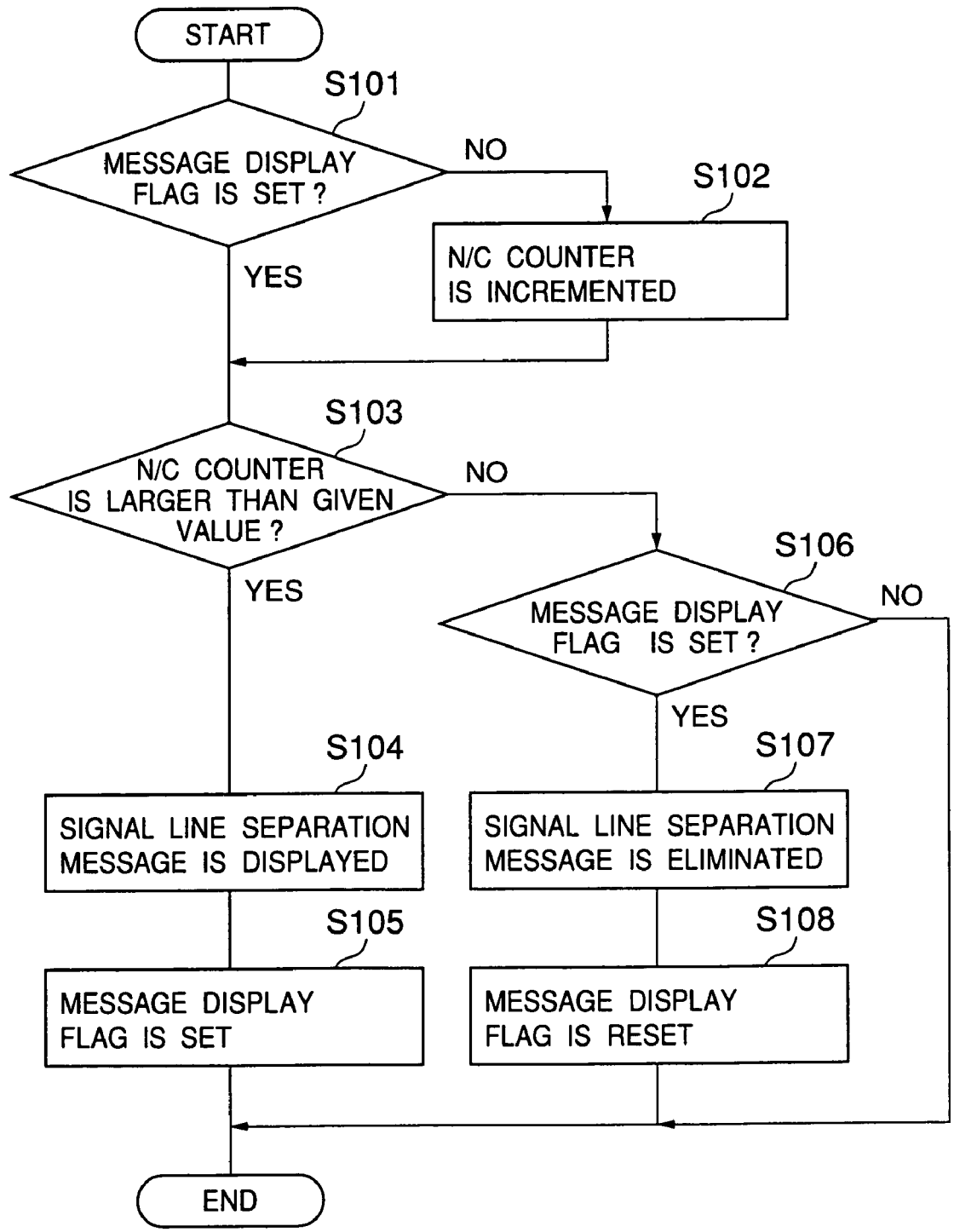
FIG. 28 is a flowchart for explaining a signal line separation message process performed by the copier in a first embodiment of the image forming device management system.

1.8 Signal Line Separation Message Process 1.8.1 No-Communication Counter Method FIG. 28 shows a signal line separation message process performed by the copier 100 in a first embodiment of the image forming device management system of the present invention. The signal line separation message process of FIG. 28 utilizes a no-communication (N/C) counter in the CPU 1001 of the copier 100.

In the present embodiment, the polling of the CSS 300 for the copiers 100 is periodically performed. The period of performing the polling process is, for example, once for 24 hours or less. Further, in the present embodiment, the signal line separation message process of FIG. 28 is periodically initiated by the CPU 1001 by using a timer.

As shown in FIG. 28, the CPU 1001 at step S101 determines whether a message display flag is set to "1" (or ON state). When the result at the step S101 is affirmative, the CPU 101 at step S103 determines whether the N/C counter is larger than a given value.

On the other hand, when the result at the step S101 is negative, the CPU 101 at step S102 increments the N/C counter. After the step S102 is performed, the CPU 101 performs the above step S103.

When the result at the step S103 is affirmative (or the N/C counter>the given value), the CPU 1001 at step S104 displays a signal line separation message on the operation part 1010. The signal line separation message indicates to the user of the copier 100 that a separation of the signal line between the CCU 200 and the copier 100 occurs. After the step S104 is performed, the CPU 1001 at step S105 sets the message display flag to "1". After the step S105 is performed, the signal line separation message process of FIG. 28 ends.

On the other hand, when the result at the step S103 is negative (or the N/C counter<the given value), the CPU 1001 at step S106 determines whether the message display flag is set to "1". When the result at the step S106 is affirmative, the CPU 101 at step S107 eliminates the signal line separation message from the operation part 1010. After the step S107 is performed, the CPU 1001 at step S108 resets the message display flag to "0" (or OFF state). After the step S108 is performed, the signal line separation message process of FIG. 28 ends.

On the other hand, when the result at the step S106 is negative, the CPU 101 ends the signal line separation message process of FIG. 28 and does not performs the above steps S107 and S108.

Figure 29:
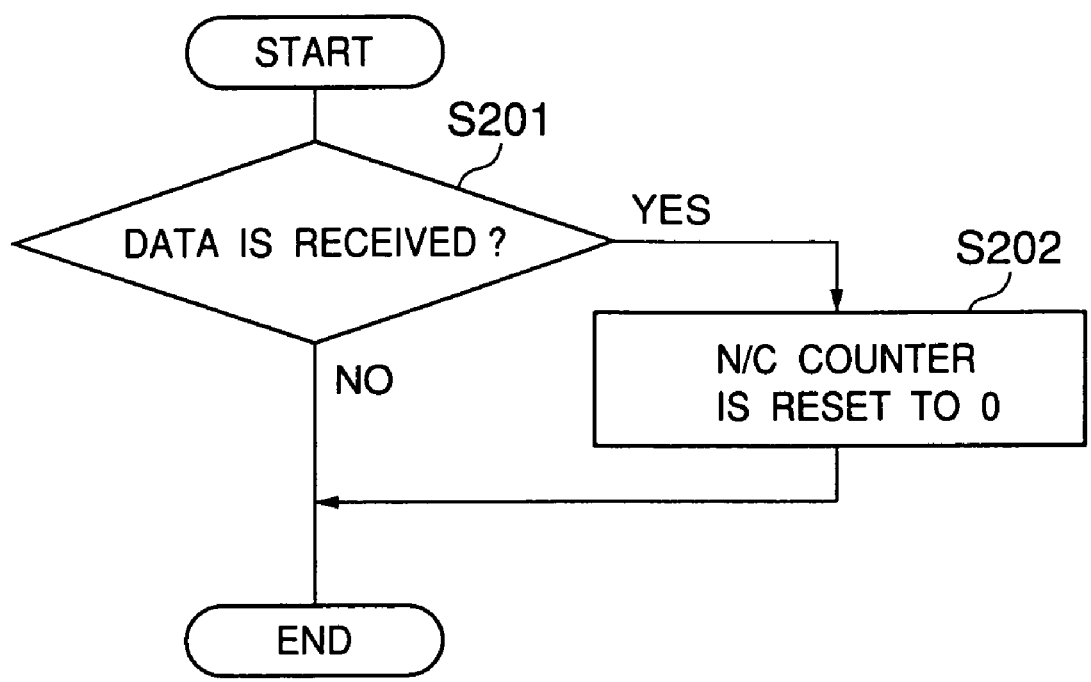
FIG. 29 is a flowchart for explaining a no-communication counter resetting process performed by the copier in the first embodiment.

FIG. 29 shows a no-communication counter resetting process performed by the copier 100 in the first embodiment. In the present embodiment, the no-communication counter resetting process of FIG. 29 is periodically initiated by the CPU 1001 by using a timer.

As shown in FIG. 29, the CPU 1001 at step S201 determines whether data sent from the CSS 300 or the CCU 200 is received by the communication interface unit 1004. When the result at the step S201 is affirmative, the CPU

1001 at step S202 resets the N/C counter to "0". After the step S202 is performed, the no-communication counter resetting process of FIG. 29 ends. When the result at the step S201 is negative, the CPU 1001 ends the no-communication counter resetting process of FIG. 28, and does not perform the above step S202.

1.8.2 CCU Selecting Method

In the signal line separation message process of FIG. 28, the period of time during which the copier 100 has no signal from the CCU 200 or the CSS 300 is detected by using the no-communication (N/C) counter. Alternatively, the signal line separation message process may be performed by using a different method.

Figure 30:
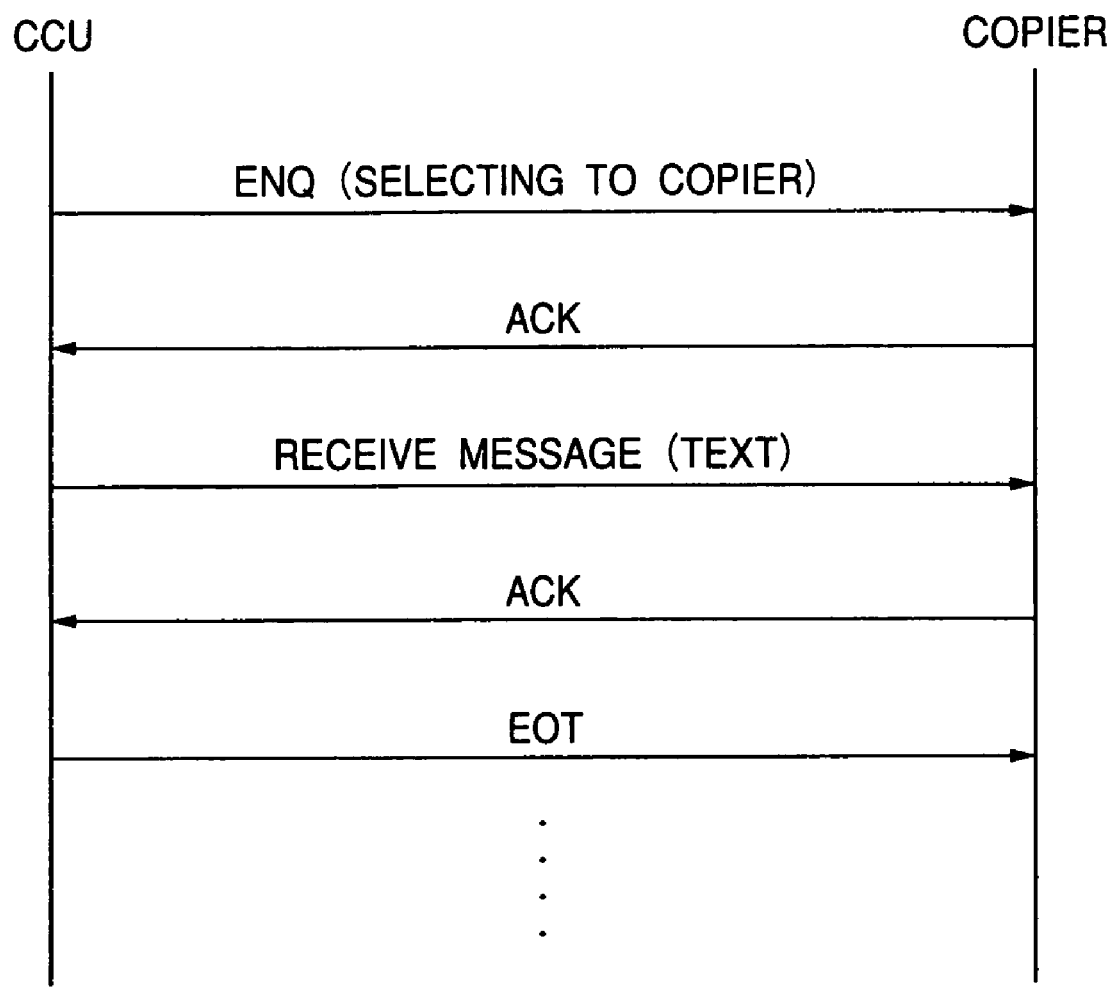
FIG. 30 is a diagram for explaining a communication sequence of the CCU and the copier when the signal line separation message process utilizes a selecting of the CCU to the copier.

FIG. 30 shows a communication sequence of the CCU 200 and the copier 100 when a signal line separation message process is performed by using a selecting of the CCU 200 to the copiers 100.

In the present embodiment, the selecting of the CCU 200 to the copier 100 (or one of the copiers 100) is periodically performed. The period of performing the selecting process is, for example, once for 24 hours or less. In the present embodiment, the signal line separation process is performed by using the selecting of the CCU 200 to the copier 100.

As shown in FIG. 30, the selecting (ENQ) is periodically transmitted from the CCU 200 to the copier 100 once for 24 hours or less. If there is a data link between the CCU 200 and the copier 100 is established at that time, the copier 100 transmits an acknowledgement (ACK) to the CCU 200 in response to the selecting (ENQ). After the ACK signal is received by the CCU 200, the CCU 200 transmits a message to the copier 100. After the message is received by the copier 100, the copier 100 transmits an acknowledgment (ACK) to the CCU 200. Further, after the ACK signal is received by the CCU 200, the CCU 200 transmits an EOT signal to the copier 100. When the EOT signal is received by the copier 100, the selecting process is normally terminated.

Accordingly, in the present embodiment, when all the conditions for the above-mentioned selecting process are met, it is determined that the copier 100 normally communicates with the CCU 200. In this case, the CPU 1001 performs only the steps S106–S108 of the signal line separation message process of FIG. 28. When any of the conditions for the above-mentioned selecting process is not met, it is determined that the copier 100 has no signal from the CCU 200. In this case, the CPU 1001 performs only the steps S104 and S105 of the signal line separation message process of FIG. 28.

1.8.3 CSS Selecting Method

Figure 31:
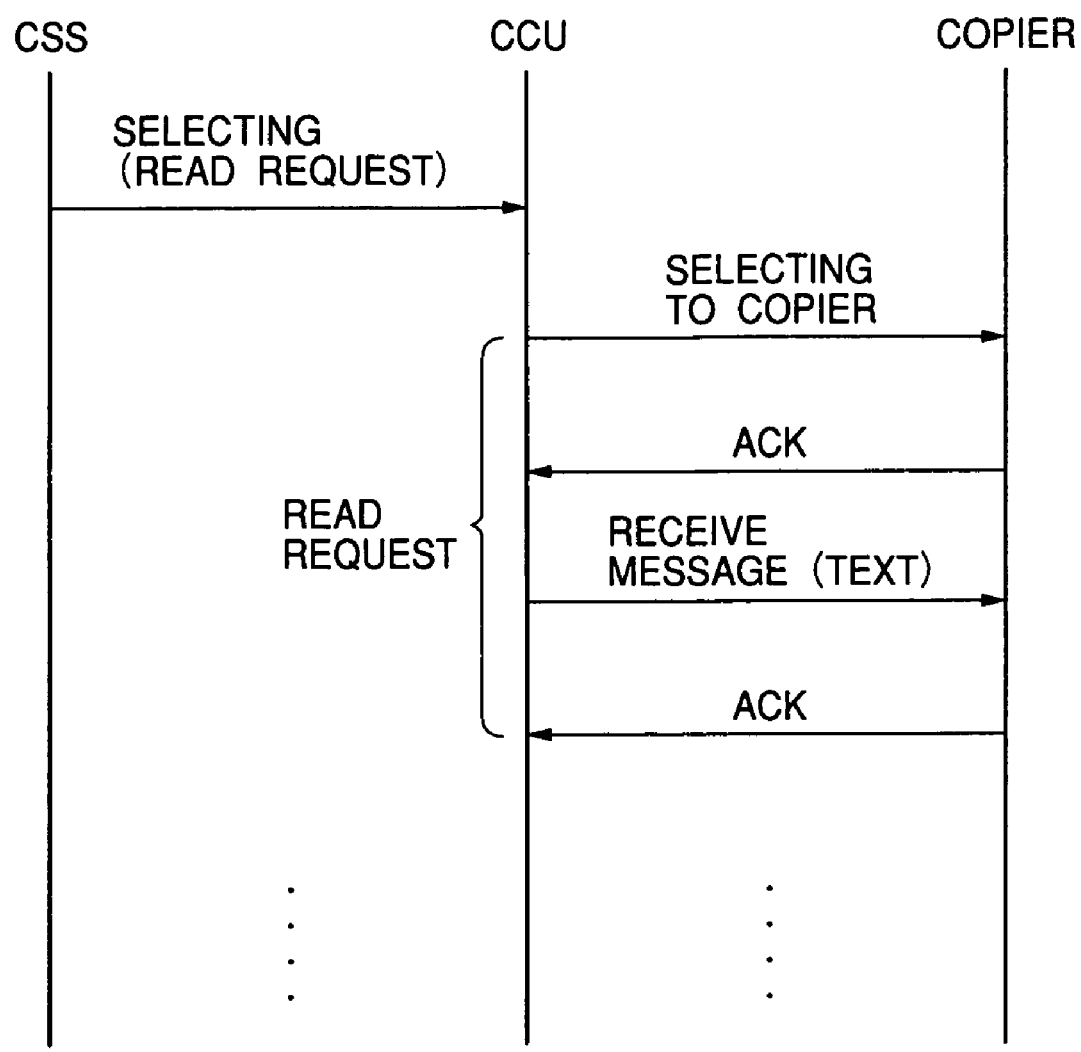
FIG. 31 is a diagram for explaining a communication sequence of the CSS and the copier when the signal line separation message process utilizes a selecting of the CSS to the copier.

FIG. 31 shows a communication sequence of the CSS 300 and the copier 100 when a signal line separation message process is performed by using a selecting of the CSS 300 to the copier 100.

In the present embodiment, the selecting of the CSS 300 to the copier 100 is performed when an access request is transmitted to the copier 100. In the present embodiment, the signal line separation process is performed by using the selecting of the CSS 300 to the copier 100.

As shown in FIG. 31, the selecting of the CSS 300 is transmitted through the CCU 200 to the copier 100 before transmitting an access request to the copier 100. If there is a data link between the CCU 200 and the copier 100 is established at that time, the copier 100 transmits an acknowledgement (ACK) to the CCU 200 in response to the selecting. After the ACK signal is received by the CCU 200, the CCU 200 transmits the access request (or the message) to the copier 100. After the message is received by the copier 100, the copier 100 transmits an acknowledgment (ACK) to the CCU 200. Then, the selecting of the CSS 300 to the copier 100 is normally terminated.

Accordingly, in the present embodiment, when all the conditions for the above-mentioned selecting process are met, it is determined that the copier 100 normally communicates with the CCU 200. In this case, the CPU 1001 performs only the steps S106–S108 of the signal line separation message process of FIG. 28. When any of the conditions for the above-mentioned selecting process is not met, it is determined that the copier 100 has no signal from the CCU 200. In this case, the CPU 1001 performs only the steps S104 and S105 of the signal line separation message process of FIG. 28.

1.8.4 CCU Polling Method

Figure 32:
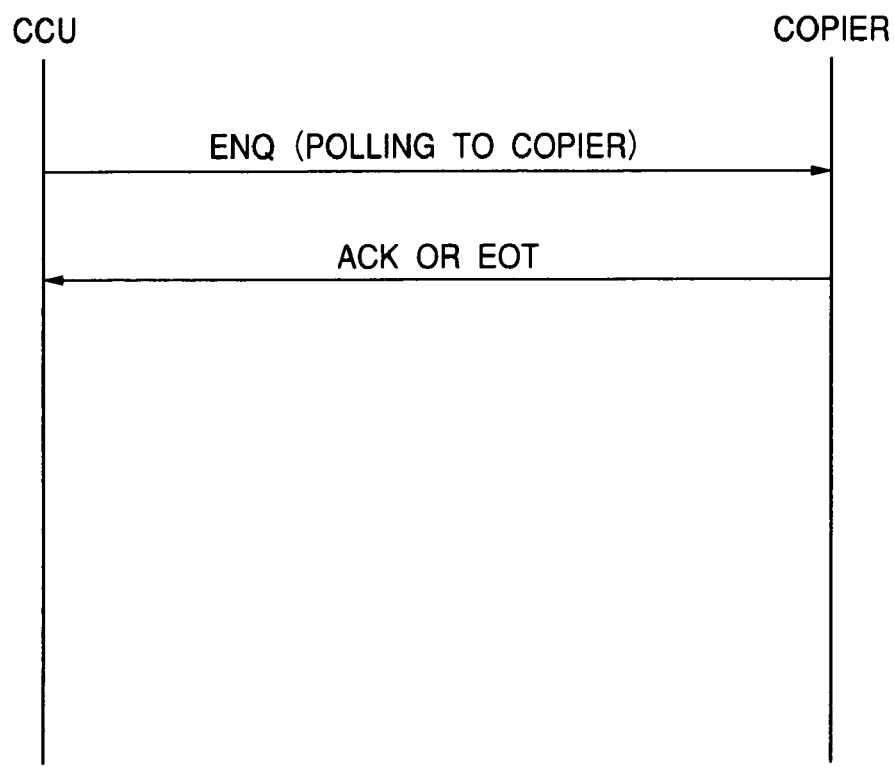
FIG. 32 is a diagram for explaining a communication sequence of the CCU and the copier when the signal line separation message process utilizes a polling of the CCU to the copier.

FIG. 32 shows a communication sequence of the CCU 200 and the copier 100 when a signal line separation message process is performed by using a polling of the CCU 200 to the copiers 100.

In the present embodiment, the polling of the CCU 200 to the copiers 100 is periodically performed. The period of performing the polling process is, for example, once for one minute. In the present embodiment, the signal line separation process is performed by using the polling of the CCU 200 to the copiers 100.

As shown in FIG. 32, the polling (ENQ) is transmitted from the CCU 200 to one of the copiers 100. If there is a data link between the CCU 200 and the copier 100 is established at that time, the ENQ signal from the CCU 200 is received by the copier 100. In response to the polling (ENQ), the copier 100 transmits an acknowledgement (ACK) or an end-of-transmission (EOT) to the CCU 200. When the ACK or EOT signal is received by the CCU 200, the polling process is normally terminated.

Accordingly, in the present embodiment, when the condition for the above-mentioned polling process is met, it is determined that the copier 100 normally communicates with the CCU 200. In this case, the CPU 1001 performs only the steps S106–S108 of the signal line separation message process of FIG. 28. When the condition for the above-mentioned polling process is not met, it is determined that the copier 100 has no signal from the CCU 200. In this case, the CPU 1001 performs only the steps S104 and S105 of the signal line separation message process of FIG. 28.

1.8.5 Detection of Voltage of Terminal of Communication Interface Unit

Figure 33:
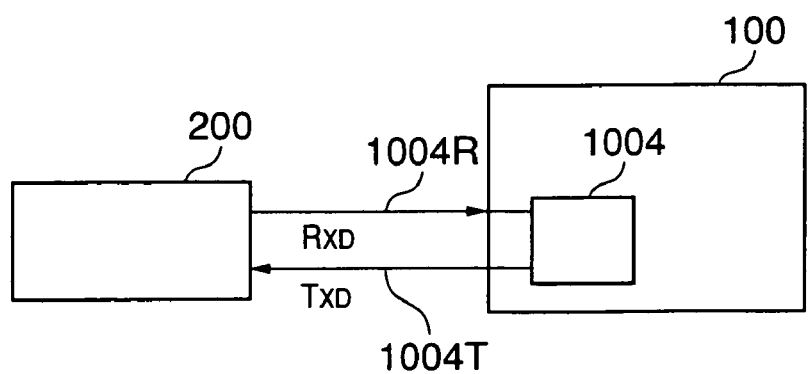
FIG. 33 is a diagram for explaining a signal line separation message process utilizing a detection of a voltage of a terminal of a communication interface unit of the copier.

FIG. 33 is a diagram for explaining a signal line separation message process which is performed by using a detection of a voltage of a receiving terminal 100R of the communication interface unit 1004 of the copier 100.

In the image forming device management system of the present embodiment, the data communication between the CCU 200 and the copier 100 is carried out through a communication line, and the communication line is connected to the communication interface unit 1004 of the copier 100 as shown in FIG. 2. A transmitting signal on the communication line is input to or output from the communication interface unit 1004 of the copier 100. Hence, by detecting a voltage of a receiving terminal of the communication interface unit 1004, it is possible to determine whether the copier 100 has a signal from the CCU 200. For example, when the voltage of the receiving terminal does not change over 10 minutes, it is determined that a separation of the signal line between the CCU 200 and the copier 100 occurs.

As shown in FIG. 33, a receiving signal line 1004R and a transmitting signal line 1004T are connected at one end to the receiving terminal and a transmitting terminal of the communication interface unit 1004 of the copier 100. The signal lines 1004R and 1004T are connected at the other ends to the CCU 200.

Figure 34:
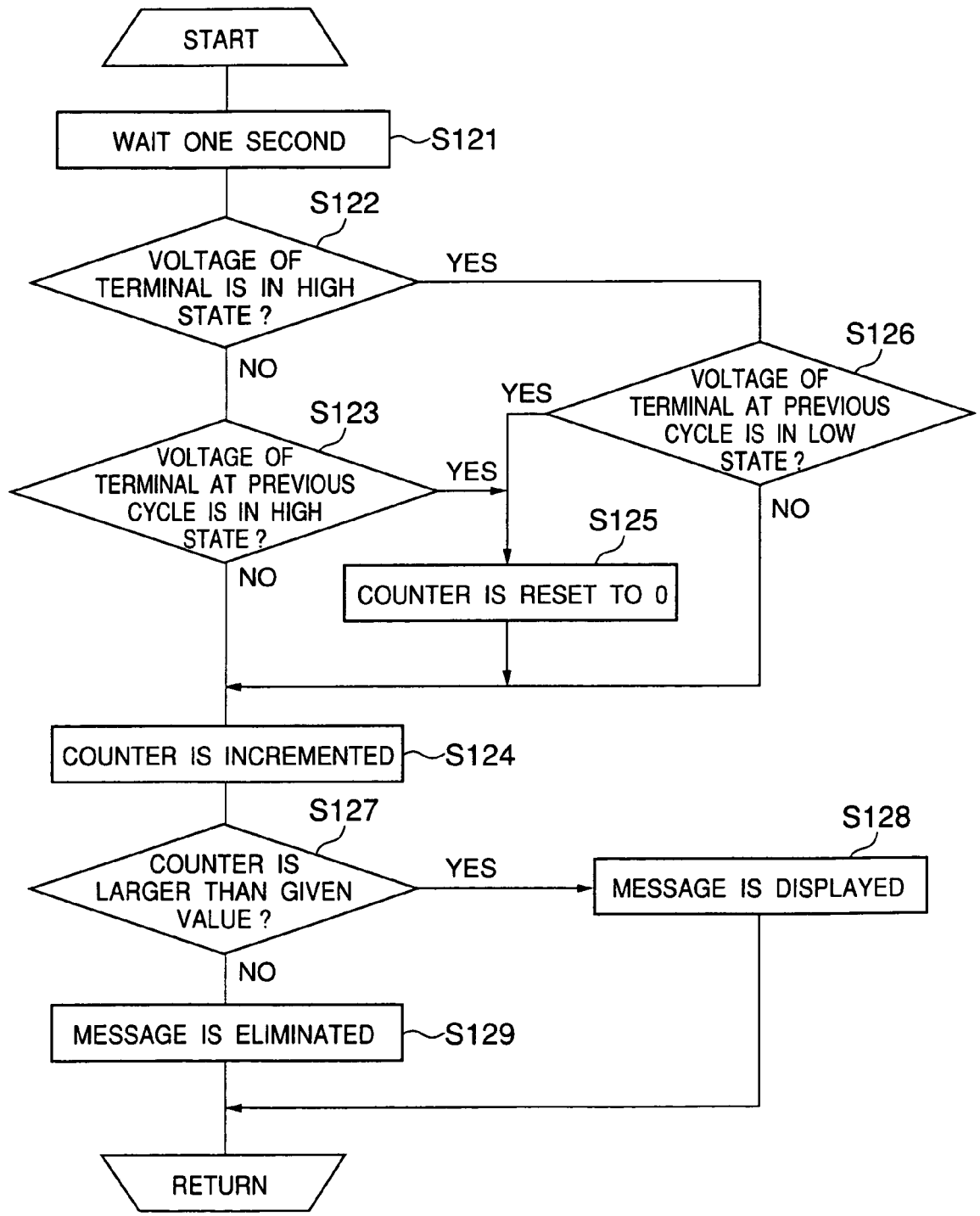
FIG. 34 is a flowchart for explaining a signal line separation message process performed by the copier using a detected voltage of the terminal of the communication interface unit.

FIG. 34 shows a signal line separation message process performed by the CPU 1001 of the copier 100 by using a detected voltage of the receiving terminal of the communication interface unit 1004 of the copier 100. In the present embodiment, the signal line separation message process of FIG. 34 is periodically initiated by the CPU 1001 every one second.

As shown in FIG. 34, at the start of the signal line separation message process, the CPU 1001 at step S121 waits for one second. After the step S121 is performed, the CPU 1001 at step S122 determines whether a detected voltage of the receiving terminal (1004R) of the communication interface unit 1004 is in a high state.

When the result at the step S122 is negative (or the detected voltage is in a low state), the CPU 1001 at step S123 determines whether a previous detected voltage of the receiving terminal 1004R is in a high state. When the result at the step S123 is negative (or the detected voltage is in a low state), the CPU 1001 at step S124 increments a counter.

On the other hand, when the result at the step S123 is affirmative (or the detected voltage is in the high state), the detected voltage of the receiving terminal 1004R changes from the low state to the high state. In this case, the CPU 1001 at step S125 resets the counter to "0". After the step S125 is performed, the CPU 1001 performs the step S124 in which the counter is incremented.

When the result at the step S122 is affirmative (or the detected voltage is in the high state), the CPU 1001 at step S126 determines whether the previous detected voltage of the receiving terminal 1004R is in the low state. When the result at the step S126 is negative, the detected voltage of the receiving terminal 1004R does not change. In this case, the CPU 1001 performs the above step S124 in which the counter is incremented. On the other hand, when the result at the step S126 is affirmative, the detected voltage of the receiving terminal 1004 changes from the low state to the high state. In this case, the CPU 1001 performs the above steps S125 and S124.

After the step S124 is performed, the CPU 1001 at step S127 determines whether the counter is above a given value. When the result at the step S127 is affirmative, the CPU 1001 at step S128 displays a signal line separation message on the operation part 1010 similar to the step S104 of FIG. 28. When the result at the step S127 is negative, the CPU 1001 at step S129 eliminates the signal line separation message from the operation part 1010 similar to the step S107 of FIG. 28. In the present embodiment, the given value with which the counter is compared is preset to be equivalent to 10 minutes or longer.

1.8.6 Connection Detecting Line Between CCU and Copier

Figure 35A:
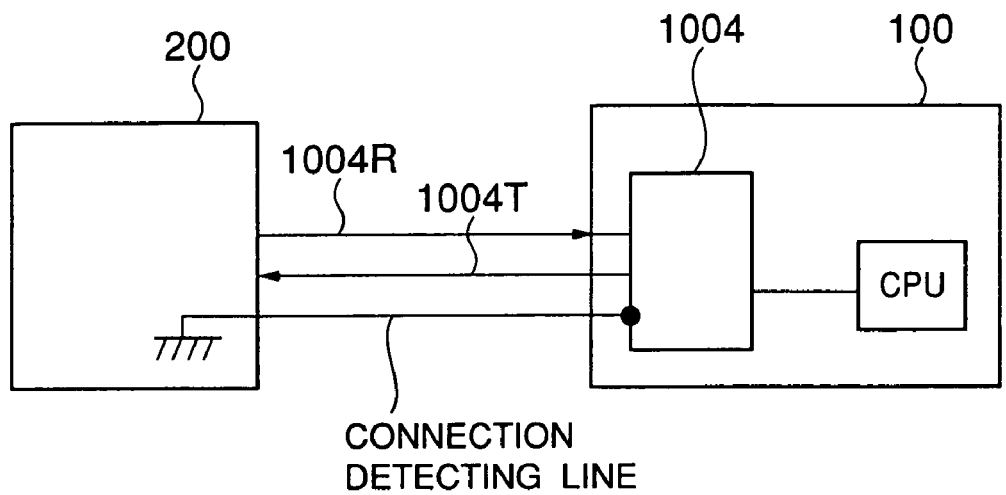
FIG. 35A and FIG. 35B are diagrams for explaining a signal line separation message process utilizing a connect detection line between the CCU and the copier.
Figure 35B:
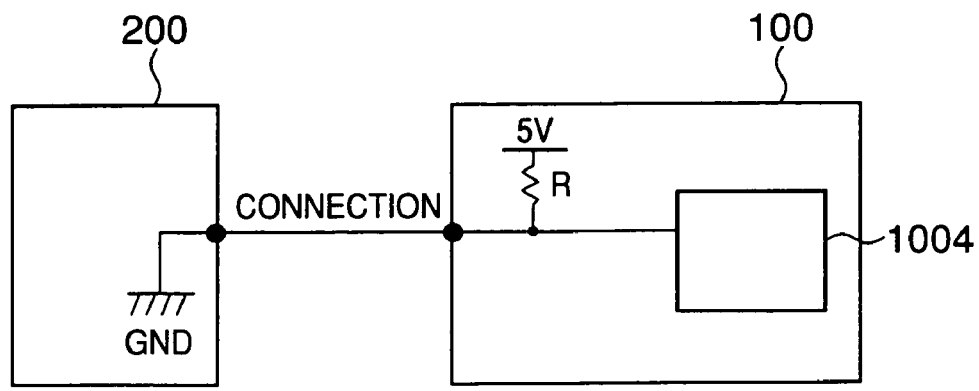

FIG. 35A and FIG. 35B show a signal line separation message process which is performed by using a connection detecting line provided between the CCU 200 and the copier 100.

As shown in FIG. 35A, the receiving signal line 1004R and the transmitting signal line 1004T are connected at one end to the receiving terminal and the transmitting terminal of the communication interface unit 1004 of the copier 100. The signal lines 1004R and 1004T are connected at the other ends to the CCU 200. Further, a connection detecting line is provided between the CCU 200 and the communication interface unit 1004. As shown in FIG. 35B, the connection detecting line is grounded on the side of the CCU 200, and the connection detecting line is connected at the other end to a terminal of the communication interface unit 1004. A reference voltage (5 V) is supplied through a resistor (R) to the connection detecting line for detecting a voltage of the terminal of the communication interface unit 1004. The CPU 1001 detects a voltage of the connection detecting line.

Figure 36:
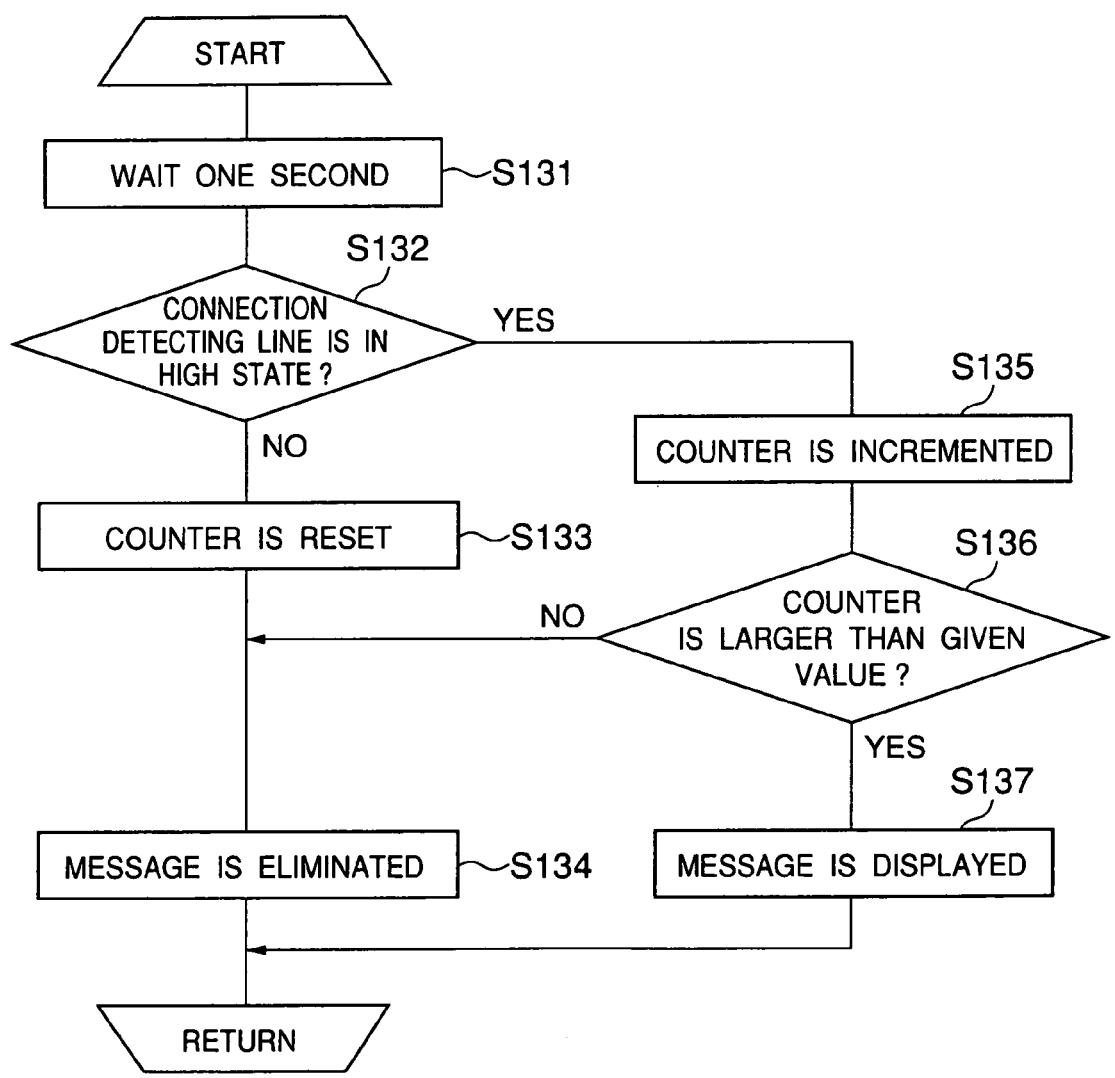
FIG. 36 is a flowchart for explaining a signal line separation message process performed by the copier using a connect detection line between the CCU and the copier.

FIG. 36 shows a signal line separation message process performed by the CPU 1001 of the copier 100 using the connect detection line between the CCU 200 and the copier 100. In the present embodiment, the signal line separation message process of FIG. 36 is periodically initiated by the CPU 1001 every one second.

As shown in FIG. 36, at the start of the signal line separation message process, the CPU 1001 at step S131 waits for one second. After the step S131 is performed, the CPU 1001 at step S132 determines whether a detected voltage of the connection detecting line is in a high state.

When the result at the step S132 is negative (or the detected voltage is in a low state), it is determined that there is no separation of the signal line between the CCU 200 and the copier 100. In this case, the CPU 1001 at step S133 resets the counter to "0". After the step S133 is performed, the CPU 1001 at step S134 eliminates the signal line separation message from the operation part 1010 similar to the step S107 of FIG. 28.

On the other hand, when the result at the step S132 is affirmative (or the detected voltage is in the high state), the CPU 1001 at step S135 increments the counter. After the step S135 is performed, the CPU 1001 at step S136 determines whether the counter is larger than a given value.

When the result at the step S136 is affirmative (or the counter>the given value), the CPU 1001 at step S137 displays the signal line separation message on the operation part 1010 similar to the step S104 of FIG. 28. When the result at the step S136 is negative (or the counter<the given value), the CPU 1001 performs the above step S134 in which the signal line separation message is eliminated from the operation part 1010 similar to the step S107 of FIG. 28. In the present embodiment, the given value with which the counter is compared is preset to be equivalent to 10 minutes or longer.

2. Second Embodiment

The present embodiment of the image forming device management system is characterized in that the image forming device 100 of concern effectively inhibits an automatic message transmission through the CCU 200 to the CSS 300 when a jam of the image forming device 100 continuously occurs.

In the present embodiment, the structure of the image forming device management system, the structure of the image forming device 100, the structure of the CCU 200, the structure of the CSS 300, the communication sequences, the data format of the messages, and the remote message transmission process are essentially the same as corresponding elements of the previous embodiment described in the above sections 1.1 through 1.7.

A description will now be given of only features of the second embodiment of the image forming device management system which are different from those of the previous embodiment.

2.1 Jam Detection Process

2.1.1 First Jam Detection Process

Figure 37:
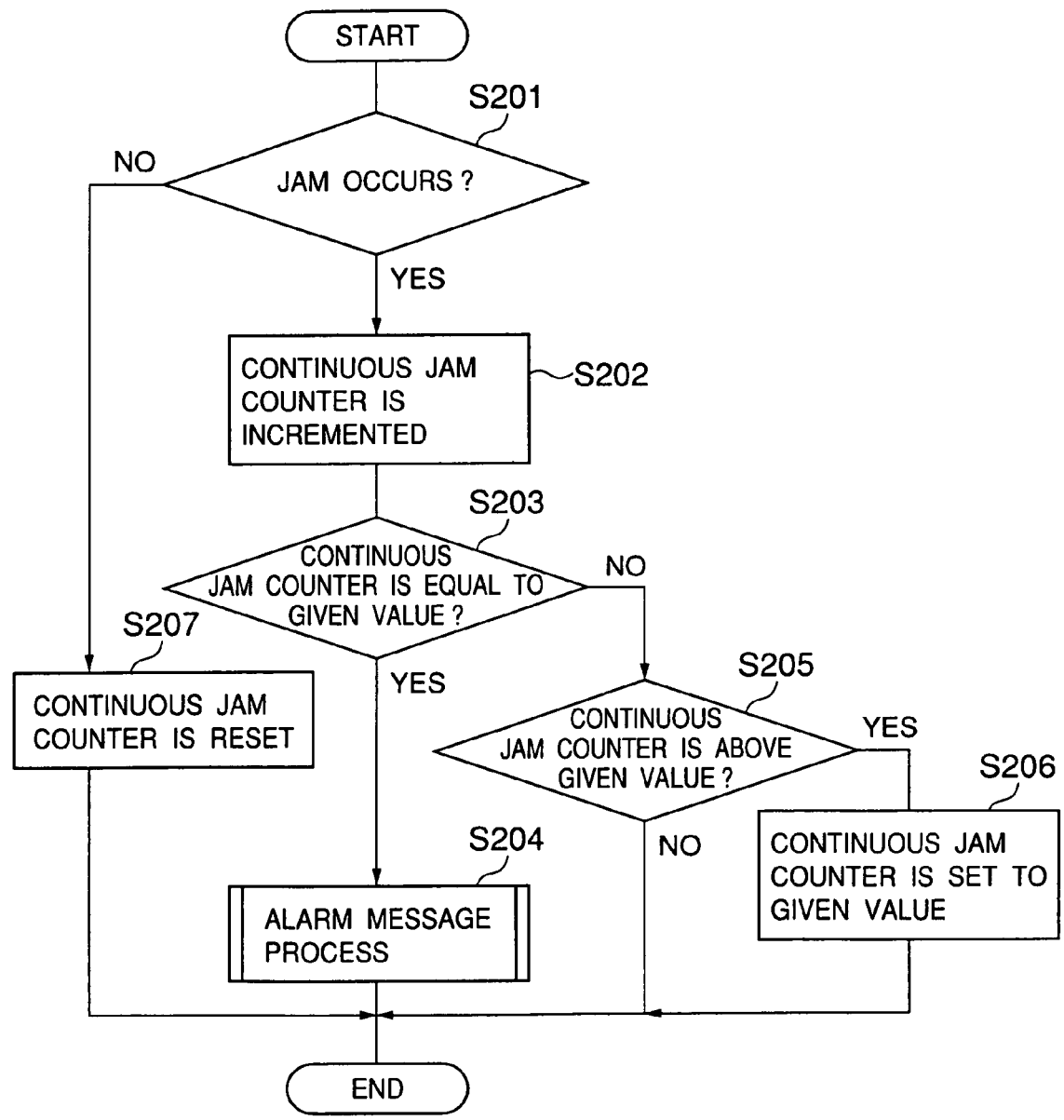
FIG. 37 is a flowchart for explaining a first jam detection process performed by the copier in a second embodiment of the image forming device management system.

FIG. 37 shows a first jam detection process performed by the CPU 1001 the copier 100 in the present embodiment of the image forming device management system. The first jam detection process of FIG. 37 is initiated by the CPU 1001 every time an internal mechanical condition of the copier 100 changes.

As shown in FIG. 37, at the start of the first jam detection process, the CPU 1001 at step S201 determines whether a jam of the copier 100 has occurred. When the jam has occurred, the CPU 1001 at step S202 increments a continuous jam counter.

When no jam occurs, the CPU 1001 at step S207 resets the continuous jam counter to "0". After the step S207 is performed, the CPU 1001 ends the first jam detection process of FIG. 37.

After the step S202 is performed, the CPU 1001 at step S203 determines whether the continuous jam counter is equal to a given value. When the result at the step S203 is affirmative, the CPU 1001 at step S204 performs an alarm message process in which an alarm message is automatically transmitted through the CCU 200 to the CSS 300. After the step S204 is performed, the CPU 1001 ends the first jam detection process of FIG. 37.

On the other hand, when the result at the step S203 is negative, the CPU 1001 at step S205 determines whether the continuous jam counter is above the given value. When the result at the step S205 is affirmative (or the continuous jam counter>the given value), the CPU 1001 at step S206 sets the continuous jam counter so as to be equal to the given value. After the step S206 is performed, the CPU 1001 ends the first jam detection process of FIG. 37. In this case, the CPU 1001 does not perform the alarm message process of the step S204. Therefore, it is possible to effectively inhibit the automatic message transmission of the copier 100 to the CSS 300 when a jam of the copier 100 continuously occurs.

When the result at the step S205 is negative (or the continuous jam counter<the given value), the CPU 1001 ends the first jam detection process of FIG. 37.

2.1.2 Second Jam Detection Process

Figure 38:
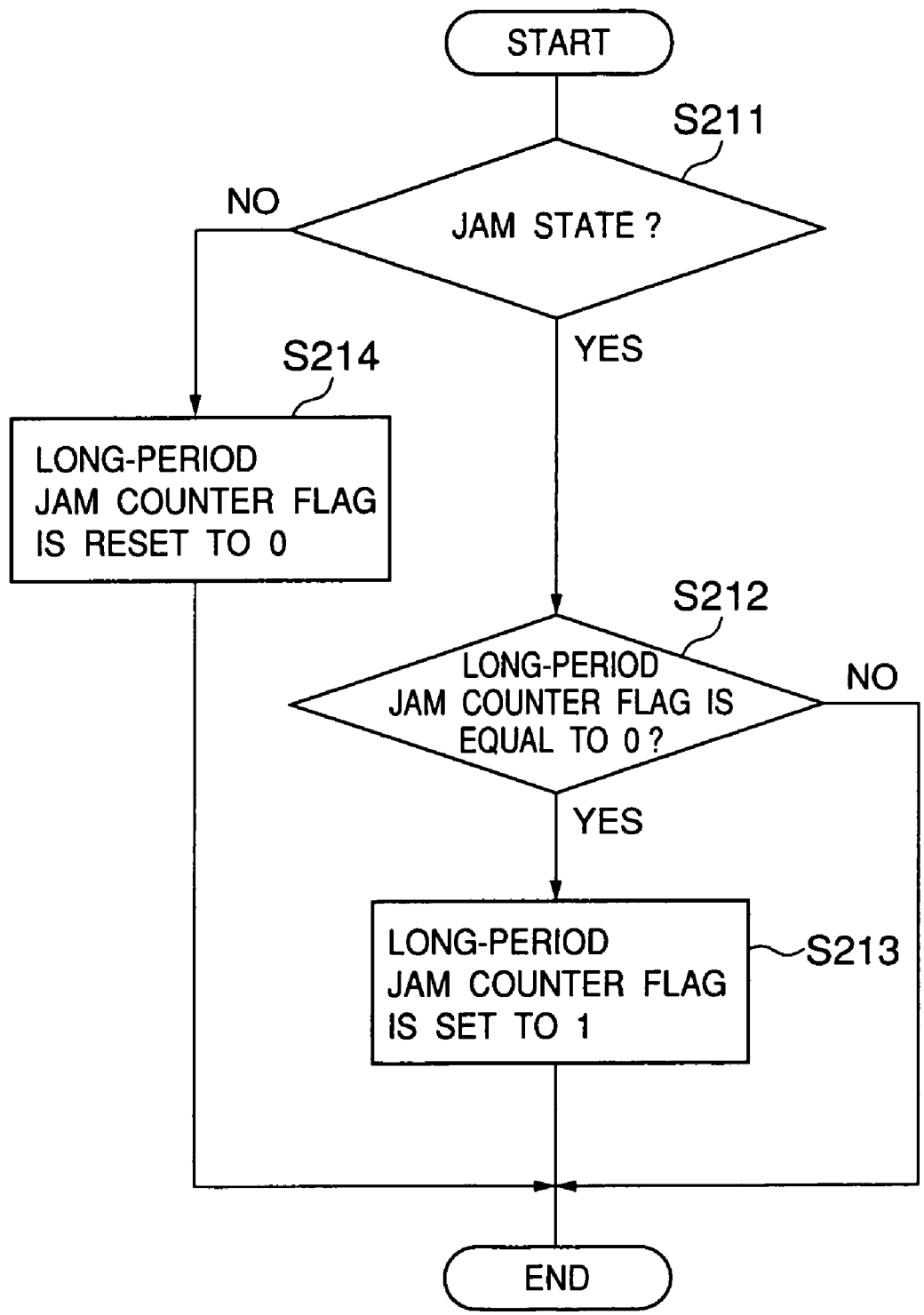
FIG. 38 is a flowchart for explaining a second jam detection process performed by the copier in the second embodiment.

FIG. 38 shows a second jam detection process performed by the CPU 1001 of the copier 100 in the present embodiment. The second jam detection process of FIG. 38 is initiated by the CPU 1001 every time an internal mechanical condition of the copier 100 changes.

Figure 39:
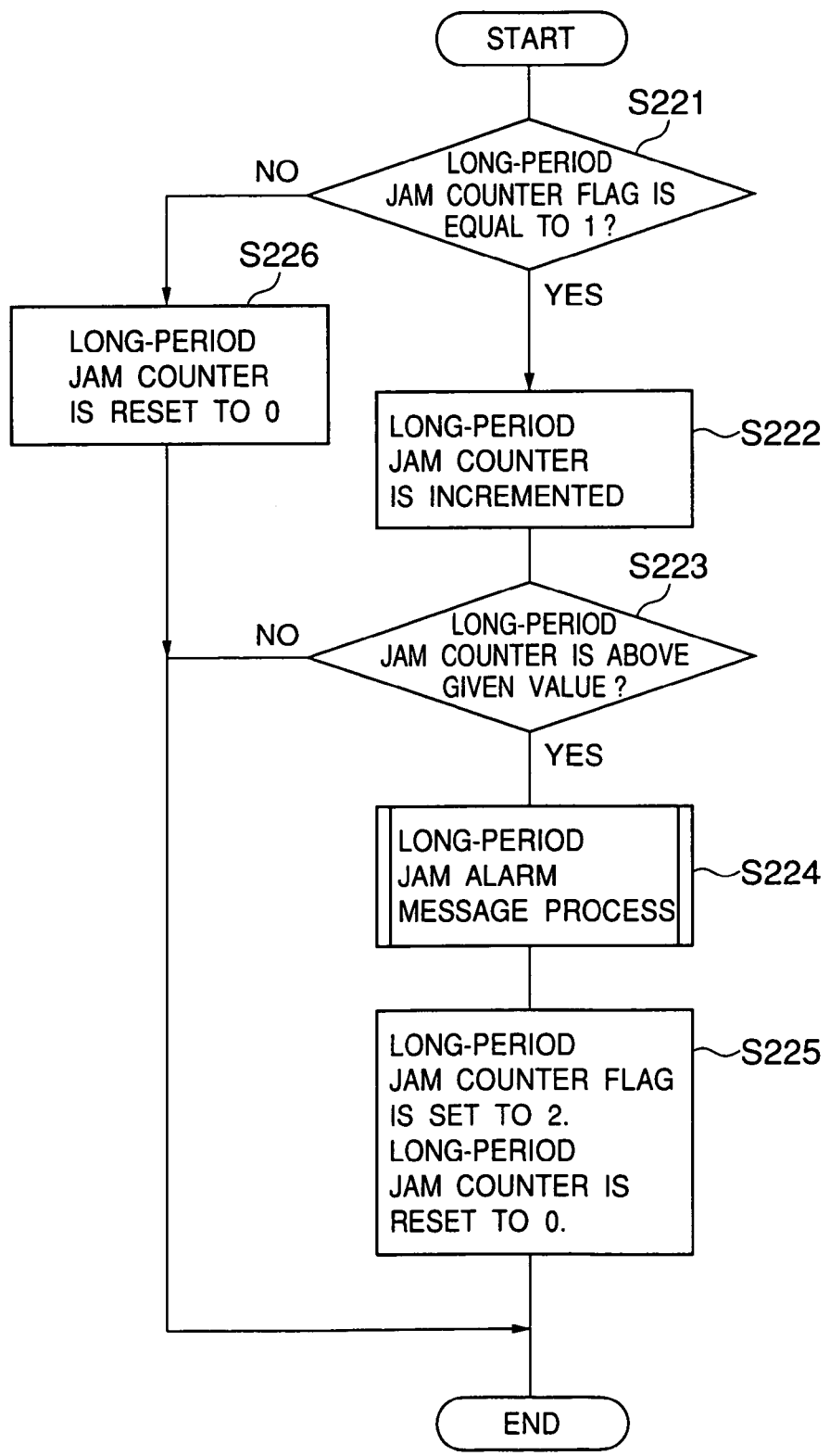
FIG. 39 is a flowchart for explaining another second jam detection process performed by the copier in the second embodiment.

FIG. 39 shows the second jam detection process performed by the CPU 1001 of the copier 100 in the present embodiment. The second jam detection process of FIG. 39 is periodically initiated by the CPU 1001 by using a timer.

In the second jam detection process of FIG. 38, the CPU 1001 at step S211 determines whether the copier 100 is in a jam state. When the copier 100 is in the jam state, the CPU 1001 at step S212 determines whether a long-period jam counter flag is equal to "0".

When the copier 100 is not in a jam state, the CPU 1001 at step S214 resets the long-period jam counter flag to "0". After the step S214 is performed, the CPU 1001 ends the second jam detection process of FIG. 38.

When the result at the step S212 is negative (or the long-period jam counter flag is not equal to "0"), the CPU 1001 ends the second jam detection process of FIG. 38. On the other hand, when the result at the step S212 is affirmative (or the long-period jam counter flag is equal to "0"), the CPU 1001 at step S213 sets the long-period jam counter flag to "1". After the step S213 is performed, the CPU 1001 ends the second jam detection process of FIG. 38.

In the second jam detection process of FIG. 39, the CPU 1001 at step S221 determines whether the long-period jam counter flag is equal to "1". When the result at the step S221 is affirmative, it is determined that the long-period jam counter should be set in an ON state to start counting for the detection of a period for which the copier 100 continues to be in the jam state. The CPU 1001 at step S222 increments the long-period jam counter.

On the other hand, when the result at the step S221 is negative, it is determined that the long-period jam counter should be set in an OFF state to stop counting. The CPU 1001 at step S226 resets the long-period jam counter to "0". After the step S226 is performed, the CPU 1001 ends the second jam detection process of FIG. 39.

After the step S222 is performed, the CPU 1001 at step S223 determines whether the long-period jam counter is above a given value. When the result at the step S223 is negative, the CPU 1001 ends the second jam detection process of FIG. 39. On the other hand, when the result at the step S223 is affirmative, the CPU 1001 at step S224 performs a long-period jam alarm message process in which a long-period jam alarm message is automatically transmitted through the CCU 200 to the CSS 300. After the step S224 is performed, the CPU 1001 at step S225 sets the long-period jam counter flag to "2" and resets the long-period jam counter to "0". After the step S225 is performed, the CPU 1001 ends the first jam detection process of FIG. 39. Therefore, it is possible to effectively inhibit the automatic message transmission of the copier 100 to the CSS 300 when the copier 100 continues to be in the jam state for a long period.

2.2 CSS Function Setting Process

Figure 40:
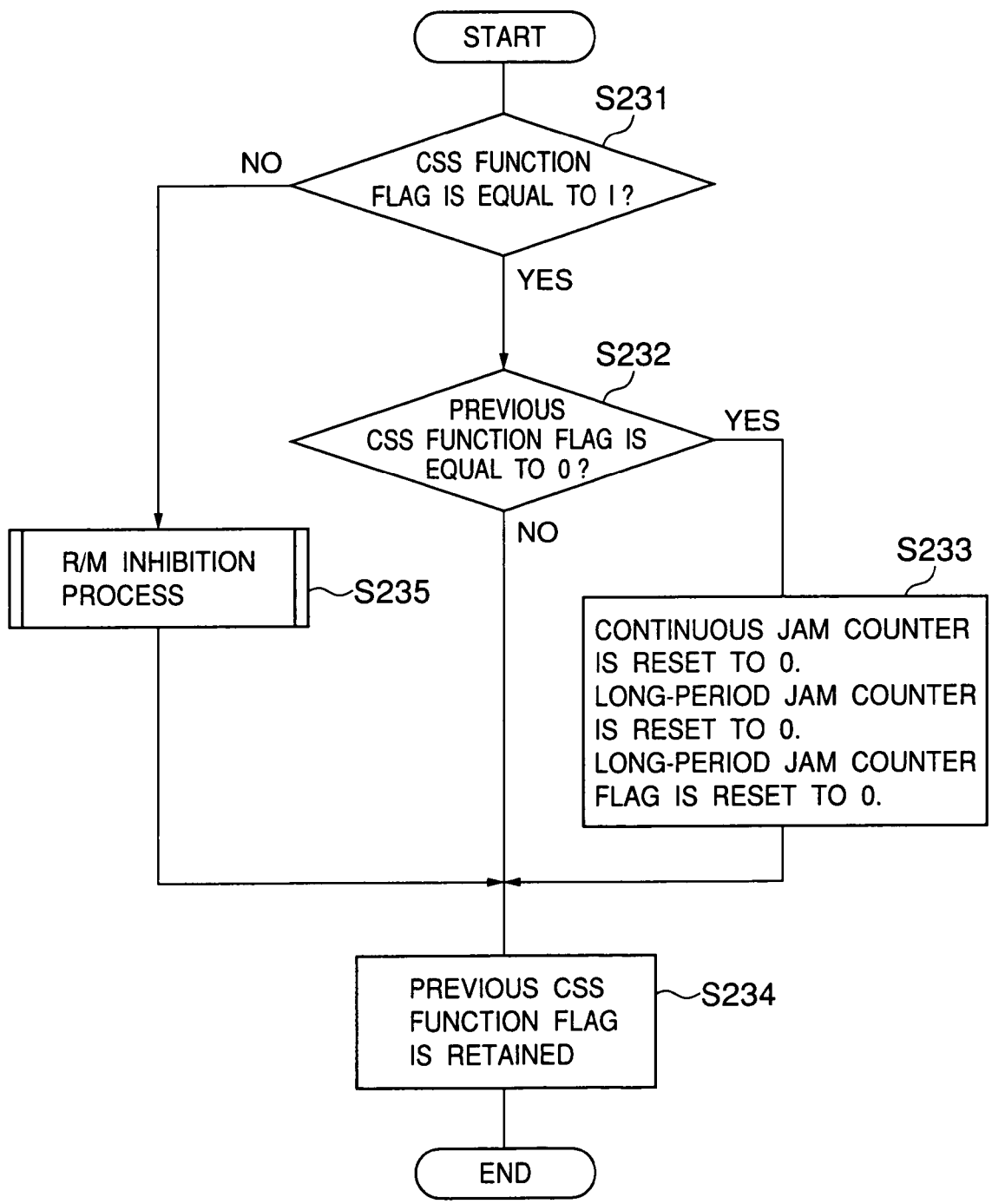
FIG. 40 is a flowchart for explaining a CSS function setting process performed by the copier in the second embodiment.

FIG. 40 shows a CSS function setting process performed by the CPU 1001 of the copier 100 in the present embodiment. The CSS function setting process of FIG. 40 is periodically initiated by the CPU 1001 by using a timer.

As shown in FIG. 40, at the start of the CSS function setting process, the CPU 1001 at step S231 determines whether a CSS function flag is equal to "1". When the result at the step S231 is affirmative, the CPU at step S232 determines whether a previous CSS function flag is equal to "0". When the previous CSS function flag is equal to "0", the CPU 1001 at step S233 resets the continuous jam counter to "0", resets the long-period jam counter to "0", and resets the long-period jam counter flag to "0". After the step S233 is performed, the CPU 1001 performs step S234.

On the other hand, when the previous CSS function flag is equal to "1", the CPU 1001 at step S234 retains the previous CSS function flag in the memory of the copier 100. After the step S234 is performed, the CPU 1001 terminates the CSS function setting process.

When the result at the step S231 is negative (or the CSS function flag is equal to "0"), the CPU 1001 at step S235 performs a remote message (R/M) inhibition process. After the R/M inhibition process is performed, the CPU 1001 of the copier 100 is inhibited from performing the R/M transmission to the CSS 300 or the statistical process. After the step S235 is performed, the CPU 1001 performs the step S234.

3. Third Embodiment

The present embodiment of the image forming device management system is characterized in that the image forming device of concern starts an automatic message transmission only in an appropriate situation when a maintenance service of the image forming device is performed by a serviceman.

In the present embodiment, the structure of the image forming device management system, the structure of the image forming device 100, the structure of the CCU 200, the structure of the CSS 300, the communication sequences, the data format of the messages, and the remote message transmission process are essentially the same as corresponding elements of the previous embodiment described in the above sections 1.1 through 1.7.

A description will now be given of only features of the third embodiment of the image forming device management system which are different from those of the previous embodiment.

3.1 Serviceman Maintenance Service Start/End Message Process (First Example)

Figure 41:
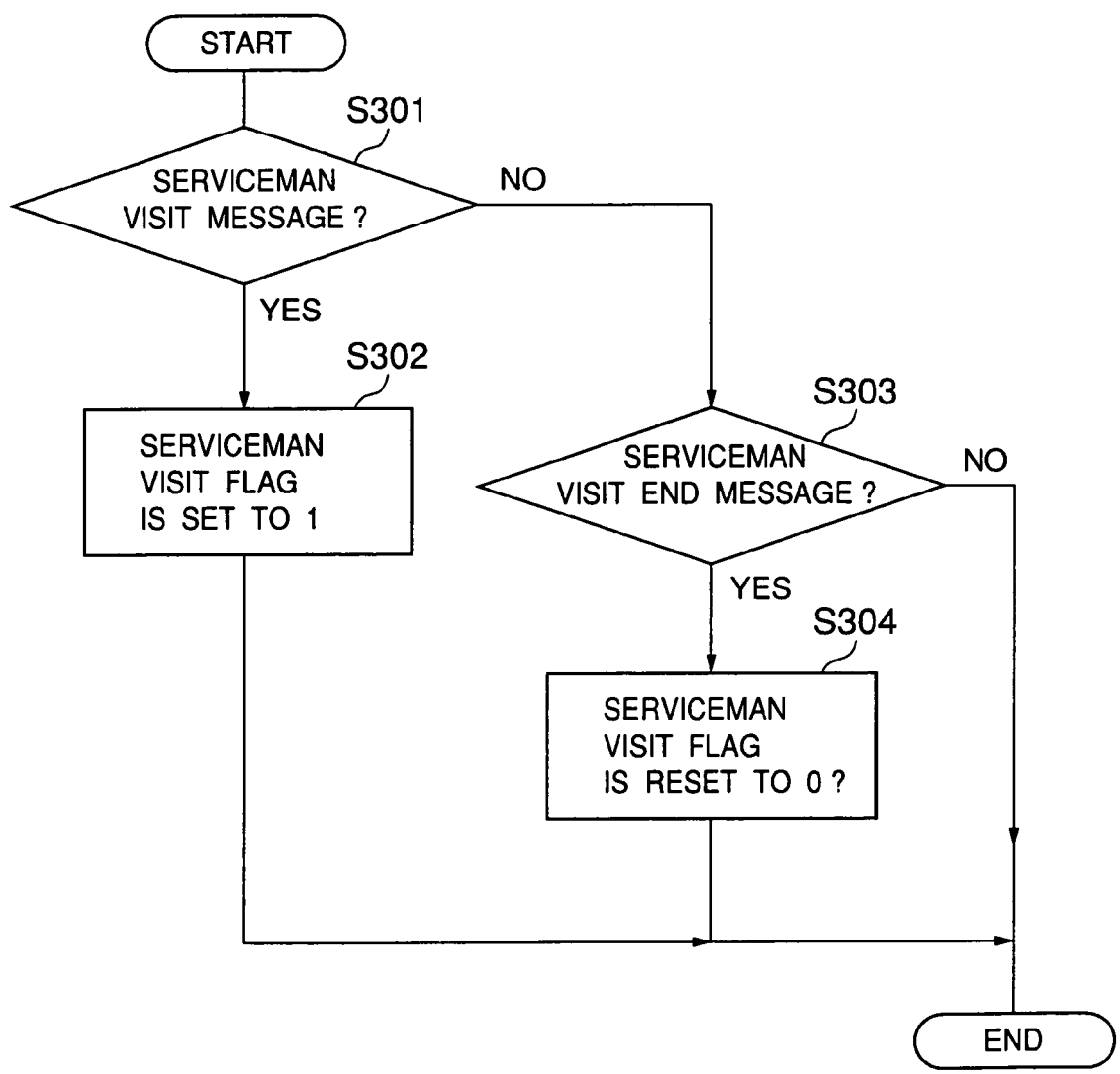
FIG. 41 is a flowchart for explaining a maintenance service start/end message process performed by the copier in a third embodiment of the image forming device management system.

FIG. 41 shows a maintenance service start/end message process which is performed by the copier 100 in a third embodiment of the image forming device management system. The maintenance service start/end message process of FIG. 41 is initiated when an event (which is either a serviceman visit message request or a serviceman visit end message request) occurs.

As shown in FIG. 41, at the start of the maintenance service start/end message process, the CPU 1001 at step S301 determines whether a serviceman visit message is requested by the serviceman. When the result at the step S301 is affirmative, the CPU 1001 at step S302 sets a serviceman visit flag to "1" (or an ON state). After the step S302 is performed, the CPU 1001 terminates the maintenance service start/end message process.

When the result at the step S301 is negative (or the serviceman visit message is not requested), the CPU 1001 at step S303 determines whether "a serviceman visit end message is requested by the serviceman. When the result at the step S303 is affirmative, the CPU 1001 at step S304 resets the serviceman visit flag to "0" (or an OFF state). After the step S304 is performed, the CPU 1001 terminates the maintenance service start/end message process of FIG. 41. In the present embodiment, the serviceman visit flag is retained in the RAM 1003 which is a non-volatile (N/V) memory or a battery backup RAM. Hence, even when a power switch of the copier 100 is turned OFF, it is possible to prevent the content of the serviceman visit flag from being lost.

Figure 42:
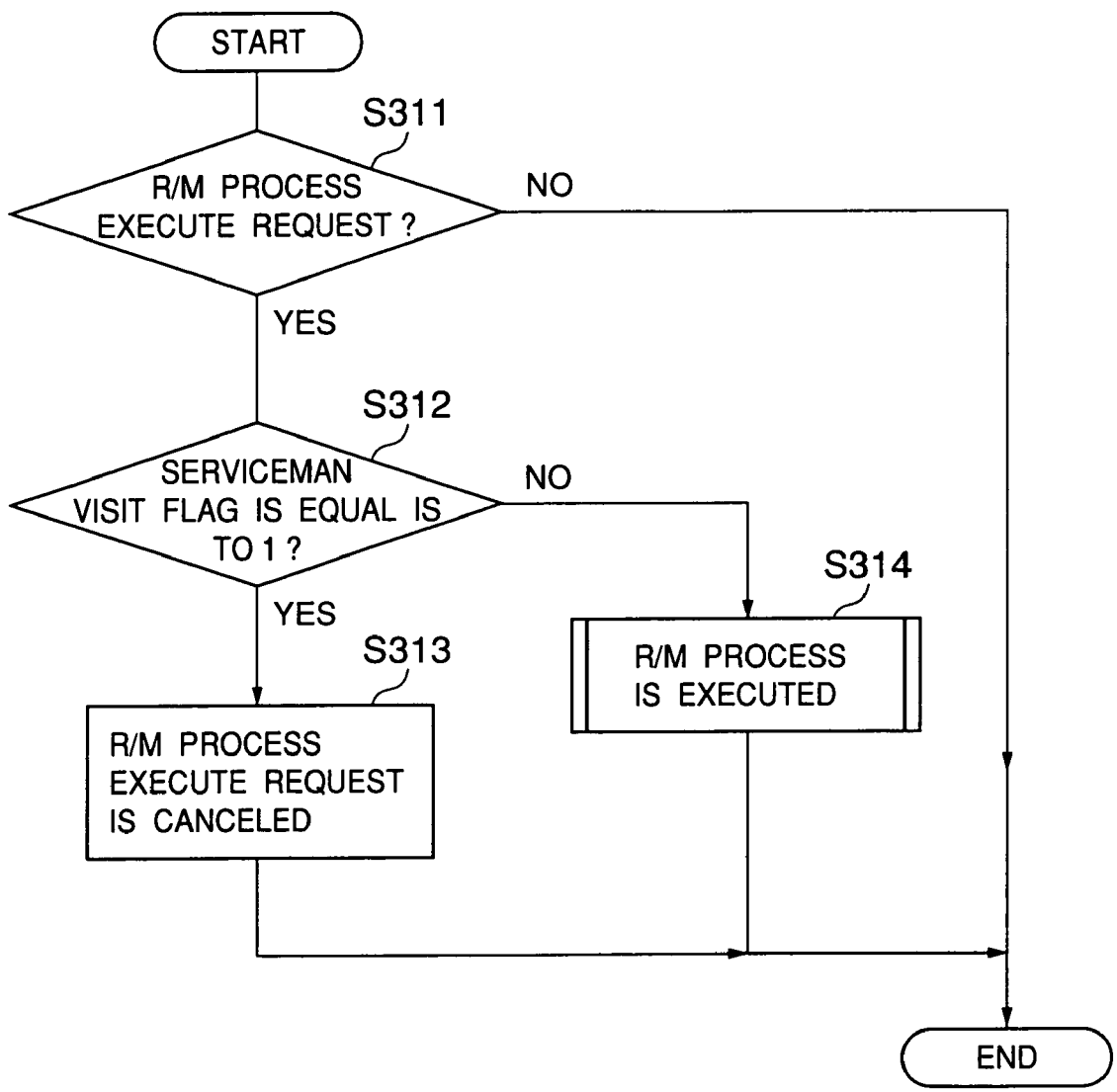
FIG. 42 is a flowchart for explaining another maintenance service start/end message process performed by the copier in the third embodiment.

FIG. 42 shows another maintenance service start/end message process performed by the copier 100 in the third embodiment. The maintenance service start/end message process of FIG. 42 is initiated when an event (which is a remote message (R/M) process execute request) occurs.

As shown in FIG. 42, at the start of the maintenance service start/end message process, the CPU 1001 at step S311 determines whether a received remote message (R/M) process execute request is related to a R/M process different than a replenishment part message process. When the result at the step S311 is negative, the CPU 1001 ends the maintenance service start/end message process of FIG. 42. When the result at the step S311 is affirmative, the CPU 1001 at step S312 determines whether the serviceman visit flag is equal to "1".

When the result at the step S312 is affirmative (or the serviceman visit flag=1), the CPU 100.1 at step S313 cancels the R/M process execute request. After the step S313 is performed, the CPU 1001 terminates the maintenance service start/end message process of FIG. 42.

When the result at the step S312 is negative (or the serviceman visit flag=0), the CPU 1001 at step S314 performs the remote message (R/M) transmission process in response to the execute request. After the step S314 is performed, the CPU 1001 terminates the maintenance service start/end message process of FIG. 42.

3.2 Serviceman Maintenance Service Start/End Message Process (Second Example)

Figure 43:
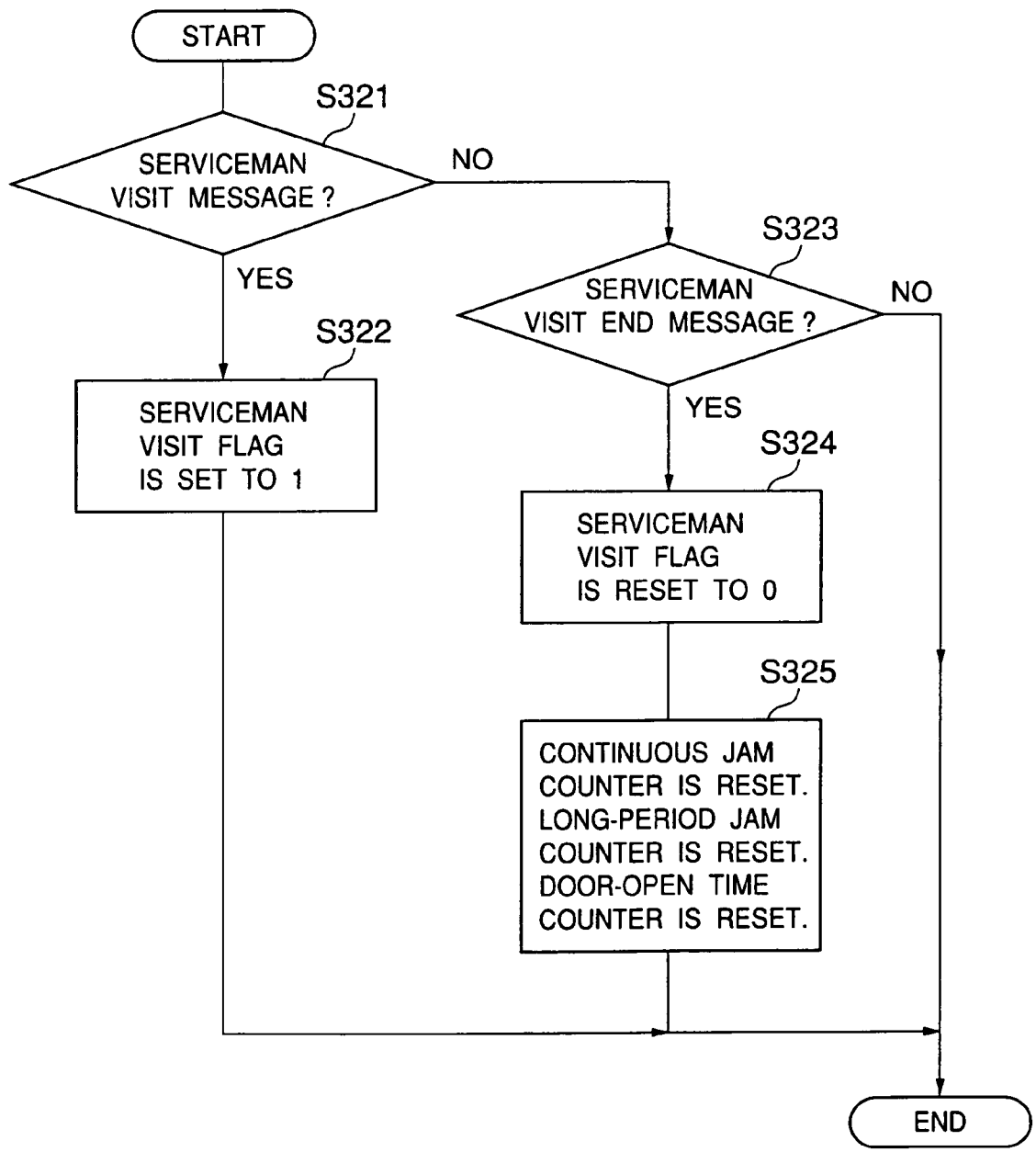
FIG. 43 is a flowchart for explaining a further maintenance service start/end message process performed by the copier in the third embodiment.

FIG. 43 shows a further maintenance service start/end message process which is performed by the copier 100 in the third embodiment. The maintenance service start/end message process of FIG. 43 is initiated when an event (which is either a serviceman visit message request or a serviceman visit end message request) occurs.

As shown in FIG. 43, at the start of the maintenance service start/end message process, the CPU 1001 at step S321 determines whether the serviceman visit message is requested by the serviceman. When the result at the step S321 is affirmative, the CPU 1001 at step S322 sets the serviceman visit flag to "1". After the step S322 is performed, the CPU 1001 terminates the maintenance service start/end message process of FIG. 43.

When the result at the step S321 is negative (or the serviceman visit message is not requested), the CPU 1001 at step S323 determines whether the serviceman visit end message is requested by the serviceman. When the result at the step S323 is affirmative, the CPU 1001 at step S324 resets the serviceman visit flag to "0". After the step S324 is performed, the CPU 1001 at step S325 resets the continuous jam counter to "0", resets the long-period jam counter to "0", and resets a door-open time counter to "0". After the step S325 is performed, the CPU 1001 terminates the maintenance service start/end message process of FIG. 43.

In the present embodiment, the continuous jam counter is used to automatically transmit a continuous jam message to the CSS 300 when a number of jams has continuously occurred on the copier 100. The long-period jam counter is used to automatically transmit a long-period jam message to the CSS 300 when the copier 100 is continuously in a jam state for a long period. The door-open time counter is used to automatically transmit a long-period door-open message to the CSS 300 when a door of the copier 100 is continuously open for a long period.

4. Fourth Embodiment 4.1 Structure Of System

Figure 44:
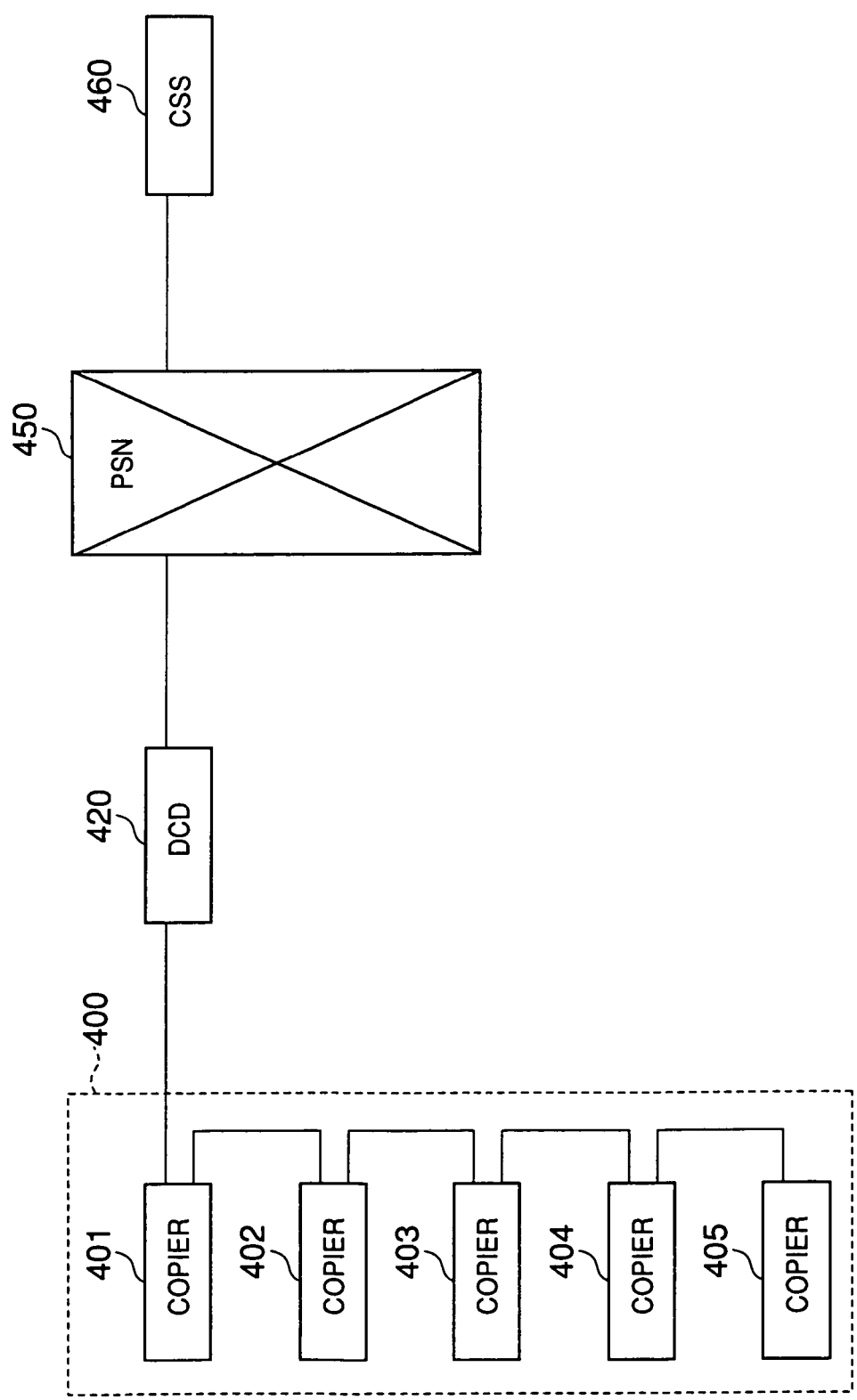
FIG. 44 is a block diagram of a fourth embodiment of the image forming device management system of the present invention.

FIG. 44 shows a fourth embodiment of the image forming device management system of the present invention. As shown in FIG. 44, in the image forming device management system of the present embodiment, a plurality of image forming devices 400 (such as copiers 401 through 405) are provided. Although the image forming devices 400 may be copiers, facsimiles or printers, in the following description, for the sake of convenience, one of the image forming devices 400 will be called the image forming device 400 or the copier 400 unless otherwise specified.

In the image forming device management system of FIG. 44, a data communication device DCD 420 is also provided, and each of the image forming devices 400 is connected to the DCD 420. The DCD 420 is linked to a central service station CSS 460 at a remote location via a public switched network PSN 450. The maintenance of the image forming devices 400 are remotely controlled by the CSS 460 through the DCD 420 and the PSN 450 in a centralized manner. The CSS 460 in the present embodiment is essentially the same as the CSS 300 in the previous embodiments.

The DCD 420 in the present embodiment functions to selectively transmit a control signal from the CSS 460 to one of the image forming devices 400, and to transmit a message from one of the image forming devices 400 to the CSS 460 through the PSN 450. A power switch of the DCD 420 is continuously turned ON for 24 hours, and the DCD 420 is capable of always communicating with the CSS 460 even when the image forming devices 400 are in OFF state.

The interface between each copier 400 and the DCD 420 is provided by a multidrop connection which is in conformity with RS-485 standard. The communication sequence between each copier 400 and the DCD 420 is performed in accordance with basic data transmission procedures. The DCD 420 can communicate with one of the copiers 400 after a data link between the DCD 420 and the copier 400 is established by using a centralized polling/selecting control method. A specific device address can be set for each of the copiers 400 by setting an address setting switch of each copier 400, and a polling address and a selecting address can be set for each copier 400 in accordance with the specific device address.

4.2 Data Communication Device (DCD)

Figure 45:
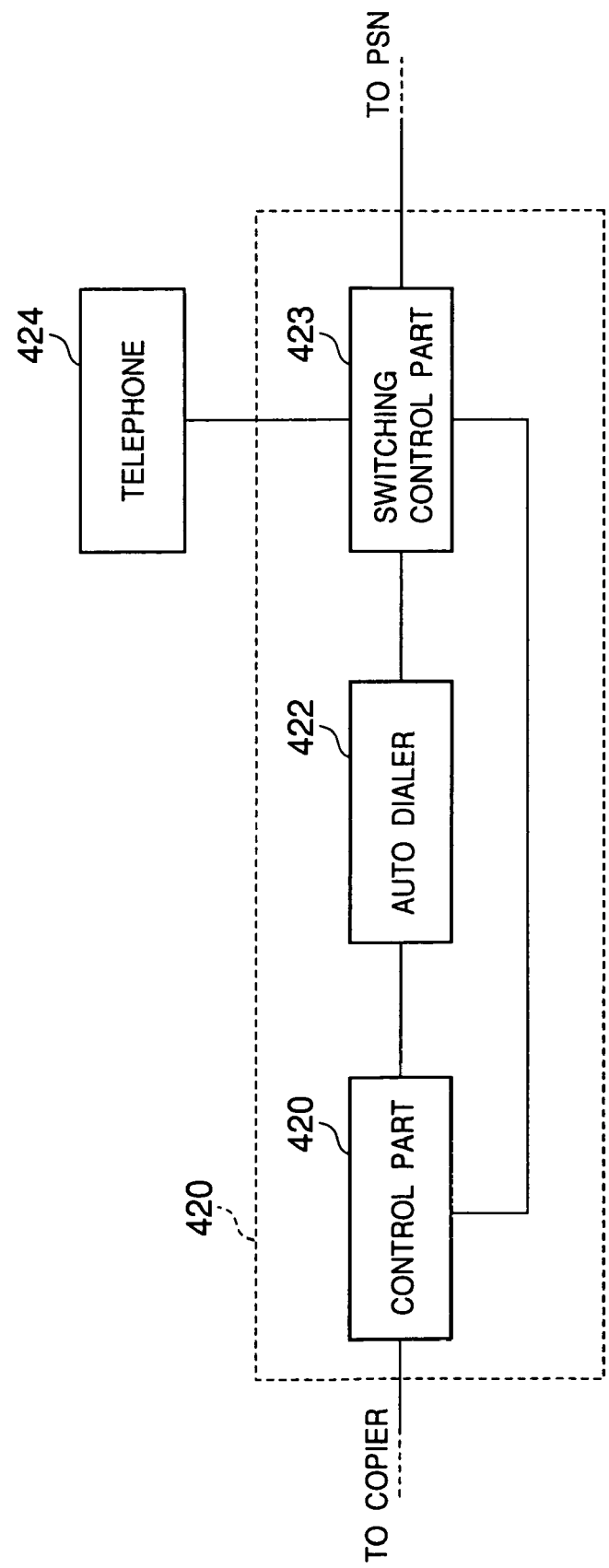
FIG. 45 is a block diagram of a data communication device DCD in the fourth embodiment of the image forming device management system.

FIG. 45 shows a data communication device DCD in the fourth embodiment of the image forming device management system.

As shown in FIG. 45, the DCD 420 generally has a control part 421, an auto dialer 422, and a switching control part 423. A telephone 424 is connected to the switching control part 423. The control part 421 controls the plurality of the image forming devices 400 and controls receiving of a signal sent through the PSN 450 to the DCD 420 by the CSS 460. The auto dialer 422 functions to automatically send a call to the CSS 460 in accordance with a message sent by one of the image forming device 400. The switching control part 423 carries out a connection control to the PSN 450 and a switching of the DCD 420 to one of the telephone 424 and the image forming device 400.

In the DCD 420 of FIG. 45, the control part 421 (the structure of which is not shown in FIG. 45) includes a CPU which executes a control program, a ROM which stores the control program and control data therein, a RAM which provides a working storage area for the CPU when executing the control program, a non-volatile (N/V) RAM which retains operating parameters by using a battery, a plurality of serial communication control units (CCU), an input/output (I/O) port, and a real-time (R/T) clock which provides a current time. The control part 421 has the structure that is essentially the same as the structure of a control part of the image forming device 400 shown in FIG. 48. In the non-volatile RAM of the control part 421, transmission data exchanged between the image forming devices 400 and the CSS 460, device codes and ID codes of the image forming devices 400, a telephone number of the CSS 460, the number of redials, a redial period and so on are stored.

4.3 Functions of System

The image forming device management system of FIG. 44 provides the following functions:
(1) control of communications from the CSS 460 to the image forming devices 400;
(2) control of communications from each image forming device 400 to the CSS 460 or communications from each image forming device 400 to the DCD 420; and
(3) control by the DCD 420.

A description will now be given of these functions of the image forming device management system in the present embodiment.

4.3.1 Control of Communications From CSS to Copiers

The image forming device management system of FIG. 44 can read out or reset a total copy count, a copy count of each paper tray, a copy count of each sheet size, a total misfeed count, a misfeed count of each sheet size and a misfeed count of each sheet transport position in a particular one of the image forming devices 400.

The image forming device management system of FIG. 44 can set or read out adjustment values of a controlled voltage, current, resistance and timing of each of various elements of each image forming device 400.

The image forming device management system of FIG. 44 can control transmission and receiving of a response to one of the above-mentioned controls which is delivered to the CSS 460 by one of the image forming devices 400.

The DCD 420 receives a command from the CSS 460 and performs a selecting to a particular one of the image forming devices 400 in accordance with the command. When the selecting to the particular one of the image forming devices 400 is performed by the DCD 420, one of the above controls is carried out in the image forming device management system of the present embodiment.

Figure 46:
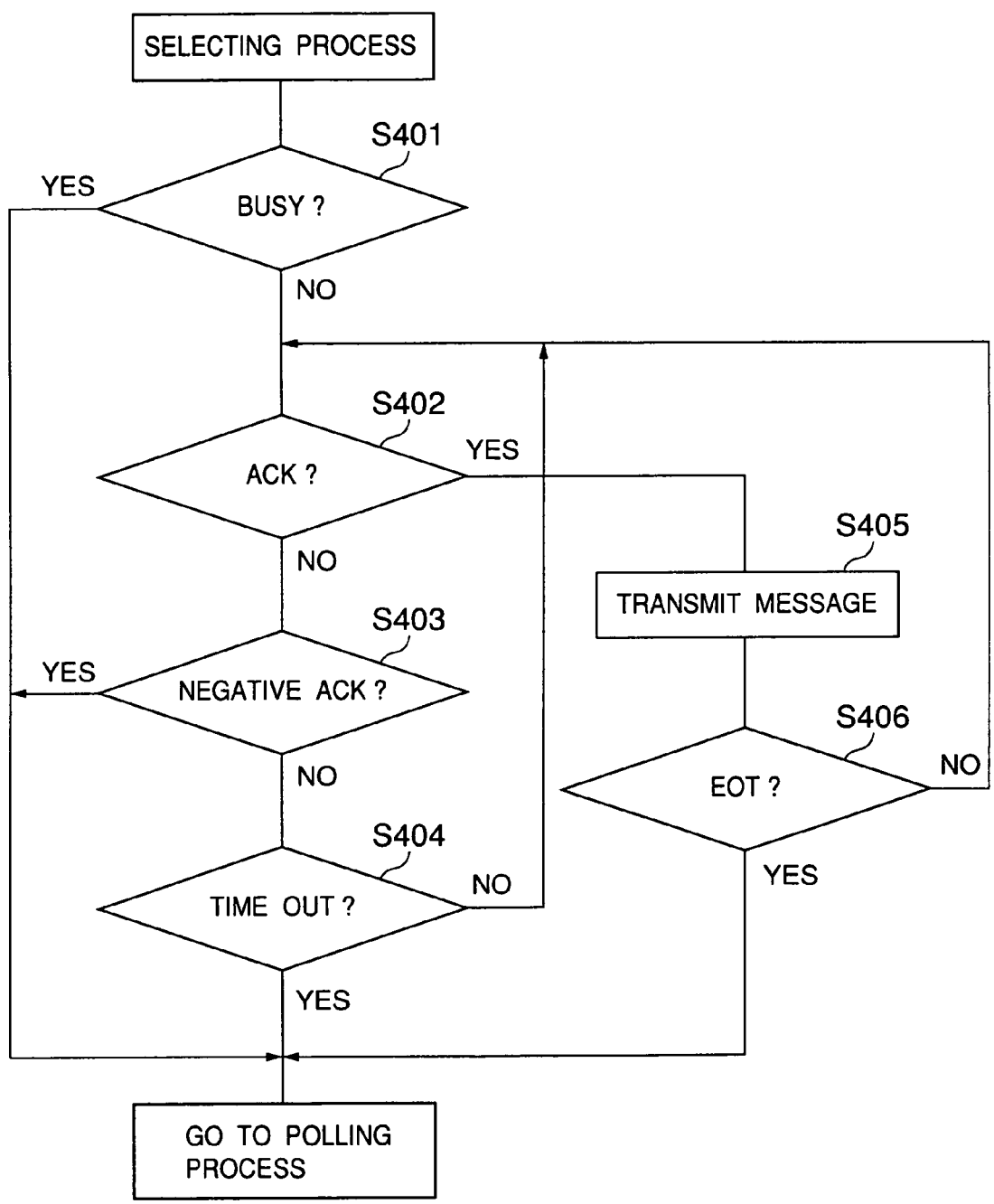
FIG. 46 is a flowchart for explaining a selecting process performed to a particular one of the image forming devices by the DCD in the fourth embodiment.

FIG. 46 shows a selecting process performed to a particular one of the image forming devices 400 by the DCD 420 in the fourth embodiment. Suppose that a particular one of the image forming devices 400 has a device code, and a specific control code is assigned to indicate a predetermined selecting function.

At the start of the selecting process, the DCD 420 sends the specific control code and the device code through the serial CCU to the particular one of the image forming devices 400 (which will be called the copier 400). The copier 400 receives the specific control code and the device code. After the specific control code is detected, the copier 400 determines whether the received device code matches a device code of the copier 400. When the received device code matches the device code of the copier 400, the copier 400 recognizes that the selecting of the DCD 420 is performed to the copier 400. Instead of the specific control code, a combination of certain codes may be used to indicate the selecting function.

When the copier 400 has a transmission data upon the selecting of the DCD 420 to the copier 400, the copier 400 outputs a busy signal. As shown in FIG. 46, the DCD 420 at step S401 detects whether a busy signal from the copier 400 is received. When the busy signal is received, the control of the DCD 420 is transferred to a polling process. When the copier 400 has no transmission data upon the selecting, the copier 400 does not output a busy signal. When the copier 400 determines that it can respond to the selecting, the copier 400 outputs an acknowledgment (ACK). The DCD 420 at step S402 detects whether an ACK from the copier 400 is received. When the ACK is received by the DCD 420, the DCD 420 at step S405 transmits a message to the copier 400. After the message is transmitted to the copier 400, the copier 400 outputs an end-of-transmission (EOT) signal. The DCD 420 at step S406 detects whether the EOT signal from the copier 400 is received. After the EOT signal is received by the DCD 420, the selecting process is terminated and the control of the DCD 420 is transferred to the polling process.

When the copier 400 determines that it cannot respond to the selecting, the copier 400 outputs a negative acknowledgment (ACK). The DCD 420 at step S403 detects whether a negative ACK from the copier 400 is received. When a negative ACK is not received, the DCD 420 at step S404 detects whether a time-out period has elapsed since the start of the selecting. When the time-out period has elapsed, the selecting process is terminated, and the control of the DCD 420 is transferred to the polling process.

4.3.2 Control of Communications from Copier to CSS or Communications from Copier to DCD When a significant failure of the copier 400 takes place, the copier 400 immediately transmits a remote message (or an emergency message) to the DCD 420 or to the CSS 460 through the PSN 450. The remote message notifies that the failure of the copier 400 has occurred.

The copier 400 has a service program mode in addition to an image formation mode. When the image formation mode of the copier 400 is shifted to the service program mode by pressing a given mode shift key, the copier 400 immediately transmits a remote message (or an emergency message) to the DCD 420 or to the CSS 460 through the PSN 450. The remote message notifies that the service program mode of the copier 400 has started.

When the current copy count of the copier-400 reaches a predetermined number of copy sheets, the copier 400 immediately transmits a remote message (or an emergency message) to the DCD 420 or to the CSS 460 through the PSN 450. The remote message notifies that a copy sheet replenishment is requested by the copier 400.

The DCD 420 periodically performs a polling to the image forming devices 400 at regular intervals so as to detect whether a request from any of the image forming devices 400 is sent to the DCD 420. When the polling to the image forming device 400 is performed by the DCD 420, one of the above-mentioned controls is carried out in the image forming device management system of the present embodiment.

Figure 47:
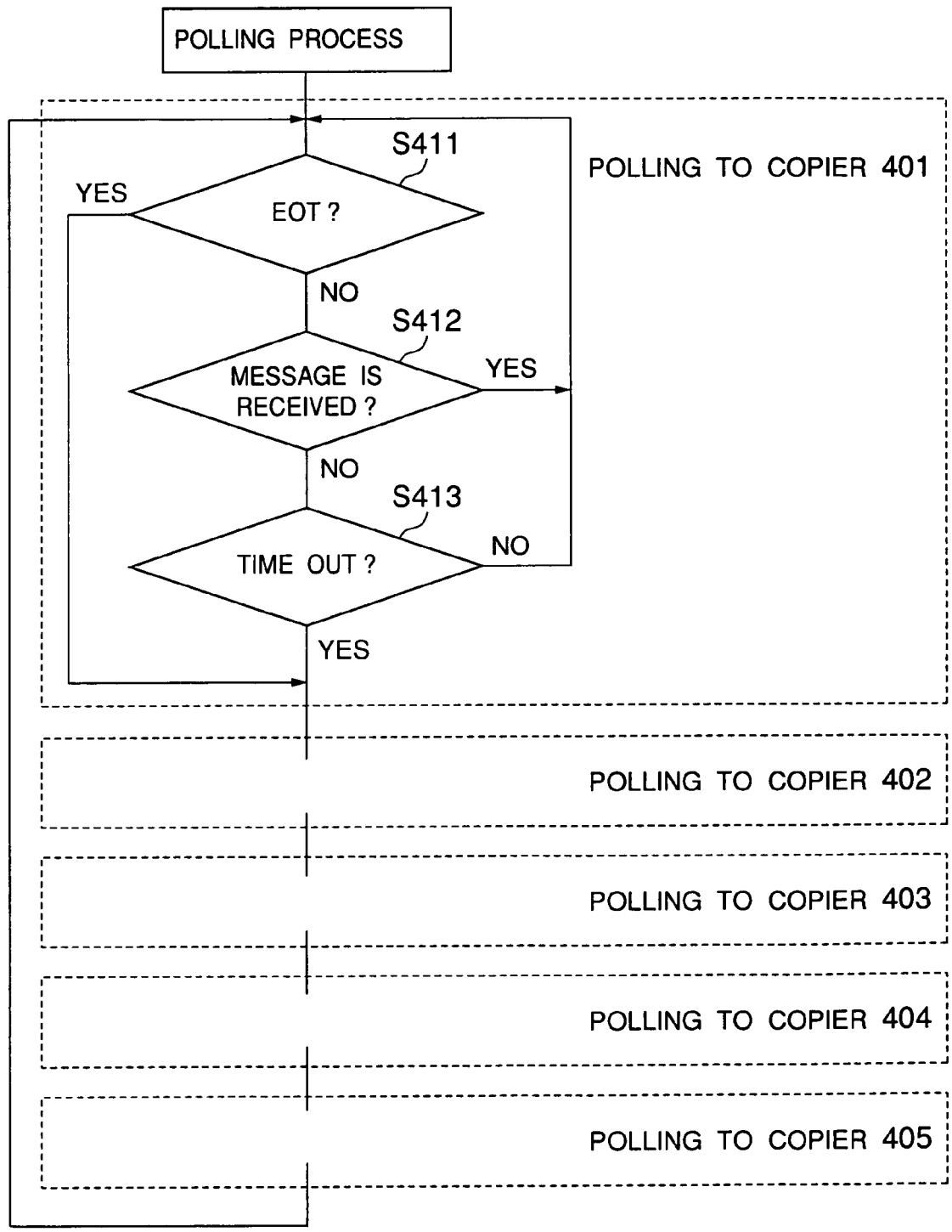
FIG. 47 is a flowchart for explaining a polling process performed to the image forming devices by the DCD in the fourth embodiment.

FIG. 47 shows a polling process performed to the image forming devices 400 by the DCD 420. Suppose that the image forming devices 400 have respective device codes and a specific control code indicating a predetermined polling function is assigned.

At the start of the polling process, the DCD 420 sends the specific control code and the device code through the serial CCU to one of the image forming devices 400 (which will be called the copier 401). The copier 401 receives the specific control code and the device code. After the specific control code is detected, the copier 401 determines whether the received device code matches a device code of the copier 401. When the received device code matches the device code of the copier 401, the copier 401 recognizes that the polling of the DCD 420 is performed to the copier 401. Instead of the specific control code, a combination of certain codes may be used to indicate the predetermined polling function.

As shown in FIG. 47, the DCD 420 at step S411 detects whether an EOT signal from the copier 401 is received. When the EOT signal is received, the DCD 420 terminates the polling to the copier 401, and the control of the DCD 420 is transferred to a polling to the copier 402. When an EOT signal from the copier 401 is not received, the DCD 420 at step S412 detects whether a transmission request sent by the copier 401 is received. When the request is not received by the DCD 420, the DCD 420 at step S413 detects whether a time-out period has elapsed since the start of the polling to the copier 401. When the time-out period has elapsed, the polling to the copier 401 is terminated, and the control of the DCD 420 is transferred to the polling to the copier 402.

4.3.3 Control by DCD

The DCD 420 in the present embodiment can read out a total copy count from one of the image forming devices 400.

The DCD 420 can transmit a response, sent by one of the image forming devices 400, through the PSN 450 to the CSS 460.

When the selecting to a particular one of the image forming devices 400 is performed by the DCD 420 at regular intervals, the reading of a total copy count from the particular one of the image forming devices 400 is carried out by the DCD 420. The DCD 420 includes a plurality of memories for storing respective total copy counts read from the image forming devices 400. The DCD 420 transmits the total copy count, retained in one of the memories, through the PSN 450 to the CSS 460 at regular intervals.

4.4 Control Part of Image Forming Device

Figure 48:
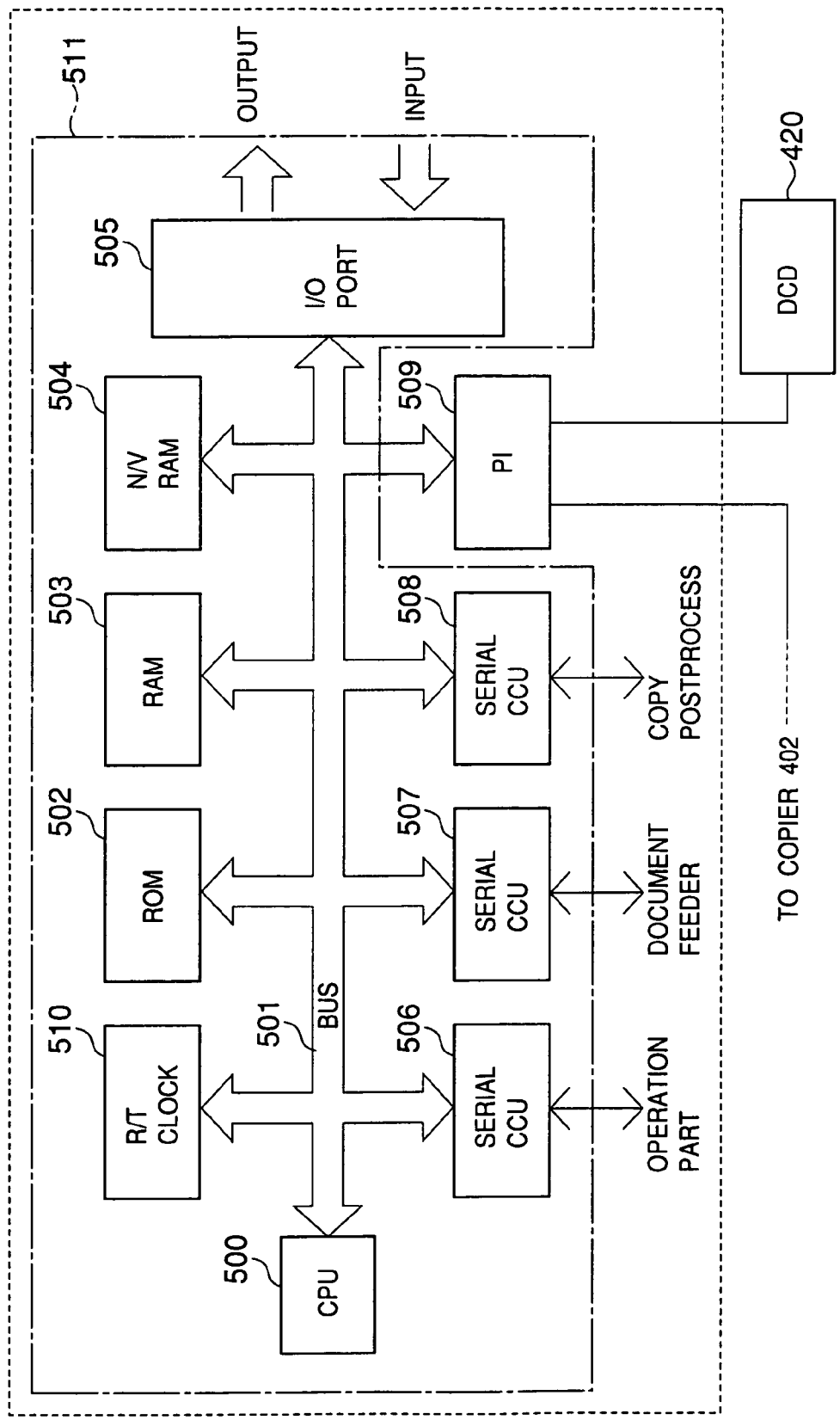
FIG. 48 is a block diagram of a control part of an image forming device in the fourth embodiment.

FIG. 48 shows a control part of each image forming device 400 in the present embodiment.

As shown in FIG. 48, the control part of the image forming device 400 includes a controller 511 which generally has a CPU 500, a bus 501, a real-time (R/T) clock 510, a ROM 502, a RAM 503, a non-volatile (N/V) RAM 504, an input/output (I/O) port 505, a first serial CCU 506, a second serial CCU 507, and a third serial CCU 508. Further, the control part of the image forming device 400 includes a PI (personal interface) 509. The elements of the controller 511 and the PI 509 are interconnected by the bus 501.

The CPU 500 executes a control program. The ROM 502 stores the control program and control data therein. The RAM 503 provides a working storage area for the CPU 500 when executing the control program. The non-volatile RAM 504 retains operating parameters by using a battery. In the non-volatile RAM 504, transmission data exchanged between the image forming devices 400 and the CSS 460, device codes and ID codes of the image forming devices 400, a telephone number of the CSS 460, the number of redials, and a redial period are stored. The real-time (R/T) clock 510 provides a current time.

The I/O port 505 has an output connected to various motors, solenoids and clutches of the image forming device 400, and has an input connected to various sensors and switches of the image forming device 400. The first serial CCU 506 provides an interface between the CPU 500 and an operation part (not shown) of the image forming device 400. The second serial CCU 507 provides an interface between the CPU 500 and a document feeder (not shown) of the image forming device 400. The third serial CCU 508 provides an interface between the CPU 500 and a copy post-process part (not shown) of the image forming device 400.

The PI 509 provides an interface between the CPU 500 and the DCD 420. If the processing ability of the CPU 500 is adequately high, the functions of the PI 509 may be incorporated in the CPU 500.

The main functions of the PI 509 are (1) the monitoring of a polling or selecting of the DCD 420, (2) the processing of an acknowledgment or a negative acknowledgment to the DCD 420, (3) the check of correctness of a message transmitted to or received from the DCD 420, the parity check and the error detection, and (4) the processing of a header of a message transmitted to or received from the DCD 420.

4.4.1 Structure of Personal Interface

Figure 49:
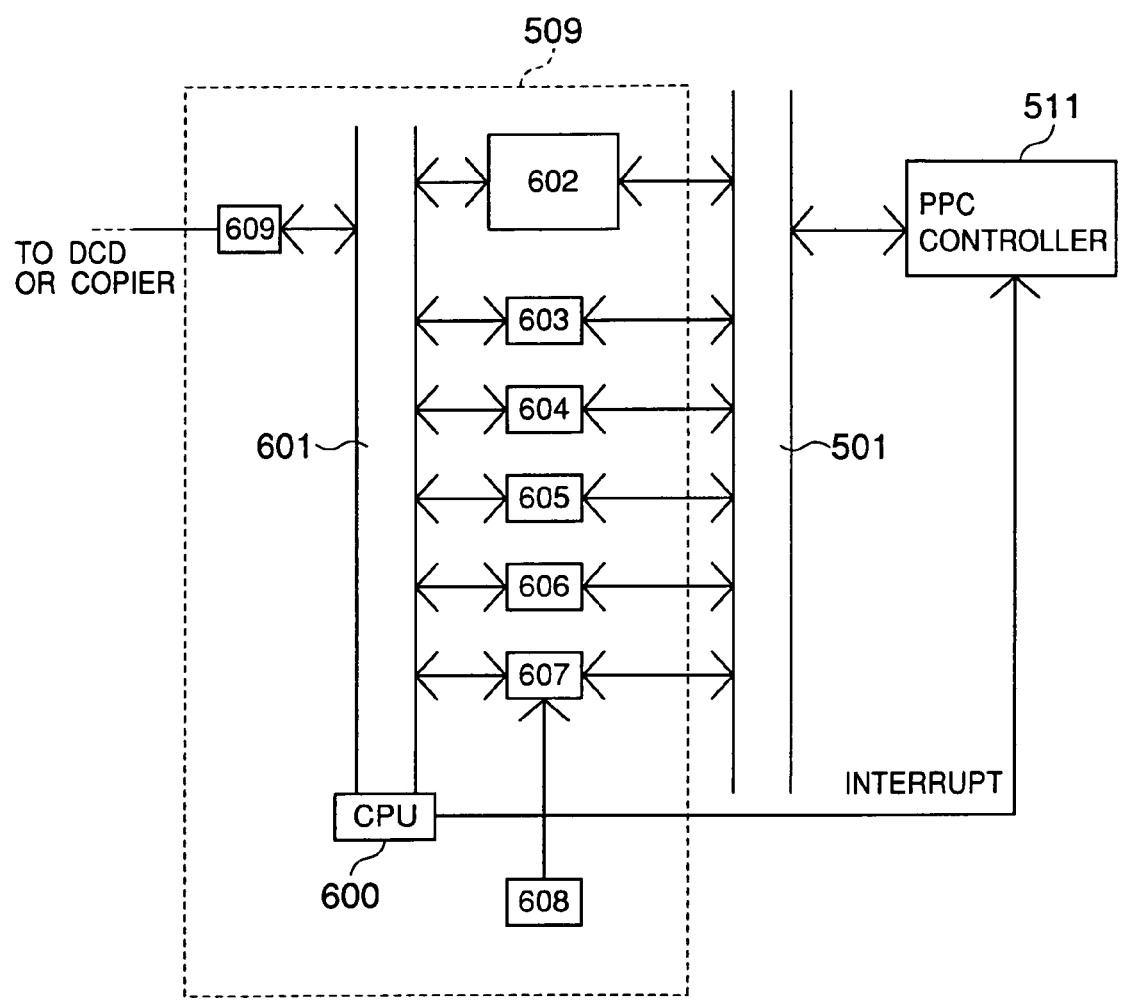
FIG. 49 is a block diagram of a personal interface PI in the control part of the image forming device in the fourth embodiment.

FIG. 49 shows the PI (personal interface) 509 in the control part of the image forming device 400 in the present embodiment.

As shown in FIG. 49, the PI 509 includes a CPU 600, a local bus 602, a dual-port memory 602, a plurality of registers 603 through 606, an input port 607, a device code setting switch 608, and a serial communication interface unit 609.

The CPU 600 is a one-chip microcomputer including a central processing unit, a ROM and a RAM. The CPU 600 controls the elements of the PI 509. The dual-port memory 602 can be accessed by both the CPU 600 of the PI 509 and the CPU 500 of the image forming device 500. The dual-port memory 602 is used when exchanging a message between the PI 509 and the controller 511. The registers 603 through 607 are used for controlling the elements of the PI 509 when exchanging a message between the PI 509 and the controller 511.

The device code setting switch 608 is provided in the PI 509 of each image forming device 400 to set a specific device address of the image forming device 400. The specific device code of each image forming device 400 is used to identify the image forming device 400 when a polling or selecting of the DCD 420 is performed. The serial communication interface unit 609 is connected to the DCD 420 or the PI 509 of a different image forming device 400.

4.5 Control Panel

Figure 50:
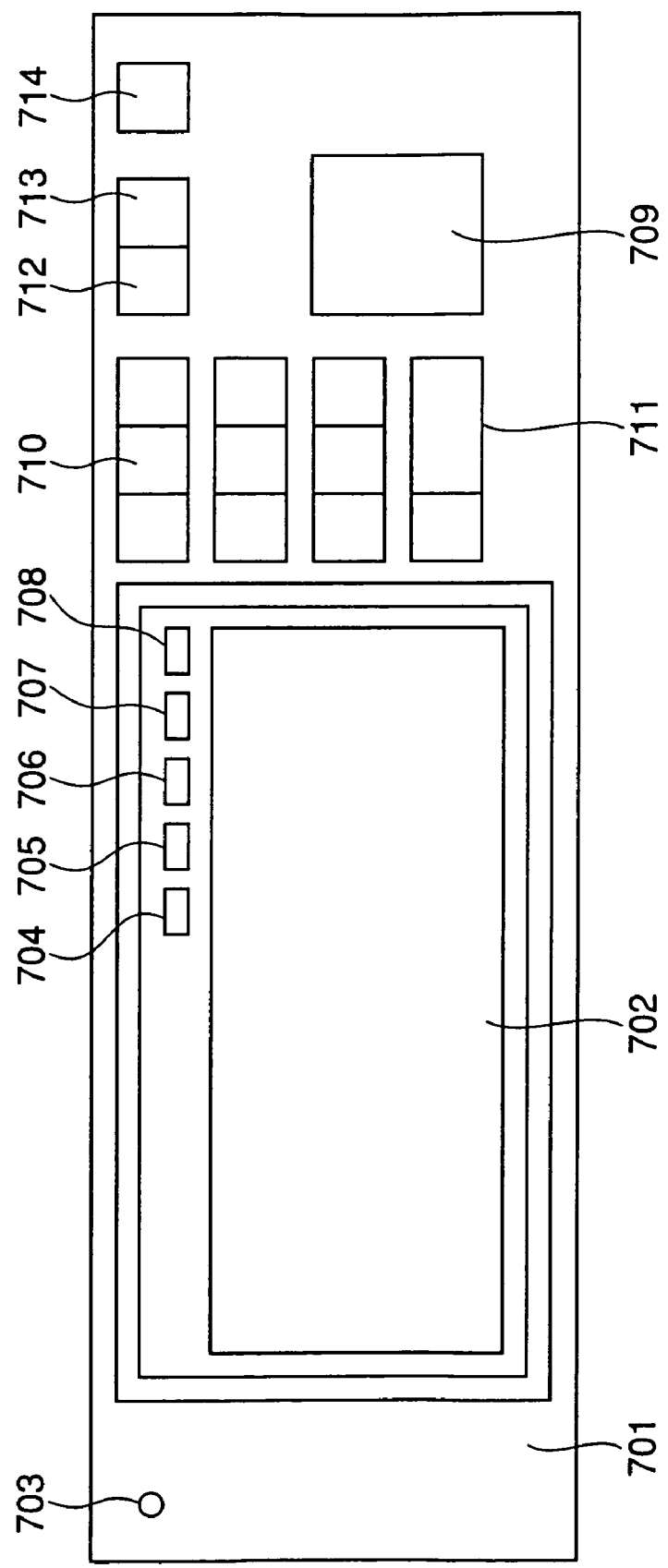
FIG. 50 is a schematic diagram of a control panel of the image forming device in the fourth embodiment.

FIG. 50 shows a control panel 701 of the image forming device 400 in the present embodiment. The control panel 701 includes a control part which is essentially the same as the control part of the image forming device 400 shown in FIG. 48.

As shown in FIG. 50, the control panel 701 includes ten keys 710, a clear/stop key 711, a print key 709, an enter key 712, an interrupt key 713, a preheat/mode clear key 714, a mode check key 704, a screen change key 705, a call key 706, a registration key 707, a guidance key 708, a display contrast volume 703, and a character display part 702.

4.5.1 Character Display Part

Figure 51:
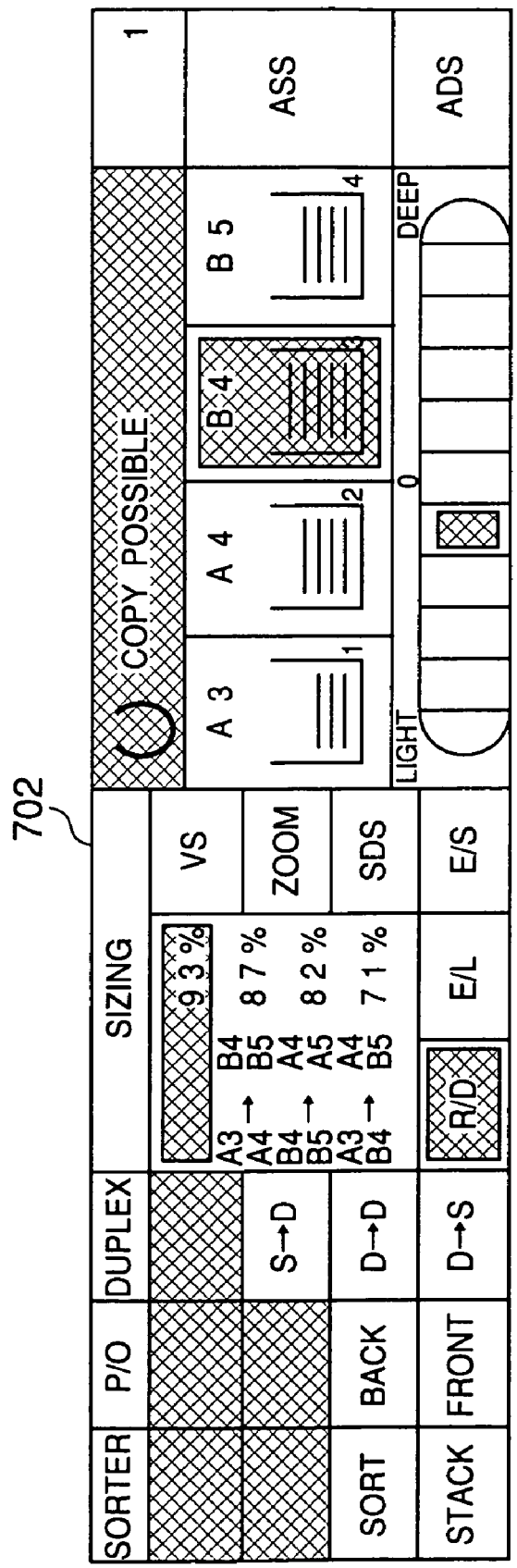
FIG. 51 is a schematic diagram of a character display part in the control panel of the image forming device of FIG. 50.

FIG. 51 shows the character display part 702 in the control panel 701 of the image forming device 400 of FIG. 50.

The character display part 702 of FIG. 51 is prepared by using full-dot liquid crystal display elements with a matrix touch-panel switch of a transparent sheet material attached thereto. In the matrix touch-panel switch, a number of touch sensors (provided for each of 8×8 picture elements) are internally provided. A key of the character display part 702 is turned ON or OFF by pressing or touching it. In addition, indication of an operating state of the image forming device 400, such as "copy possible", "during coping" or "no paper", is displayed on the character display part 702 of the image forming device 400.

4.6 Data Format of Messages

Figure 52:
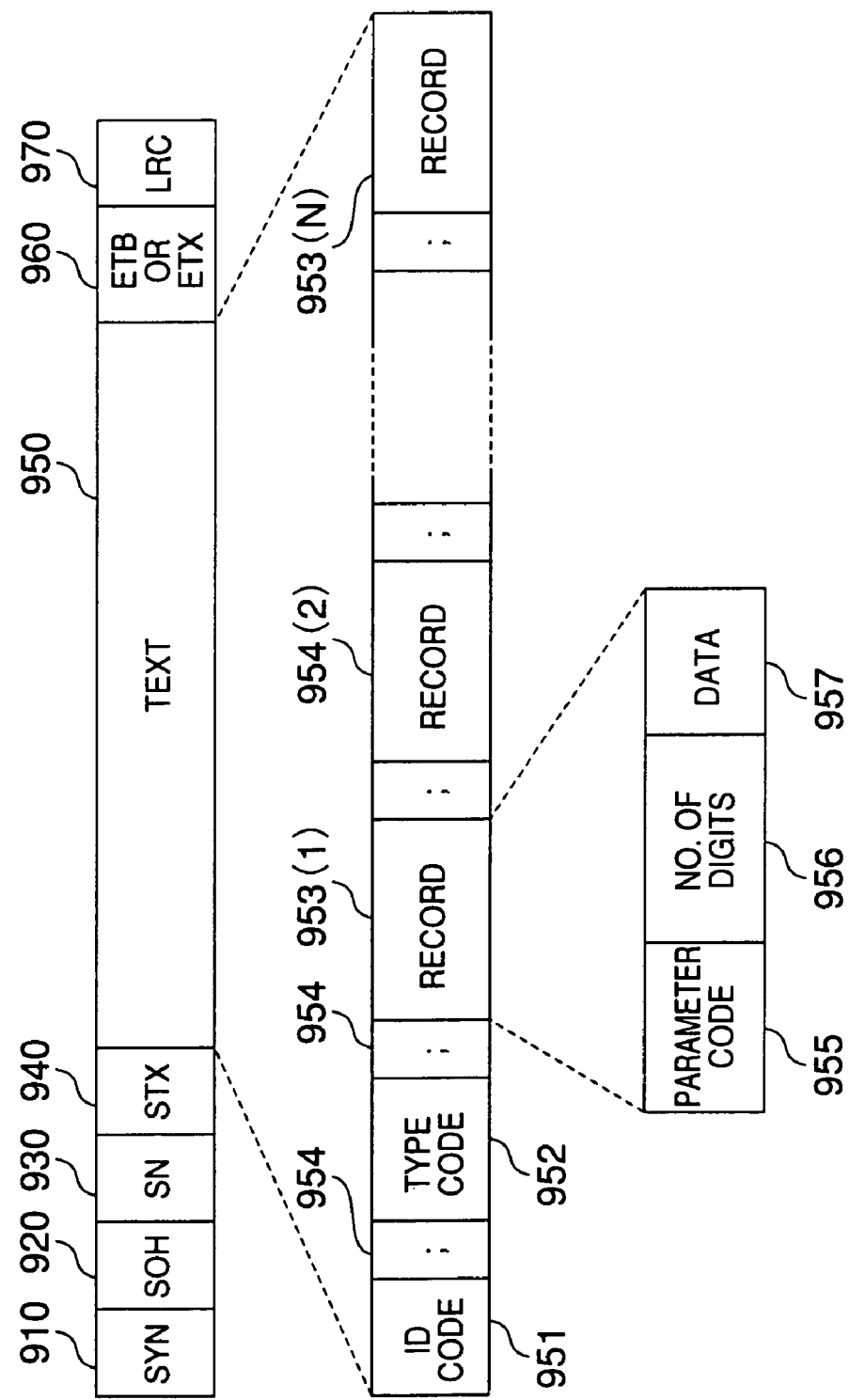
FIG. 52 is a diagram for explaining a data format of a message transmitted between the CSS and the DCD in the fourth embodiment.

FIG. 52 shows a data format of a message transmitted between the CSS 460 and the DCD 420 in the fourth embodiment.

As shown in FIG. 52, the message includes an SYN 910, an SOH 920, an SN 930, an STX 940, a text 950, an ETB or ETX 960, and an LRC 970. The text 950 is exchanged between the CSS 460 and the DCD 420 together with the SYN 910, the SOH 920, the SN 930, the STX 940, the ETB or ETX 960, and the LRC 970. The SN (serial number) 930 indicates a transmission block number of the message within blocks of one transmission. One of numeral values "00" through "99" is sequentially assigned to the SN 930 of each block.

The text 950 includes an ID code 951, a type code 952, and a number of records 953 (including records 953(1) through 953(N)). Each of the records 953 includes a parameter code 955, the number of digits 956, and a data 957. The ID code 951 is used to identify a particular one of the image forming device 400 and the DCD 420. The type code 952 includes a process code, and a text originating device ID and a text receiving device ID added thereto. The type code 952 is predetermined as in the following table.

TABLE 1

| CODE | PROCESS NAME | DESCRIPTION |
| --- | --- | --- |
| 30 | EMERGENCY AUTO CALL | R/M TRANSMISSION IN CASE OF EMERGENCY |
| 31 | MANUAL CALL | R/M TRANSMISSION WHEN MANUAL SWITCH IS TURNED ON |
| 32 | ALARM MESSAGE | R/M TRANSMISSION WHEN ALARM MESSAGE OCCURS |
| 22 | BLOCK BILLING PROCESS | R/M TRANSMISSION WHEN A CONTRACT COPY COUNT IS REACHED |
| 02 | READ PROCESS | READING OF DATA FROM COPIER |
| 04 | WRITE PROCESS | WRITING OF DATA TO COPIER |
| 03 | EXECUTE PROCESS | EXECUTION OF TEST BY R/M |
| 08 | DEVICE CODE CHECK | PROCESS TO CHECK COMMUNICATION FUNCTION |

Each record 953, including the parameter code 955, the number of digits 956 and the data 957, is predetermined as in the following table.

TABLE 2

| CODE | DESCRIPTION |
| --- | --- |
| PARAMETER CODE | INDICATES A KIND OF OPERATING PARAMETER OF A COPIER |
| NO. OF DIGITS | INDICATES A LENGTH OF DATA WHICH FOLLOWS |
| DATA | THE CONTENTS OF EACH RECORD |

As shown in FIG. 52, a separator 954 (which is a semicolon) is inserted between the ID code 951 and the type code 952, between the type code 952 and the first record 953(1), and between the respective records 953.

Figure 53:
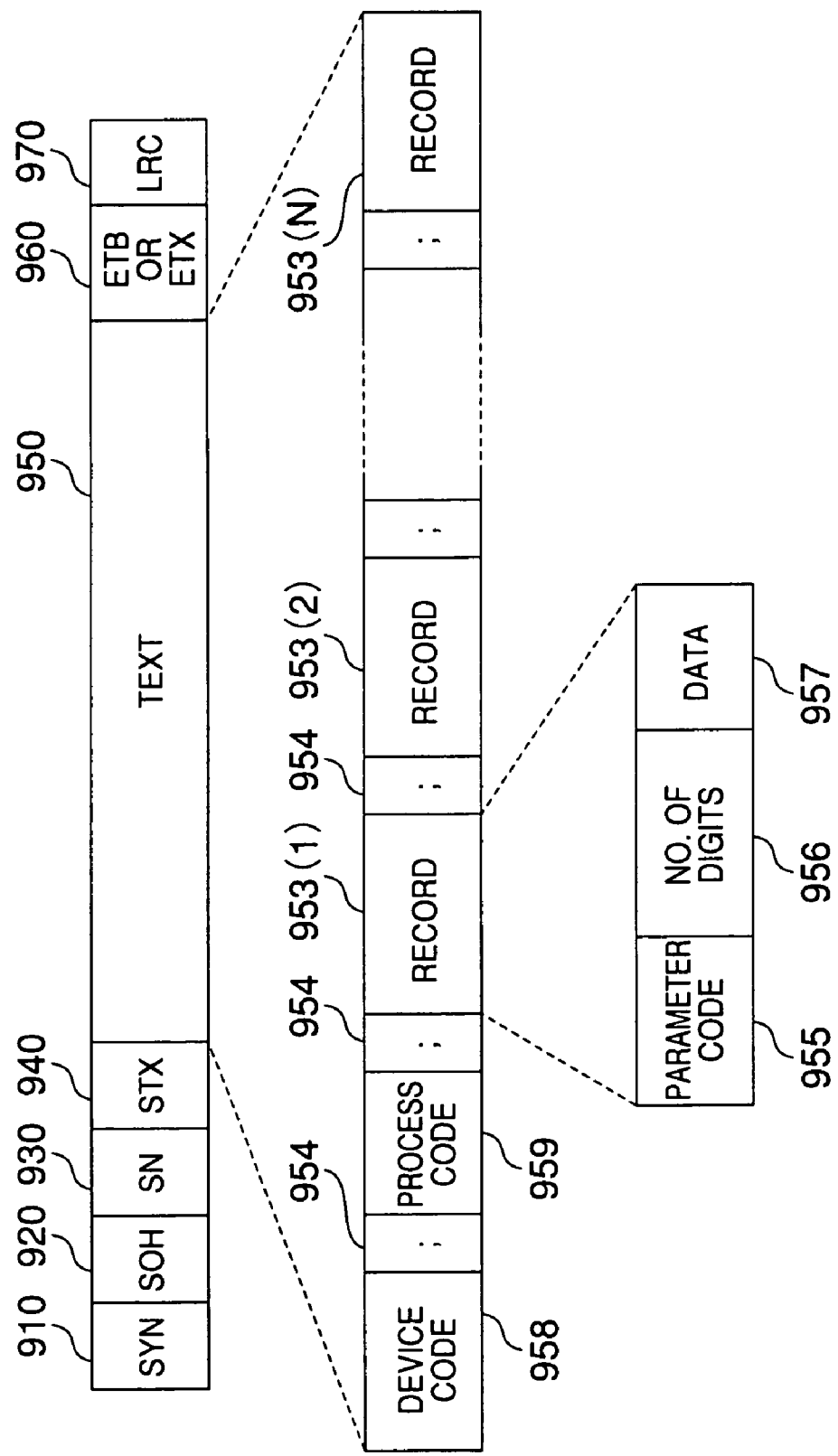
FIG. 53 is a diagram for explaining a data format of a message transmitted between the DCD and the PI in the fourth embodiment.

FIG. 53 shows a data format of a message transmitted between the DCD. 420 and the PI 509.

As shown in FIG. 53, the message includes the SYN 910, the SOH 920, the SN 930, the STX 940, a text 950, the ETB or ETX 960, and the LRC 970. The text 950 includes a device code 958, a process code 959, and a number of records 953 (including records 953(1) through 953(N)). The device code 958 is a specific device address of each of the copiers 400 set by the device code setting switch 608 of the PI 509 of each image forming device 400. The correlation between the device code 958 and the ID code 951 is retained in the non-volatile RAM of the DCD 420. When each image forming device 400 is installed on a user site, the device code 958 is read from the image forming device 400 and transmitted to the DCD 420.

The process code 959 is the same as the process code included in the type code 952. The process code 959 is produced by eliminating the text originating de vice ID and the text receiving device ID from the type code 952. Each of the records 953 in the message of FIG. 53 includes the parameter code 955, the number of digits 956, and the data 957, similar to that in the message of FIG. 52.

Figure 54:
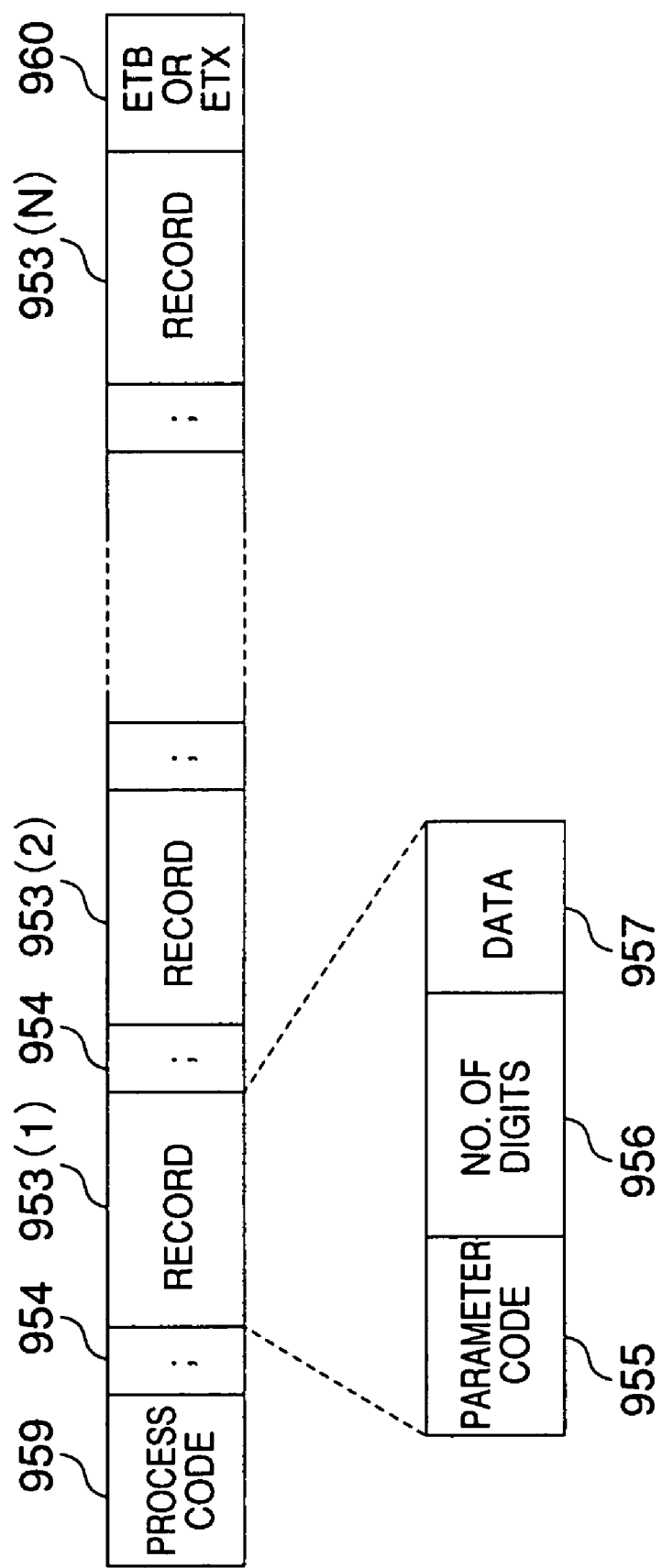
FIG. 54 is a diagram for explaining a data format of a message transmitted between the PI and the image forming device in the fourth embodiment.

FIG. 54 shows a data format of a message transmitted between the PI 509 and the image forming device 400 (or the controller 511). As shown in FIG. 54, the message is produced by eliminating the header, the device code and the parity portion from the message of FIG. 53 transmitted between the DCD 420 and the PI 509.

4.7 Block Billing Function

The block billing function is provided for the image forming device management system to establish a charge for a predetermined number of copy sheets as a contract for use of each image forming device 400. To attain the block billing function, it is necessary that a precise copy count at a start of the block billing of each image forming device 400 and a precise copy count at an end of the block billing be safely managed by the image forming device management system.

4.7.1 Block Billing Start Process

In the present embodiment, each of the image forming devices 400 receives a non-resettable copy count and a remote message cycle, both transmitted to the image forming device 400 by the CSS 460 through the DCD 420 at a start of the block billing contract. The non-resettable copy count indicates a predetermined number of copy sheets related to the block billing contract for use of the image forming device 400. The remote message cycle indicates a frequency at which the image forming device 0.400 transmits a remote message (including a block billing start copy count) to the CSS 460. The transmission of the non-resettable copy count and the remote message cycle to the image forming device 400 is carried out by using the selecting of the DCD 420 to the image forming device 400.

Figure 55:
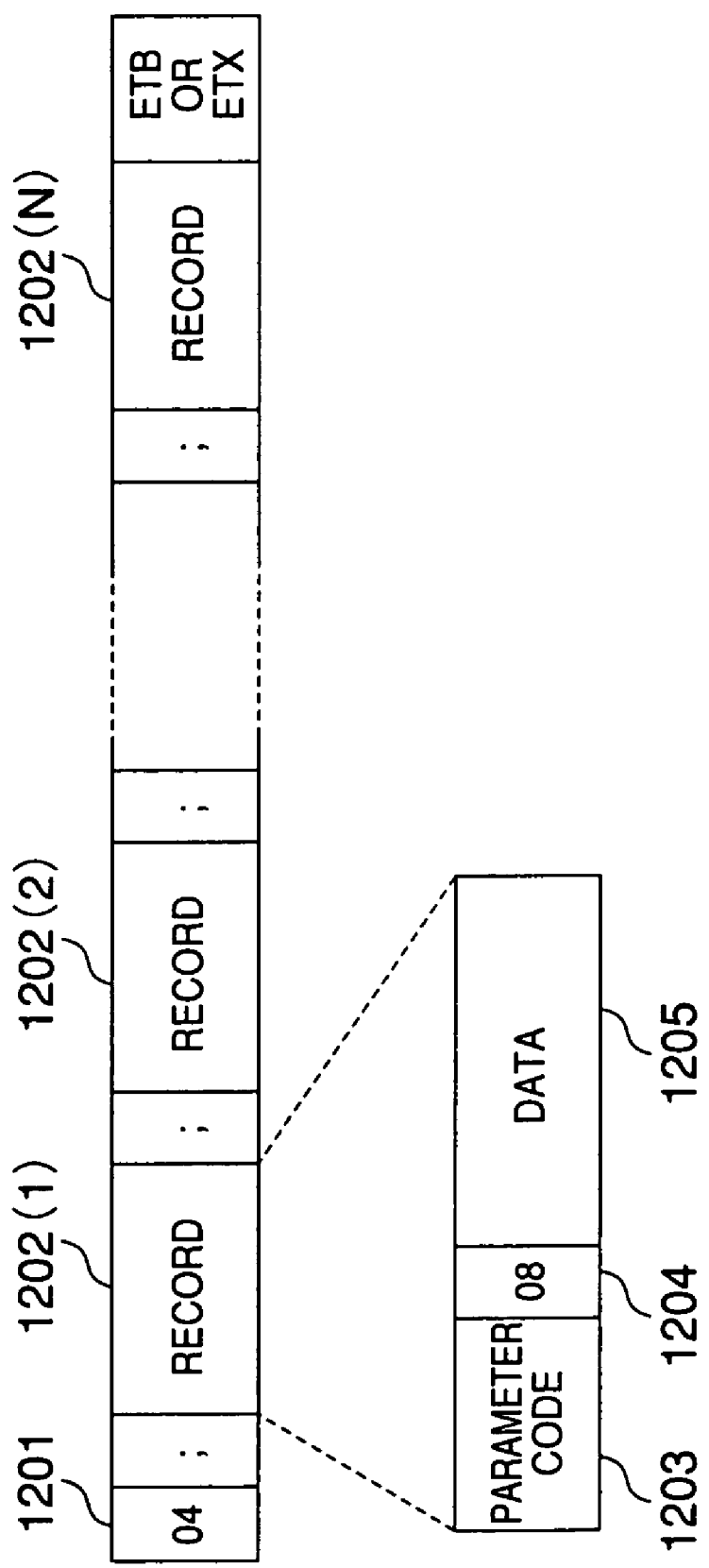
FIG. 55 is a diagram for explaining a data format of the message transmitted between the PI and the image forming device in the fourth embodiment.

FIG. 55 shows a data format of a remote message transmitted between the PI 509 and the image forming device 400 when the image forming device 400 receives the remote message (including a block billing start copy count) from the CSS 460.

As shown in FIG. 55, the data format of the message is essentially the same as that of the message of FIG. 54. The message of FIG. 55 includes a process code 1201, a number of records 1202 (including records 1202(1) through 1202(N)), and the ETB or ETX. Each record 1202 includes a parameter code 1203, the number of digits 1204, and a data 1205.

The process code 1201 is set at "04" as listed in the TABLE 1 above. The parameter code 1203 of the record 1202(1) indicates a kind of an operating parameter (or a block billing start copy count). The number of digits 1204 is set at "08" in ASCII code. The data 1205 is set at the block billing start copy count, and this data is written to the memory of the image forming device 400 as the non-resettable copy count. The record 1202(1) carrying the non-resettable copy count is transmitted from the CSS 460 through the PI 509 to the image forming device 400. Similarly, the record 1202(2) carrying the remote message cycle is transmitted from the CSS 460 through the PI 509 to the image forming device 400.

The non-resettable copy count and the remote message cycle, both transmitted to the image forming device 400 by the CSS 460 through the DCD 420 at a start of the block billing contract, are processed by the CPU 500 of the image forming device 400 and stored in the non-volatile RAM 504. Hence, the CPU 500 acts as a receiving means for receiving the non-resettable copy count and the remote message cycle, and the non-volatile RAM 504 acts as a first storage means for storing the non-resettable copy count and the remote message cycle. Further, the CPU 500 acts as a control means for setting the image forming device 400 in a remote message enable state when a difference between a current copy count and the received copy count reaches an integral multiple of the remote message cycle. The CPU 500 acts as a remote message means for transmitting a remote message through the DCD 420 to the CSS 460 after the image forming device 400 is set in the remote message enable state.

The non-volatile RAM 504 acts as a second storage means for storing a current copy count that is incremented every time an image formation of one copy sheet is performed by the image forming device 400.

Figure 56:
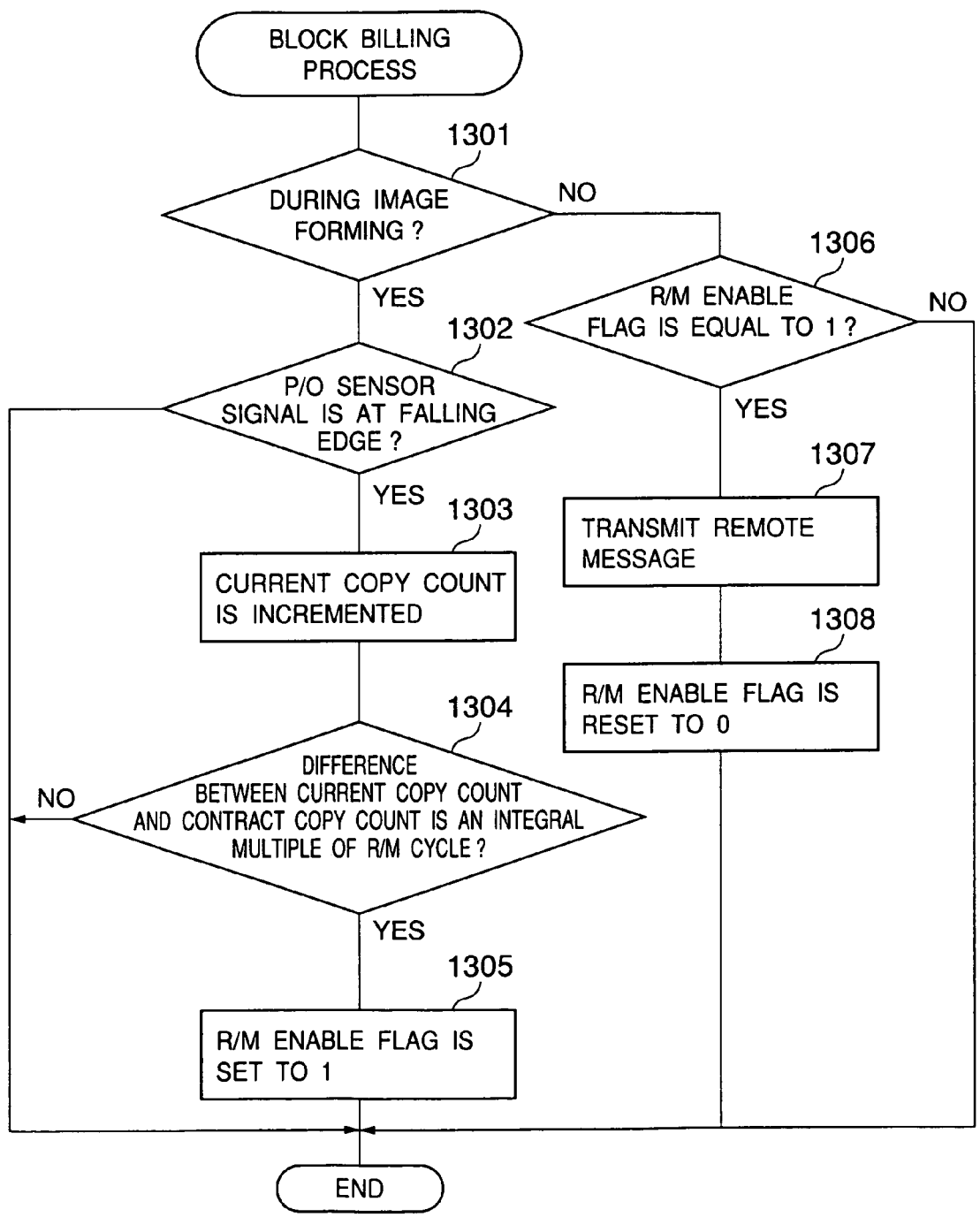
FIG. 56 is a flowchart for explaining a block billing process performed by the image forming device in the fourth embodiment.

FIG. 56 shows a block billing process performed by the CPU 500 of the image forming device 400 in the present embodiment.

In the present embodiment, suppose that a paper-out (P/O) sensor (not shown) for sensing an ejection of a copy sheet out of the image forming device 400 is connected to an input of the I/O port 505, and outputs a P/O sensor signal to the CPU 500 via the I/O port 505.

As shown in FIG. 56, at the start of the block billing process, the CPU 500 at step 1301 determines whether the image forming device 400 is in an image forming state. When the image forming device 400 is in an image forming state, the CPU 500 at step 1302 determines whether the P/O sensor signal is at its falling edge. When the result at the step 1302 is affirmative, the CPU 500 at step 1303 increments the current copy count of the image forming device 400. The CPU 500 at step 1304 determines whether a difference between the current copy count and the received copy count (or the block billing start copy count) reaches an integral multiple of the remote message cycle.

In the step 1304, it is determined whether the following calculation (or the division) results in an integer:

$$\text{(the current copy count} - \text{the received copy count)} / \text{(the remote message cycle)} \quad (1)$$

When the result at the step 1304 is affirmative, the CPU 500 at step 1305 sets a remote message (R/M) flag to "1" (or an ON state). After the step 1305 is performed, the CPU 500 ends the block billing process of FIG. 56.

When the result at the step 1301 is negative (or the image forming device 400 stops the image formation), the CPU 500 at step 1306 determines whether the R/M enable flag is equal to "1". When the result at the step 1306 is affirmative, the CPU 500 at step 1307 transmits a remote message through the DCD 420 to the CSS 460. The transmission of the message is carried out by using a selecting of the DCD 420. After the step 1307 is performed, the CPU 500 at step 1308 resets the R/M enable flag to "0" (or an OFF state). After the step 1308 is performed, the CPU 500 ends the block billing process.

In the block billing process of FIG. 56, the image forming device 400 is unable to perform the automatic message transmission during the image formation. However, if the ability of the image forming device 400, including the CPU 500, is adequately high, it is possible to perform the automatic message transmission even when the image forming device 400 is in the image forming state. In such a case, the setting of the R/M enable flag to 1" or "0" is not needed.

4.7.2 Data Format of Remote Message

Figure 57:
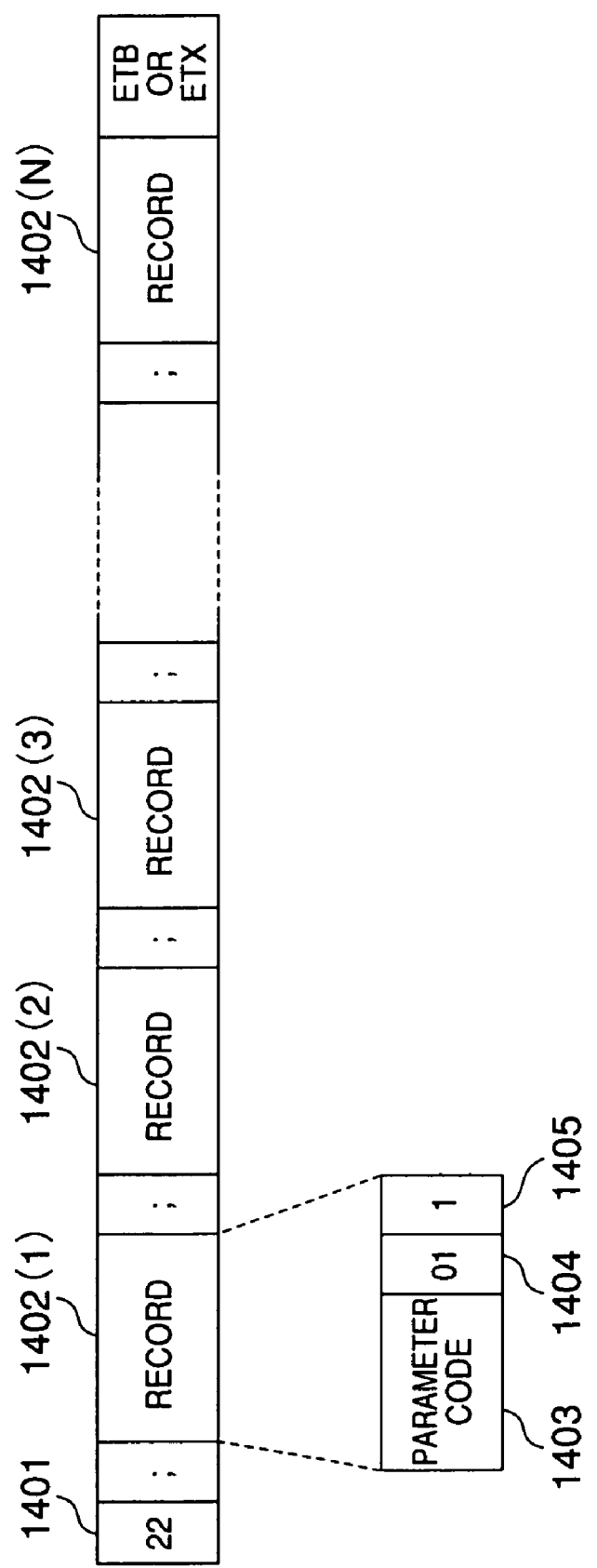
FIG. 57 is a diagram for explaining a data format of a message transmitted between the PI and the image forming device during the block billing process.

FIG. 57 shows a data format of a remote message transmitted between the PI 509 and the image forming device 400 when the step 1307 in the block billing process of FIG. 56 is performed. The data format of the remote message is essentially the same as that of the message of FIG. 54.

As shown in FIG. 57, the remote message includes a process code 1401, a number of records 1402 (including records 1402(1) through 1402(N)), and the ETB or ETX. Each record 1402 includes a parameter code 1403, the number of digits 1404, and a data 1405.

The process code 1401 is set at "22" as listed in the TABLE 1 above. The parameter code 1403 of the record 1402(1) indicates a kind of an operating parameter (or a block billing start copy count). The number of digits 1404 is set at "01" in ASCII code. The data 1405 is set at the block billing start copy count is set at "1", and this data indicates an occurrence of a remote massage. The data 1405 when the automatic message transmission is performed is always set at "1", and "0" is not used for the data 1405. The records 1402(2) through 1402(N) may be omitted if they are not needed.

A description of the data formats of a remote message transmitted between the PI 509 and the DCD 420 and a remote message transmitted between the DCD 420 and the CSS 460 will be omitted. Similar to the data format of the remote message of FIG. 57, the data formats of these remote messages may be defined.

4.7.3 Block Billing End Process

A block billing end process performed by the CPU 500 of the image forming device 400 in the present embodiment is essentially the same as the block billing process of FIG. 56 except that the block billing start copy count of the latter process is substituted by a block billing end copy count.

At the start of the block billing end process, the CPU 500 at step 1301 determines whether the image forming device 400 is in an image forming state. When the image forming device 400 is in an image forming state, the CPU 500 at step 1302 determines whether the P/O sensor signal is at its falling edge. When the result at the step 1302 is affirmative, the CPU 500 at step 1303 increments the current copy count of the image forming device 400. The CPU 500 at step 1304 determines whether a difference between the current copy count and the received copy count (or the block billing end copy count) reaches an integral multiple of the remote message cycle.

In the step 1304, it is determined whether the following calculation (or the division) results in an integer:

$$\text{(the received copy count} - \text{the current copy count)}/\text{(the remote message cycle)} \quad (2)$$

When the result at the step 1304 is affirmative, the CPU 500 at step 1305 sets the remote message (R/M) flag to "1" (or the ON state). After the step 1305 is performed, the CPU 500 terminates the block billing end process.

When the result at the step 1301 is negative (or the image forming device 400 stops the image formation), the CPU 500 at step 1306 determines whether the R/M enable flag is equal to "1". When the result at the step 1306 is affirmative, the CPU 500 at step 1307 transmits a remote message through the DCD 420 to the CSS 460. The transmission of the remote message is carried out by using a selecting of the DCD 420. After the step 1307 is performed, the CPU 500 at step 1308 resets the R/M enable flag to "0" (or the OFF state). After the step 1308 is performed, the CPU 500 terminates the block billing end process.

According to the block billing process and the block billing end process in the above-described embodiment, the image forming device 400 is set in the remote message enable state only when the difference between the current copy count and the received copy count reaches an integral multiple of the remote message cycle. The CPU 500 transmits a remote message to the CSS 460 after the image forming device 400 is set in the remote message enable state. It is possible for the image forming device management system of the present embodiment to efficiently carry out a precise block billing function.

Figure 58:
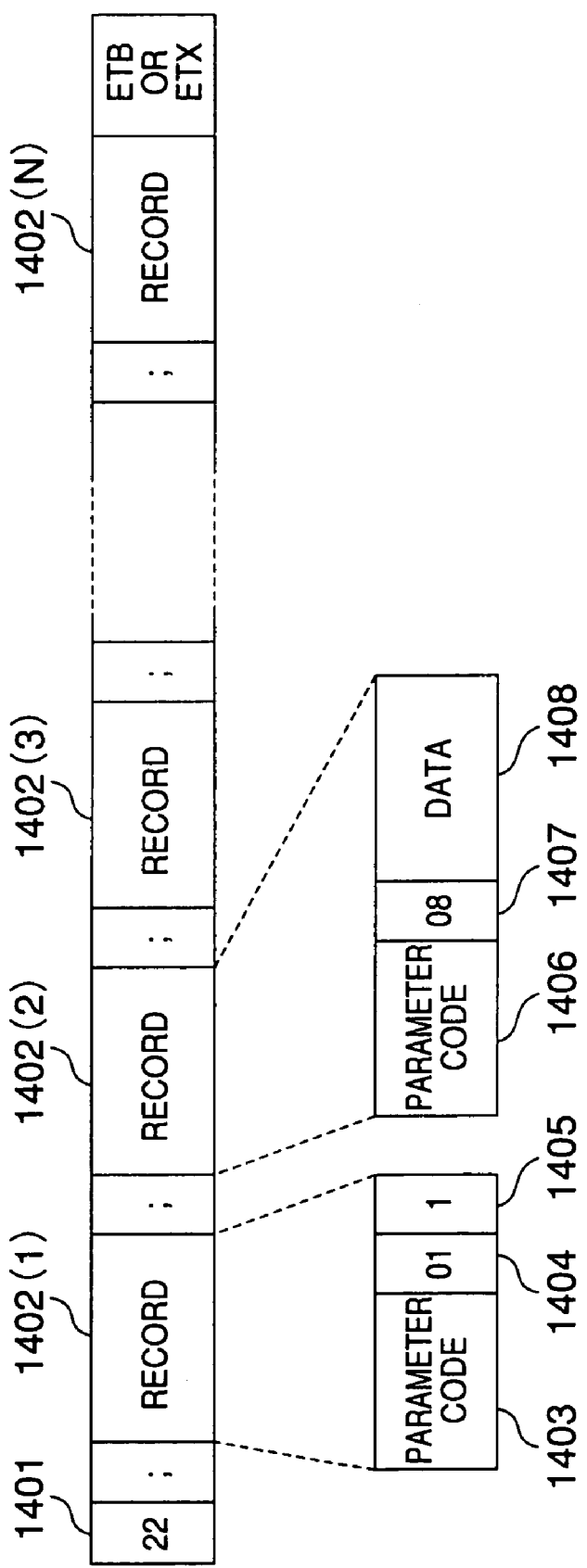
FIG. 58 is a diagram for explaining another data format of the message transmitted between the PI and the image forming device during the block billing process.

FIG. 58 shows another data format of the remote message transmitted between the PI 509 and the image forming device 400 when the step 1307 in the block billing process of FIG. 56 is performed. The data format of the remote message is essentially the same as that of the remote message of FIG. 57.

As shown in FIG. 58, the record 1402(1) of this remote message is the same as that of the remote message of FIG. 57. A parameter code 1406 of the record 1402(2) indicates a kind of an operating parameter (or the current copy count). The number of digits 1407 of the record 1402(2) is set at "08" in ASCII code. A data 1408 of the record 1402(2) is set at the current copy count. The records 1402(3) through 1402(N) may be omitted if they are not needed.

A description of the data formats of a remote message transmitted between the PI 509 and the DCD 420 and a remote message transmitted between the DCD 420 and the CSS 460 will be omitted. Similar to the data format of the remote message of FIG. 58, the data formats of these remote messages may be defined.

4.8 Display Of User-Program Mode Indication

In the present embodiment, at least one of the current copy count, the contract start copy count (or the block billing start copy count) and the contract end copy count (or the block billing end copy count) is displayed on the character display part 702 in the control panel 701 of the image forming device 400. It is possible for the present embodiment to provide an easy-to use management operation for the user of the image forming device 400.

Figure 59:
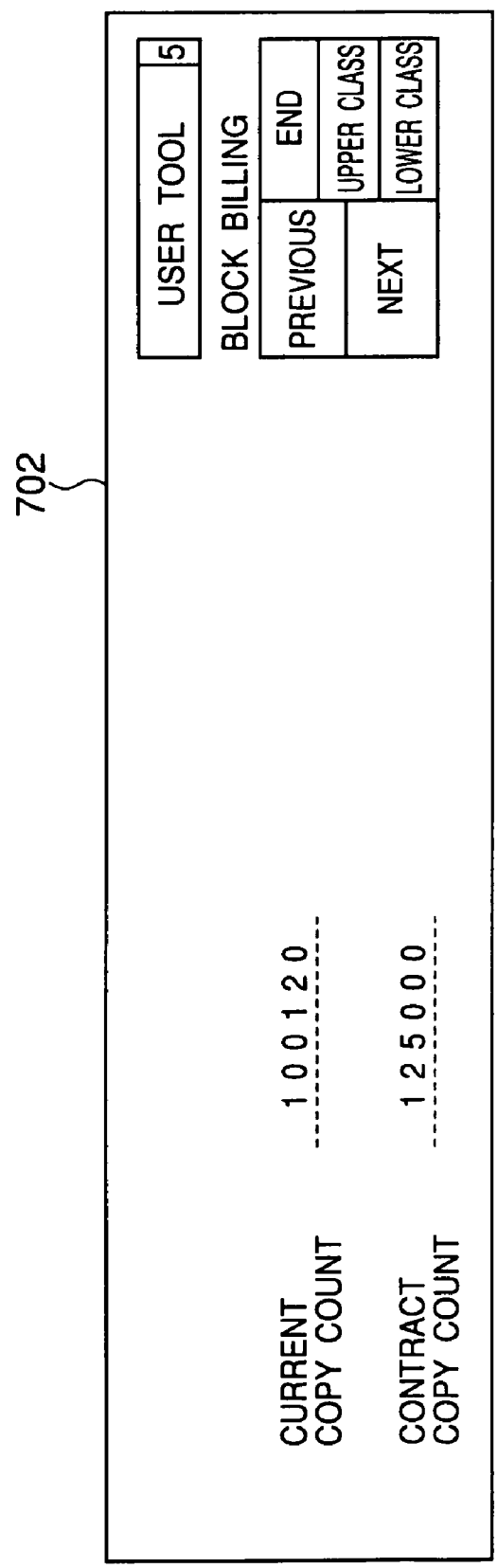
FIG. 59 is a schematic diagram of a user-program mode indication displayed on the character display part in the control panel of the image forming device.

FIG. 59 shows a user-program mode indication (or a block billing indication) displayed on the character display part 702 in the control panel 701 of the image forming device 400.

The image forming device 400 in the present embodiment may be shifted to a user-program mode, and during the user-program mode the user can perform a setting of a special operating parameter of the image forming device 400 which cannot be performed in the image formation mode. For example, the image formation mode of the image forming device 400 may be shifted to the user-program mode when the user manually inputs a secret number to the CPU 500 by pressing the ten keys 710, the clear/stop key 711, the enter key 712 and/or the preheat/mode clear key 714. Alternatively, a block billing key for the above purpose may be provided in the control panel 701 of the image forming device 400 or may be displayed on the character display part 702 of the image forming device 400.

In the example of the block billing indication shown in FIG. 59, the current copy count and the contract end copy count are displayed on the character display part 702 in the control panel 701 of the image forming device 400. The current copy count and the contract end copy count are read from the non-volatile RAM 504 by the CPU 500, and they are transmitted through a display control part (not shown) to the character display part 702 by the CPU 500, so that the block billing indication is displayed.

5. Fifth Embodiment

The present embodiment of the image forming device management system is characterized in that the CSS 460 transmits a parameter code, indicating a kind of a particular one of the operating parameters, through the DCD 420 to the image forming device 400, and the image forming device 400 determines, in response to an access request, an absolute address of the memory of the image forming device 400 by the parameter code, and accesses the particular one of the operating parameters in the memory at the absolute address.

The present embodiment is characterized in that the image forming devices are of different models and share a common parameter code indicating an identical kind for the operation parameters of the individual image forming devices regardless of the model of each image forming device.

In the present embodiment, the structure of the image forming device management system, the structure of the image forming device 400, the structure of the DCD 420, the structure of the CSS 460, the communication sequences, and the data format of messages are essentially the same as corresponding elements of the previous embodiment described in the above sections 4.1 through 4.6. A description will now be given of only features of the fifth embodiment of the image forming device management system which are different from those of the previous embodiment.

5.1 Structure of System

Figure 60:
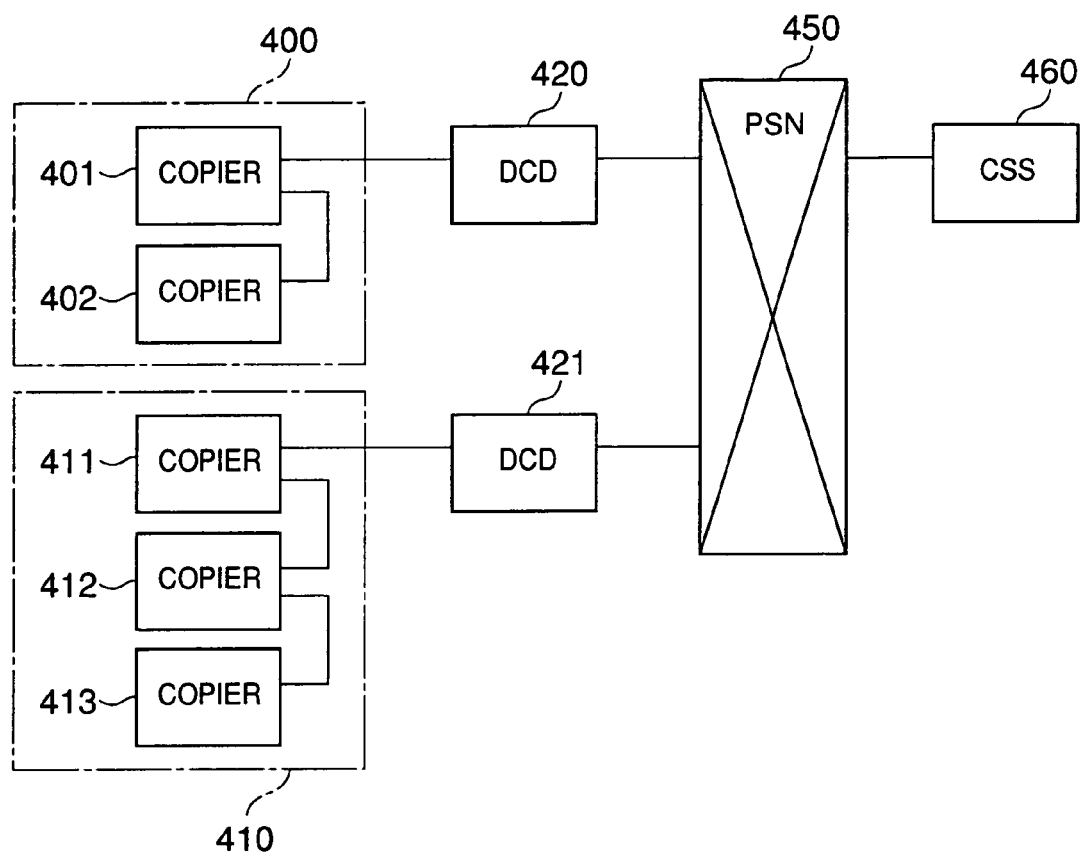
FIG. 60 is a block diagram of a fifth embodiment of the image forming device management system of the present invention.

FIG. 60 shows a fifth embodiment of the image forming device management system.

The system of FIG. 60 is different from the system of FIG. 44 in that two DCD devices 420 and 421 are provided, one group 400 of image forming devices 401 and 402 is connected through the DCD 420 to the CSS 460, and another group 410 of image forming devices 411 through 413 is connected through the DCD 421 to the CSS 460. Hereinafter, one of these image forming devices will be called the image forming device 400 or the copier 400 for the sake of convenience. Other structure of the system of FIG. 60 are essentially the same as that of the system of FIG. 44. The elements of the system of FIG. 60 which are the same as corresponding elements in FIG. 44 are designated by the same reference numerals, and a description thereof will be omitted.

5.2 Memory Address

In the image forming device 400, a parameter code table is stored in the ROM 502. In accordance with the data format of the message shown in FIG. 54, respective memory addresses of the ROM 502 for storing the operating parameters of the image forming device 400 are predetermined. In the parameter code table, respective parameter codes corresponding to the memory addresses of the ROM 502 are provided, and each parameter code indicates a kind of a particular one of the operating parameters.

FIG. 61 shows a parameter code stored in the ROM 502 of the image forming device 400. In the present embodiment, the image forming devices are of different models and share a common parameter code indicating an identical kind for the operation parameters of the individual image forming devices regardless of the model of each image forming device.

5.3 Communication Sequences

Figure 62A:
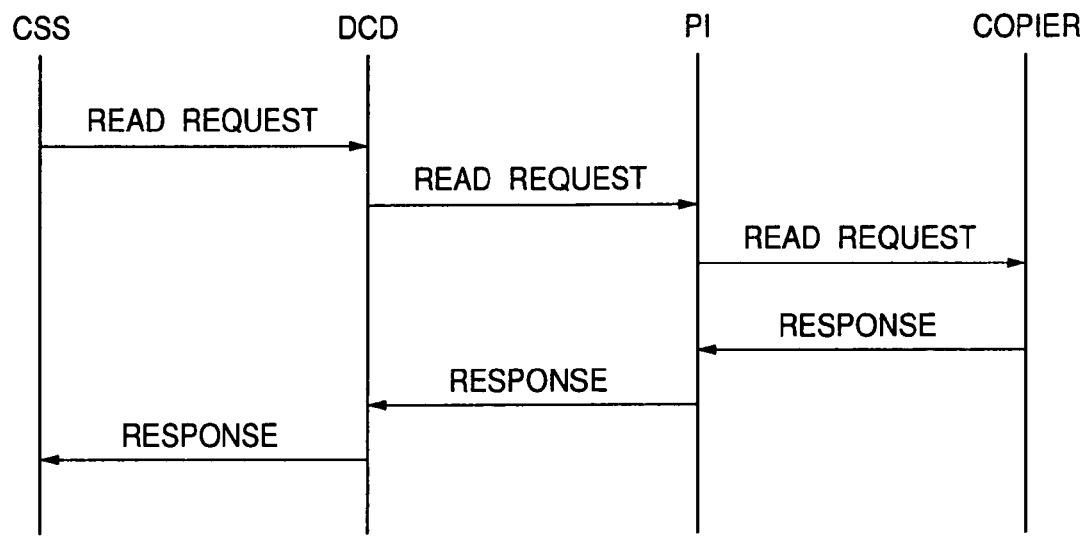
FIG. 62A and FIG. 62B are diagrams for explaining respective communication sequences when a read request and a write request are transmitted to the image forming device by the CSS.
Figure 62B:
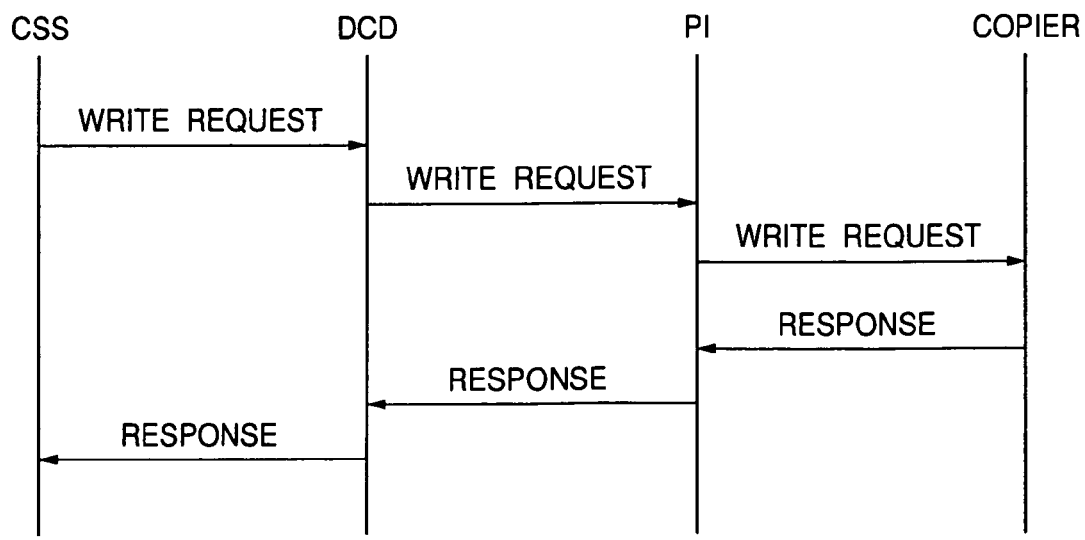

FIG. 62A and FIG. 62B show respective communication sequences when a read request and a write request are transmitted to the image forming device 400 of concern by the CSS 460.

In each of the read request (FIG. 62A) and the write request (FIG. 62B), the copier 400 of concern receives an access request sent by the CSS 460. By making reference to the parameter code table of the ROM 502 by a parameter code of the access request, the copier 400 determines an absolute address of the memory of the copier 400 by the parameter code, and accesses a particular one of the operating parameters in the memory at the absolute address. In the case of the read request, the copier 400 reads out the operating parameter from the memory at the absolute address, and transmits the read data through the DCD 420 to the CSS 460. In the case of the write request, the copier 400 writes data of the write request to the memory at the absolute address, and transmits the written data through the DCD 420 to the CSS 460.

5.4 Control Process of Copier

5.4.1 Main Control Process

Figure 63:
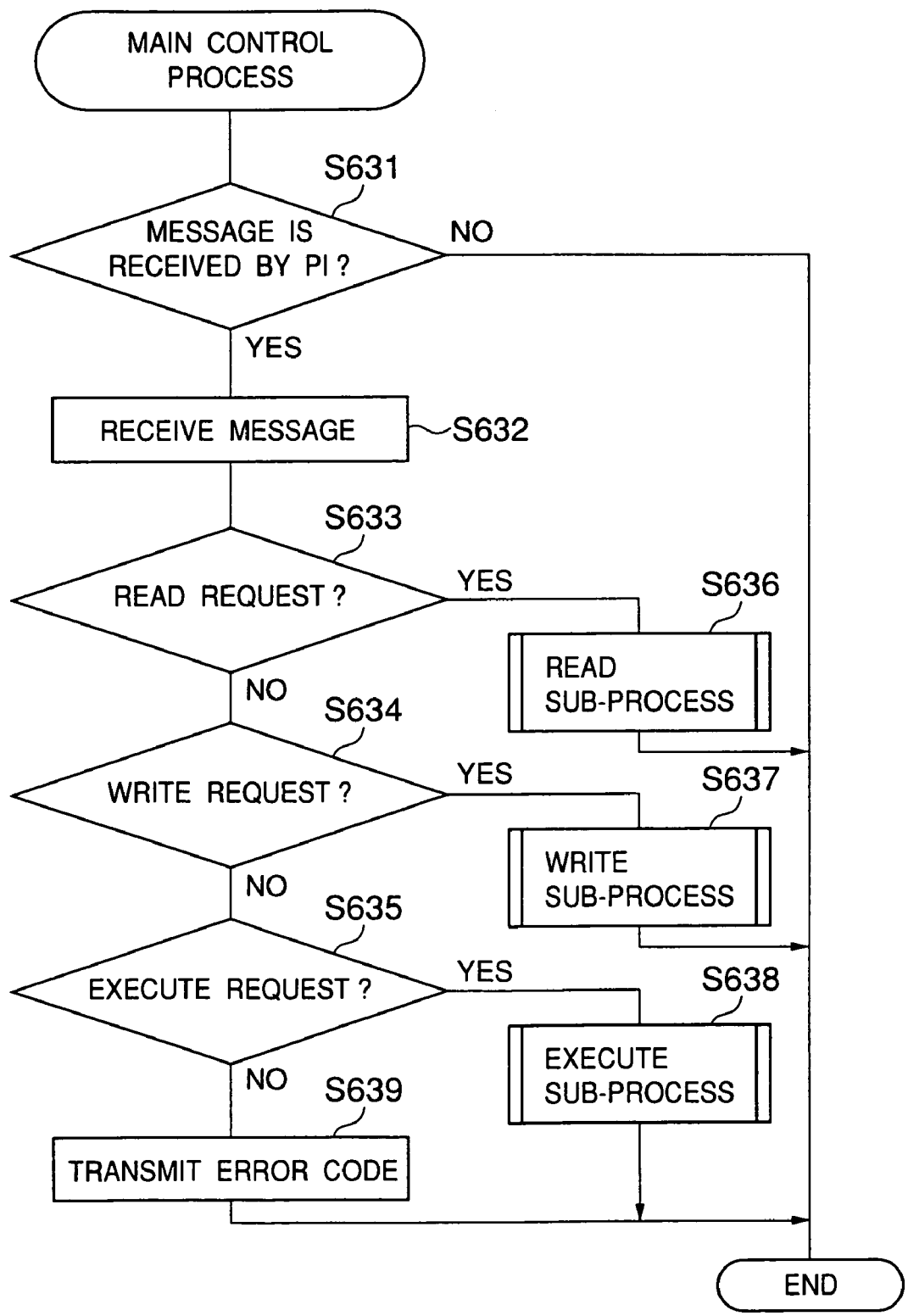
FIG. 63 is a flowchart for explaining a main control process performed by a control part of the image forming device when an access request is transmitted to the image forming device by the CSS.

FIG. 63 shows a main control process performed by the CPU 500 of the image forming device 400 when an access request is transmitted to the image forming device 400 by the CSS 460. The main control process of FIG. 63 is essentially the same as the process of FIG. 20 except that the step S41 of the process of FIG. 20 is eliminated from the main control process of FIG. 63.

5.4.2 Read Sub-Process

Figure 64:
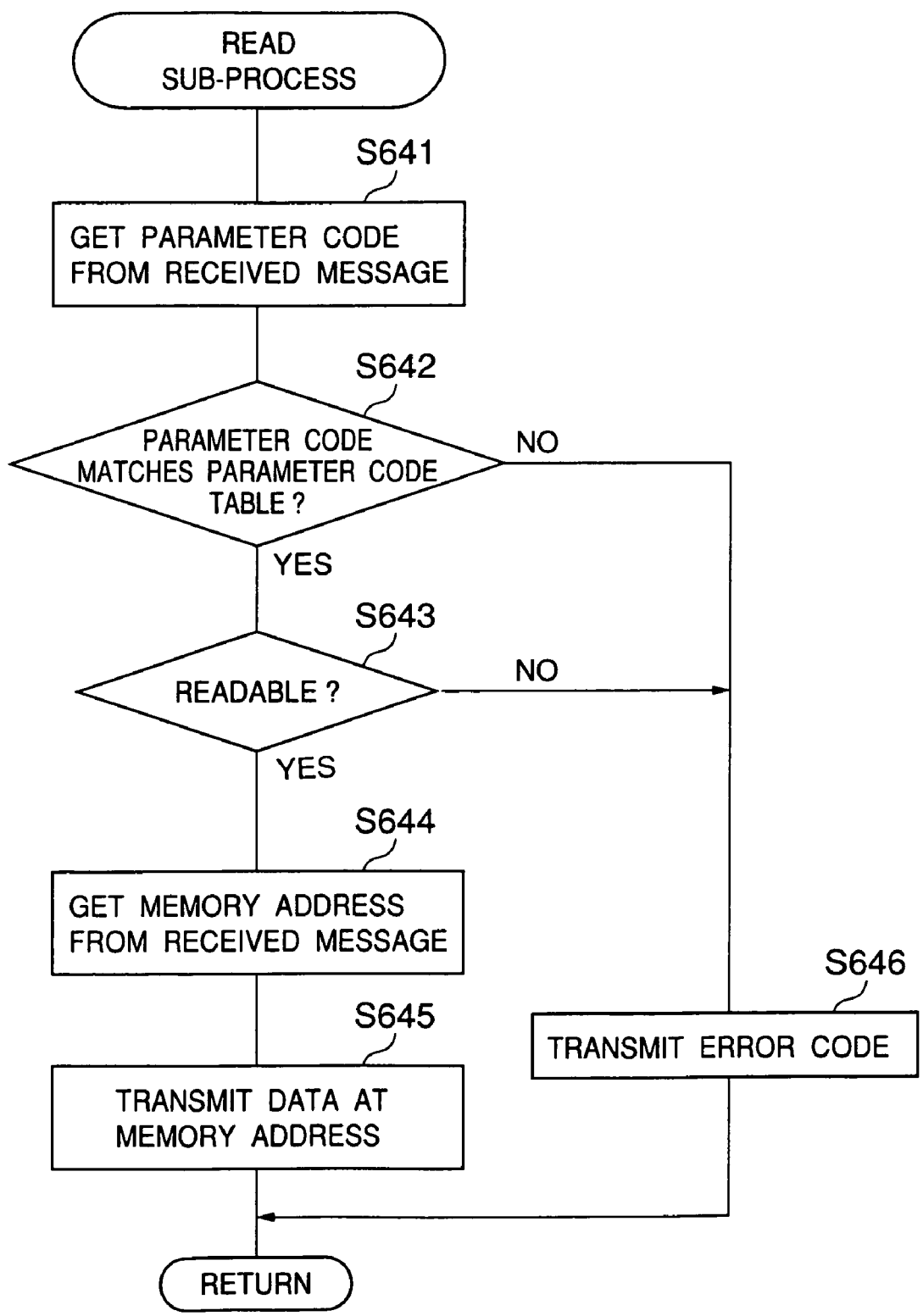
FIG. 64 is a flowchart for explaining a read sub-process in the main control process of FIG. 63.

FIG. 64 shows a read sub-process S636 in the main control process of FIG. 63. As shown in FIG. 64, the CPU 500 at step S641 gets a parameter code from the received read request. The CPU 500 makes reference to the parameter code table of the ROM 502 of the copier 400 by the parameter code. The CPU 500 at step S642 determines whether the received parameter code matches the parameter code table of the ROM 502. When the received parameter code matches the parameter code table, the CPU 500 at step S643 determines whether the received parameter code indicates a readable operating parameter by detecting a corresponding item of the parameter code in the parameter code table. When the received parameter code indicates a readable operating parameter, the CPU 500 at step S644 determines a memory address from the parameter code of the received read request by detecting a corresponding item of the parameter code in the parameter code table. The CPU 500 at step S645 transmits the data, read from the memory at the memory address, to the DCD 420. When the received parameter code does not indicate a readable operation parameter, the CPU 500 at step S646 transmits an error code to the DCD 420.

5.4.3 Write Sub-Process

Figure 65:
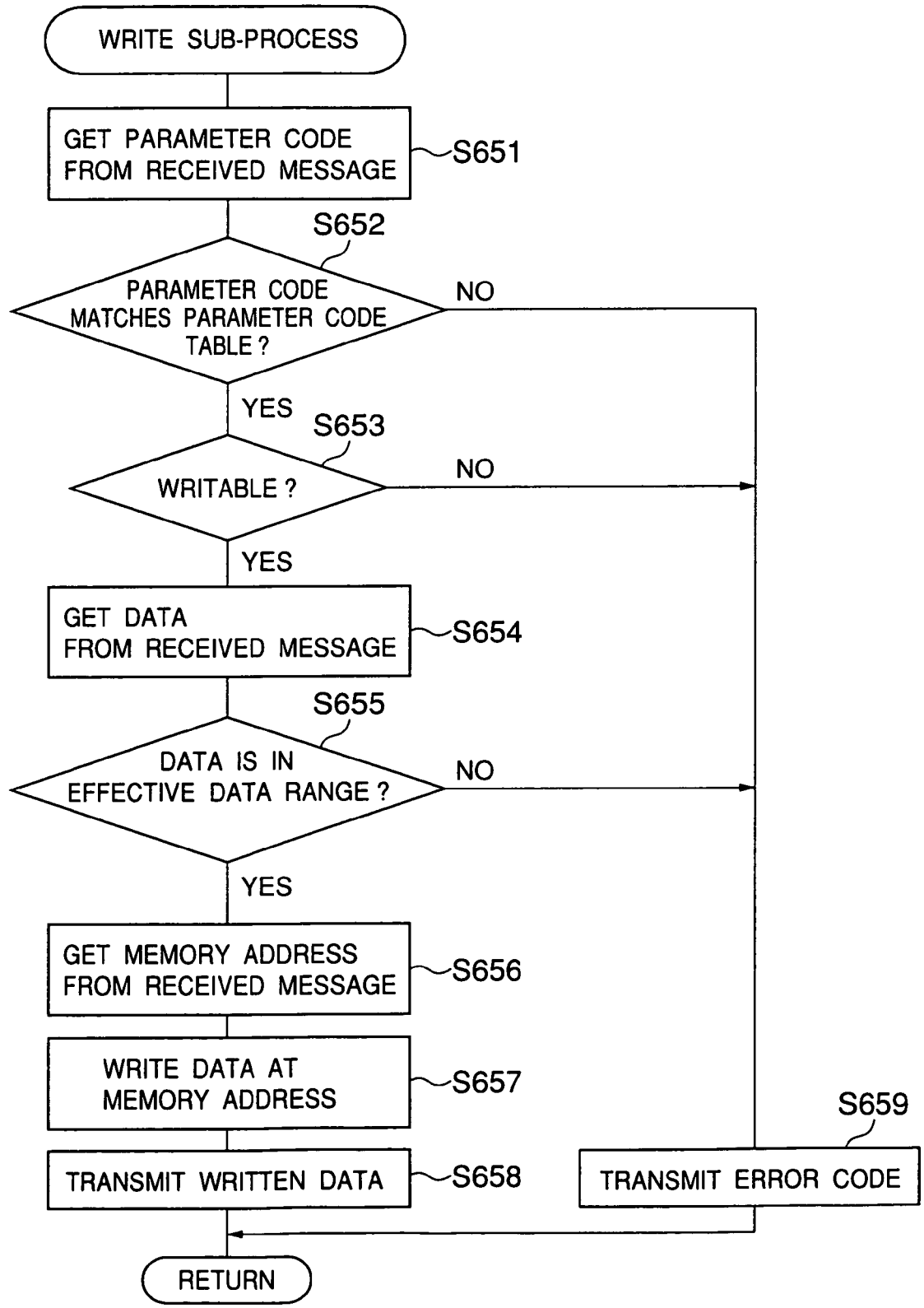
FIG. 65 is a flowchart for explaining a write sub-process in the main control process of FIG. 63.

FIG. 65 shows a write sub-process S637 in the main control process of FIG. 63. As shown in FIG. 65, the CPU 500 at step S651 gets a parameter code from the received write request. The CPU 500 makes reference to the parameter code table of the ROM 502 of the copier 400 by the parameter code. The CPU 500 at step S652 determines whether the received parameter code matches the parameter code table of the ROM 502. When the received parameter code matches the parameter code table, the CPU 500 at step S653 determines whether the received parameter code indicates a writable operating parameter by detecting a corresponding item of the parameter code in the parameter code table. When the received parameter code indicates a writable operating parameter, the CPU 500 at step S654 gets a writing data from the received write request. The CPU 500 at step S655 determines whether the writing data is in an effective data range. When the writing data is in the effective data range, the CPU 500 at step S656 determines a memory address from the parameter code of the received write request by detecting a corresponding item of the parameter code in the parameter code table. The CPU 500 at step S657 writes the writing data to the memory at the memory address. The CPU 500 at step S658 transmits the written data (or the operating parameter), which is written to the memory at the memory address, to the DCD 420. When the received parameter code does not indicate a writable operation parameter, the CPU 500 at step S659 transmits an error code to the DCD 420. When the writing data is not in the effective data range, the CPU 500 performs the step S659.

6. Sixth Embodiment

The present embodiment of the image forming device management system is characterized in that the CSS 460 can manage an accurate maintenance service start time of each of the image forming devices 400. In the present embodiment, the basic structure of the image forming device management system is essentially the same as that of the previous embodiment described in the above sections 4.1 through 4.6. A description will now be given of only features of the sixth embodiment of the image forming device management system which are different from those of the previous embodiment.

6.1 Control Panel

Figure 66:
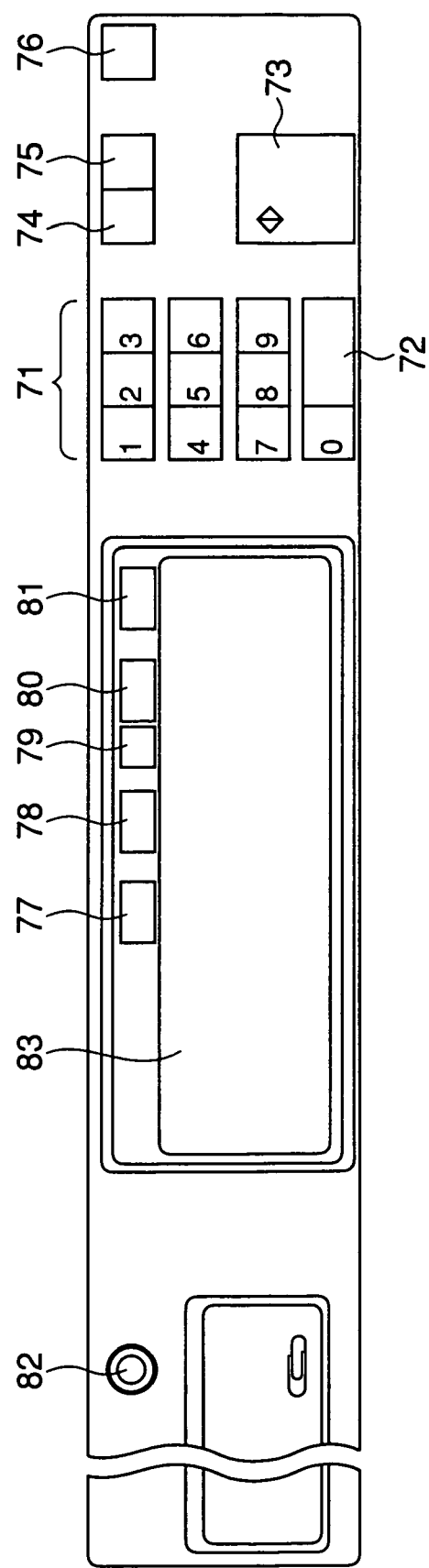
FIG. 66 is a schematic diagram of a control panel of the image forming device in the sixth embodiment.

FIG. 66 shows a control panel of the image forming device 400 in the present embodiment. As shown in FIG. 66, the control panel includes ten keys 71, a clear/stop key 72, a print key 73, an enter key 74, an interrupt key 75, a preheat/mode clear key 76, a mode check key 77, a screen change key 78, a call key 79, a registration key 80, a guidance key 81, a display contrast volume 82, and a character display part 83.

The character display part 83 is prepared by using full-dot liquid crystal display elements with a matrix touch-panel switch of a transparent sheet material attached thereto. In the matrix touch-panel switch, a number of touch sensors (provided for each of 8×8 picture elements) are internally provided. A key of the character display part 83 is turned ON or OFF by pressing or touching it. When a power switch of the copier 400 is turned ON, an image formation mode (copy mode) indication is displayed on the character display part 83. In addition, indication of an operating state of the image forming device 400, such as "copy possible", "during copying" or "no paper", is displayed on the character display part 83 of the image forming device 400.

Figure 67:
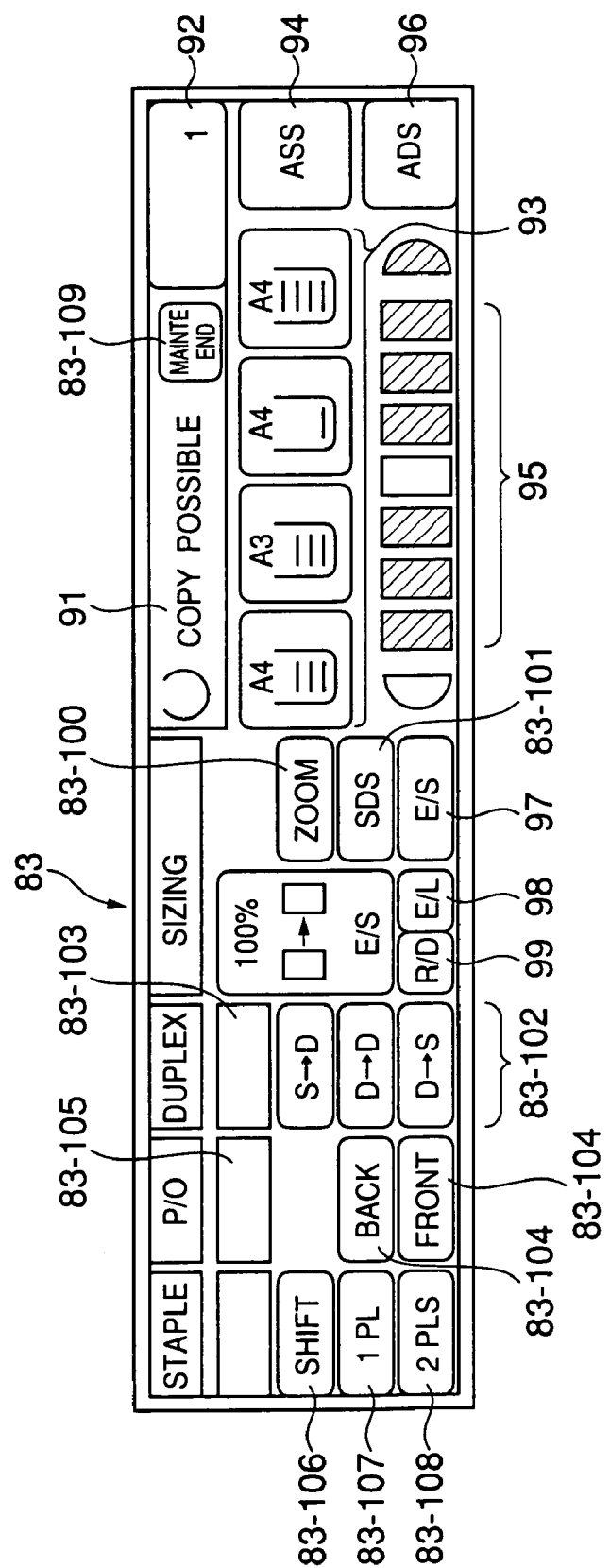
FIG. 67 is a schematic diagram of an image formation mode indication displayed on a character display part of the control panel of the image forming device of FIG. 66.

FIG. 67 shows an image formation mode indication (or a copy mode indication) displayed on a character display part 83 of the control panel of the image forming device of FIG. 66.

As shown in FIG. 67, the copy mode indication includes a message display area 91, a set display area 92, a tray selection key/copy size display area 93, an auto sheet selection (ASS) key 94, a density adjusting key 95, an auto density selection (ADS) key 96, an equal-size (E/S) key 97, an enlarge (E/L) key 98, and a reduce (R/D) key 99.

Further, in the copy mode indication of FIG. 67, a zoom key 83-100, a sheet-designated sizing (SDS) key 83-101, a set of duplex mode keys 83-102, a duplex mode message area 83-103, a pair of page-offset (P/O) keys 83-104, a page-offset mode message area 83-105, a shift function select key 83-106, a staple select key 83-107 (one place), a staple select key 83-108 (two places), and a maintenance end message key 83-109. When requesting a transmission of a maintenance end message to the CSS 460, the maintenance end message key 83-109 is pressed or turned ON by the user. The maintenance end message key 83-109 may be displayed only when needed, and it may be eliminated when unneeded. In addition, the maintenance end message key 83-109 may be displayed only when the copier 400 is shifted to a service program mode, which will be described below.

6.2 Service Program Mode Process

Each image forming device 400 in the present embodiment may be shifted to a service program mode, and during the service program mode a serviceman can perform a maintenance service of the image forming device 400, such as setting or adjustment of the operating parameters of the image forming device 400 or displaying of the statistical data of the image forming device 400, which cannot be performed in the image formation mode. For example, the image forming device 400 may be shifted into the service program mode when the serviceman manually inputs a secret number (not available to the user) to the CPU 500 by pressing the ten keys 71 and/or the enter key 74 in a predetermined sequence.

Figure 68:
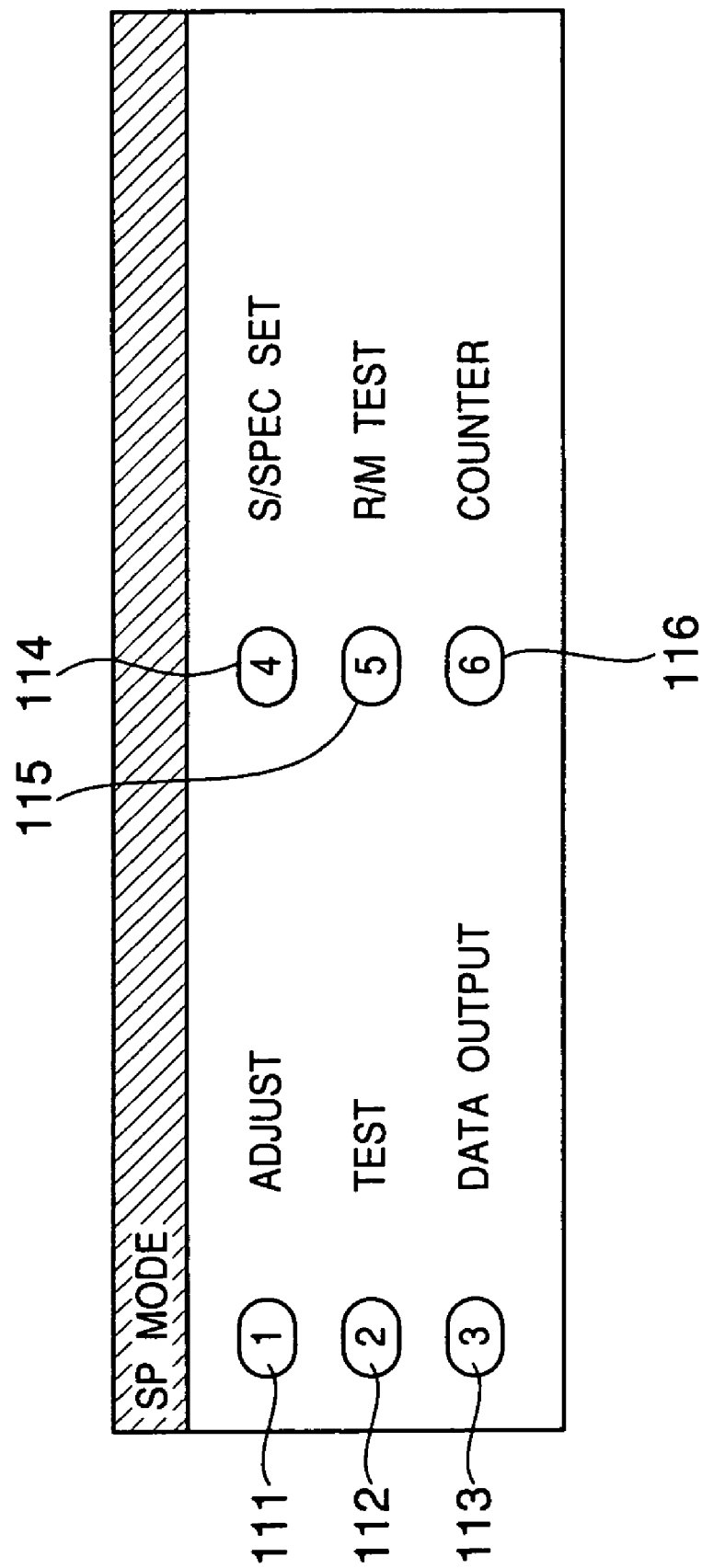
FIG. 68 is a schematic diagram of a service program mode indication displayed on the character display part of the control panel of the image forming device of FIG. 66.

FIG. 68 shows a service program (SP) mode indication displayed on the character display part 83 of the control panel of the image forming device of FIG. 66 during the service program mode.

As shown in FIG. 68, the service program (SP) mode indication on the character display part 83 includes an adjust mode shift key 111, a test mode shift key 112, a data output mode shift key 113, a special specification set mode shift key 114, a remote message test mode shift key 115, and a counter mode shift key 116.

Figure 74A:
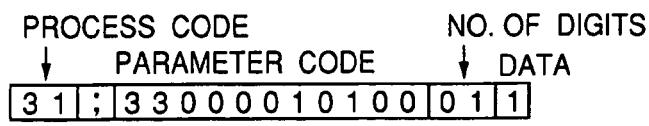
FIG. 74A and FIG. 74B are diagrams for explaining data formats of a maintenance service start message and a maintenance service end message transmitted to the CSS by the image forming device.

In the present embodiment, when the ten keys 71 and/or the enter key 74 of the control panel of the image forming device 400 are pressed or turned ON in a predetermined sequence by a serviceman, the image forming device 400 is shifted to the service program mode. When the image forming device 400 is shifted to the service program mode, the service program mode indication (including a maintenance end message key) is displayed on the character display part 83 as shown in FIG. 68. At the same time, the image forming device 400 automatically transmits a maintenance service start message through the DCD 420 to the CSS 460. The maintenance service start message notifies the CSS 460 of the start of a maintenance service of the image forming device 400 by the serviceman. FIG. 74A shows a data format of the maintenance service start message transmitted to the CSS 460 by the image forming device 400.

Figure 74B:
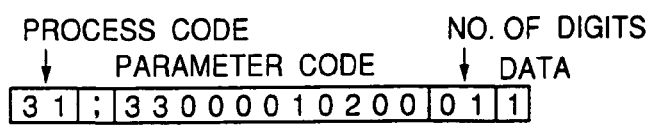

During the service program mode, the maintenance service of the image forming device 400 is performed by the serviceman. When the maintenance service is complete, the maintenance end message key of the service program mode indication on the character display part 83 by the serviceman. At this time, the image forming device 400 automatically transmits a maintenance service end message through the DCD 420 to the CSS 460. The maintenance service end message notifies the CSS 460 of the end of the maintenance service of the image forming device 400 by the serviceman. FIG. 74B shows a data format of the maintenance service end message transmitted to the CSS 460 by the image forming device 400.

According to the present embodiment, the CSS 460 can manage an accurate maintenance service start/end time of each of the image forming devices 400.

6.3 Service Program Mode Shift Check Process

Figure 69:
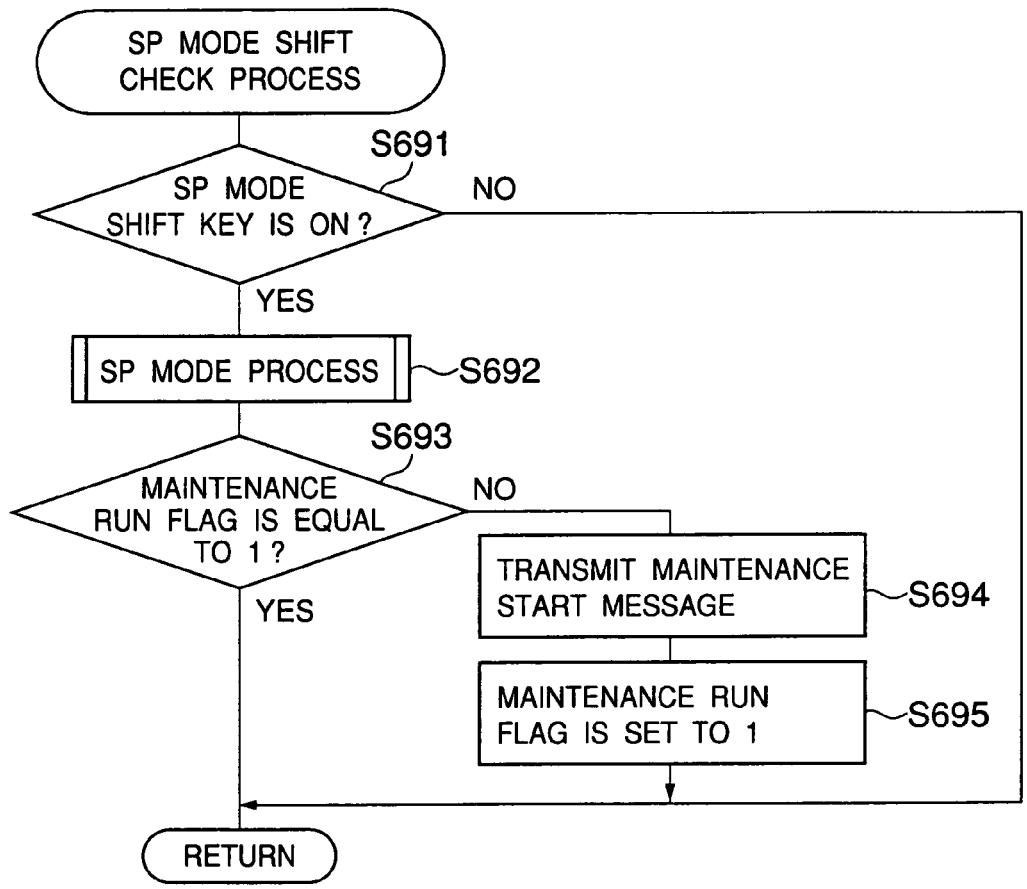
FIG. 69 is a flowchart for explaining a maintenance service start message process performed by the image forming device in the sixth embodiment when a mode shift request is output.

FIG. 69 shows a maintenance service start message process performed by the CPU 500 of the image forming device 400 in the present embodiment.

As shown in FIG. 69, the CPU 500 at step S691 determines whether a service program mode shift key is pressed or turned ON by the serviceman (or determines whether the ten keys 71 and/or the enter key 74 of the control panel of the image forming device 400 are pressed or turned ON in the predetermined sequence by the serviceman). When the result at the step S691 is affirmative, the CPU 500 at step S692 shifts the image forming device 400 to the service program mode. In the step S692, the CPU 500 displays the service program mode indication as shown in FIG. 68 on the character display part 83 of the control panel. In the present embodiment, the service program mode indication includes the maintenance end message key (not shown in FIG. 68).

After the step S692 is performed, the CPU 500 at step S693 determines whether a maintenance run flag is equal to "1". When the result at the step S693 is negative (or the maintenance run flag="0"), the CPU 500 at step S694 transmits a maintenance service start message through the DCD 420 to the CSS 460. The maintenance service start message notifies the CSS 460 of the start of the maintenance service of the image forming device 400. After the step S694 is performed, the CPU 500 at step S695 sets the maintenance run flag to "1". After the step S695 is performed, the CPU 500 ends the maintenance service start message process of FIG. 69.

When the result at the step S693 is affirmative (the maintenance run flag="1"), the CPU 500 ends the maintenance service start message process of FIG. 69. Hence, at this time, the CPU 500 inhibits the automatic transmission of the maintenance service start message to the CSS 460. In this case, the automatic transmission of the maintenance service start message is already performed but the service program mode shift key mentioned above is pressed or turned ON again by the serviceman. Also, the automatic transmission of a maintenance service end message is not yet performed by pressing the maintenance end message key. Hence, it is possible for the image forming device management system of the present embodiment to manage an accurate maintenance service start time of the image forming device 400.

6.4 Maintenance Service End Message Process

Figure 70:
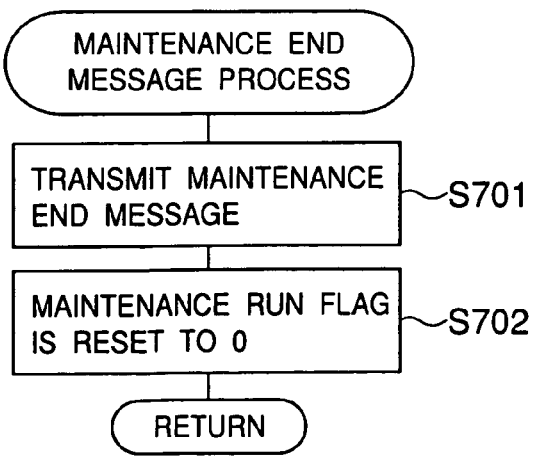
FIG. 70 is a flowchart for explaining a maintenance service end message process performed by the image forming device in the sixth embodiment.

FIG. 70 shows a maintenance service end message process performed by the CPU 500 of the image forming device 400 in the present embodiment. The maintenance service end message process of FIG. 70 is initiated when the maintenance end message key of the service program mode indication on the character display part 83 is pressed or turned ON by the serviceman.

As shown in FIG. 70, the CPU 500 at step S702 transmits a maintenance service end message through the DCD 420 to the CSS 460. After the step S701 is performed, the CPU 500 at step S702 rests the maintenance run flag to "0". The image forming device management system of the present embodiment can prevent the maintenance of a maintenance service end time from being degraded even when the serviceman fails to request the transmission of the maintenance service end message to the CSS 460. Hence, it is possible for the image forming device management system of the present embodiment to manage an accurate maintenance service end time of each of the image forming devices 400.

6.5 Maintenance Service Start Message Process

Figure 71:
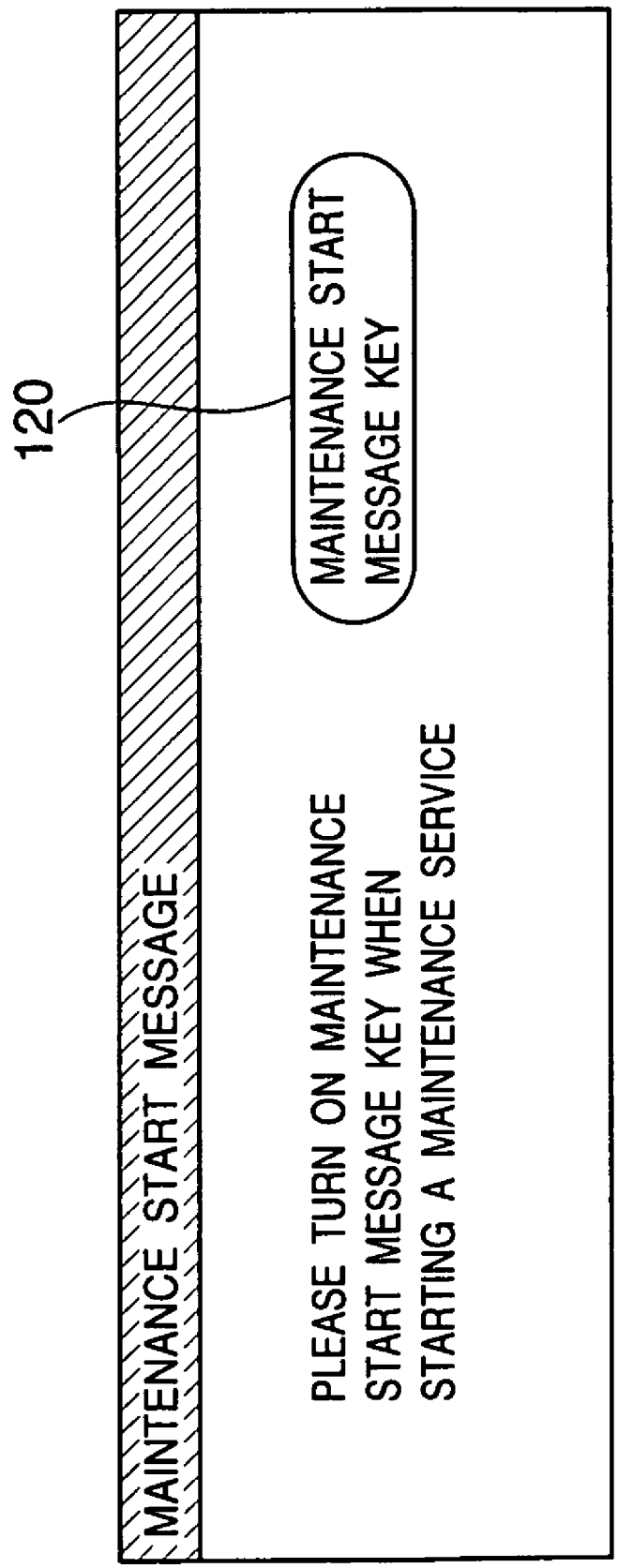
FIG. 71 is a schematic diagram of a maintenance service start message key displayed on the character display part of the control panel of the image forming device of FIG. 66.

FIG. 71 shows a maintenance service start message key displayed on the character display part 83 of the control panel of the image forming device 400.

In the present embodiment, when the ten keys 71 and/or the enter key 74 of the control panel of the image forming device 400 are pressed or turned ON in a predetermined sequence by a serviceman, the maintenance service start indication (including the maintenance start message key 120) is displayed on the character display part 83 as shown in FIG. 71. When the maintenance start message key 120 in the maintenance service start indication, displayed on the character display part 83, is pressed or turned ON by the serviceman, the image forming device 400 is shifted to the service program mode. When the image forming device 400 is shifted to the service program mode, the service program mode indication (including the maintenance end message key) is displayed on the character display part 83 as shown in FIG. 68. At the same time, the image forming device 400 automatically transmits a maintenance service start message through the DCD 420 to the CSS 460. For example, FIG. 74A shows a data format of the maintenance service start message transmitted to the CSS 460 by the image forming device 400 at this time. The maintenance service start message notifies the CSS 460 of the start of the maintenance service of the image forming device 400 by the serviceman. It is possible for the image forming device management system of the present embodiment to manage an accurate maintenance service start time of each of the image forming devices 400.

During the service program mode, the maintenance service of the image forming device 400 is performed by the serviceman. When the maintenance service is complete, the maintenance end message key of the service program mode indication on the character display part 83 is pressed or turned ON by the serviceman. At this time, the image forming device 400 automatically transmits a maintenance service end message through the DCD 420 to the CSS 460. The maintenance service end message notifies the CSS 460 of the end of the maintenance service of the image forming device 400 by the serviceman. For example, FIG. 74B shows a data format of the maintenance service end message transmitted to the CSS 460 by the image forming device 400 at this time.

According to the present embodiment, the CSS 460 can manage an accurate maintenance service start/end time of each of the image forming devices 400.

Figure 72:
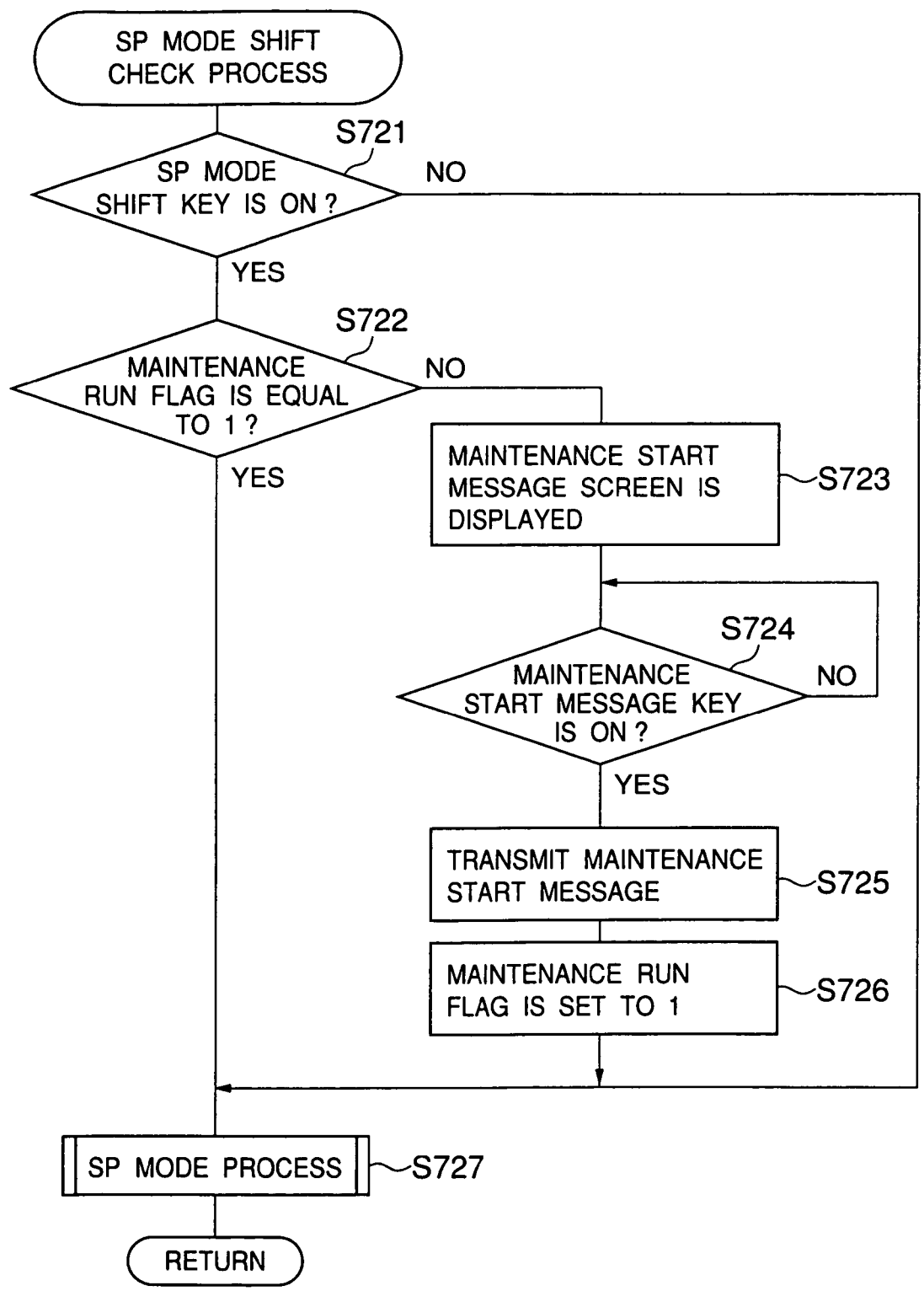
FIG. 72 is a flowchart for explaining a maintenance service start message process performed by the image forming device in the sixth embodiment when a mode shift request is output.

FIG. 72 shows a maintenance service start message process performed by the CPU 500 of the image forming device 400 in the present embodiment.

As shown in FIG. 72, the CPU 500 at step S721 determines whether the service program mode shift key is pressed or turned ON by the serviceman (or determines whether the ten keys 71 and/or the enter key 74 of the control panel of the image forming device 400 are pressed or turned ON in the predetermined sequence by the serviceman). When the result at the step S721 is affirmative, the CPU 500 at step S722 determines whether the maintenance run flag is equal to "1".

When the result at the step S722 is negative (or the maintenance run flag=0), the CPU 500 at step S723 displays the maintenance service start indication of FIG. 71 on the character display part 83. As described above, the maintenance service start indication includes the maintenance start message key 120. After the step S723 is performed, the CPU 500 at step S724 determines whether the maintenance start message key 120 is pressed or turned ON by the serviceman. When the maintenance start message key 120 is turned ON, the CPU 500 at step S725 transmits the maintenance service start message through the DCD 420 to the CSS 460. After the step S725 is performed, the CPU 500 at step S726 sets the maintenance run flag to "1". After the step S726 is performed, the CPU 500 performs step S727 which will be described below.

When the result at the step S721 is negative (or the service program mode shift key is not turned ON), the CPU 500 performs step S727 which will be described below, and does not perform the steps S723–S726.

When the result at the step S722 is affirmative (or the maintenance run flag="1"), the CPU 500 at step S727 shifts the image forming device 400 into the service program mode. In the step S727, the CPU 500 displays the service program mode indication of FIG. 68 on the character display part 83 of the control panel. In the present embodiment, the service program mode indication includes the maintenance end message key (not shown in FIG. 68). After the step S727 is performed, the CPU 500 ends the maintenance service start message process of FIG. 72. Hence, the CPU 500 inhibits the automatic transmission of the maintenance service start message to the CSS 460 when the maintenance run flag is equal to "1". In this case, the automatic transmission of the maintenance service start message is already performed but the service program mode shift key mentioned above is pressed or turned ON again by the serviceman. Also, the automatic transmission of a maintenance service end message is not yet performed by pressing the maintenance end message key. Accordingly, it is possible for the image forming device management system of the present embodiment to manage an accurate maintenance service start time of each of the image forming devices 400.

6.6 Maintenance Service End Key Check Process

As described above, during the service program mode, the maintenance service of the image forming device 400 is performed by the serviceman. When the maintenance service is complete, the maintenance end message key of the service program mode indication on the character display part 83 is pressed or turned ON by the serviceman. At this time, the image forming device 400 automatically transmits a maintenance service end message through the DCD 420 to the CSS 460. The maintenance service end message notifies the CSS 460 of the end of the maintenance service of the image forming device 400 by the serviceman.

In the present embodiment, only when the maintenance run flag is set to "1", the maintenance end message key of the service program mode indication is displayed on the character display part 83.

Figure 73:
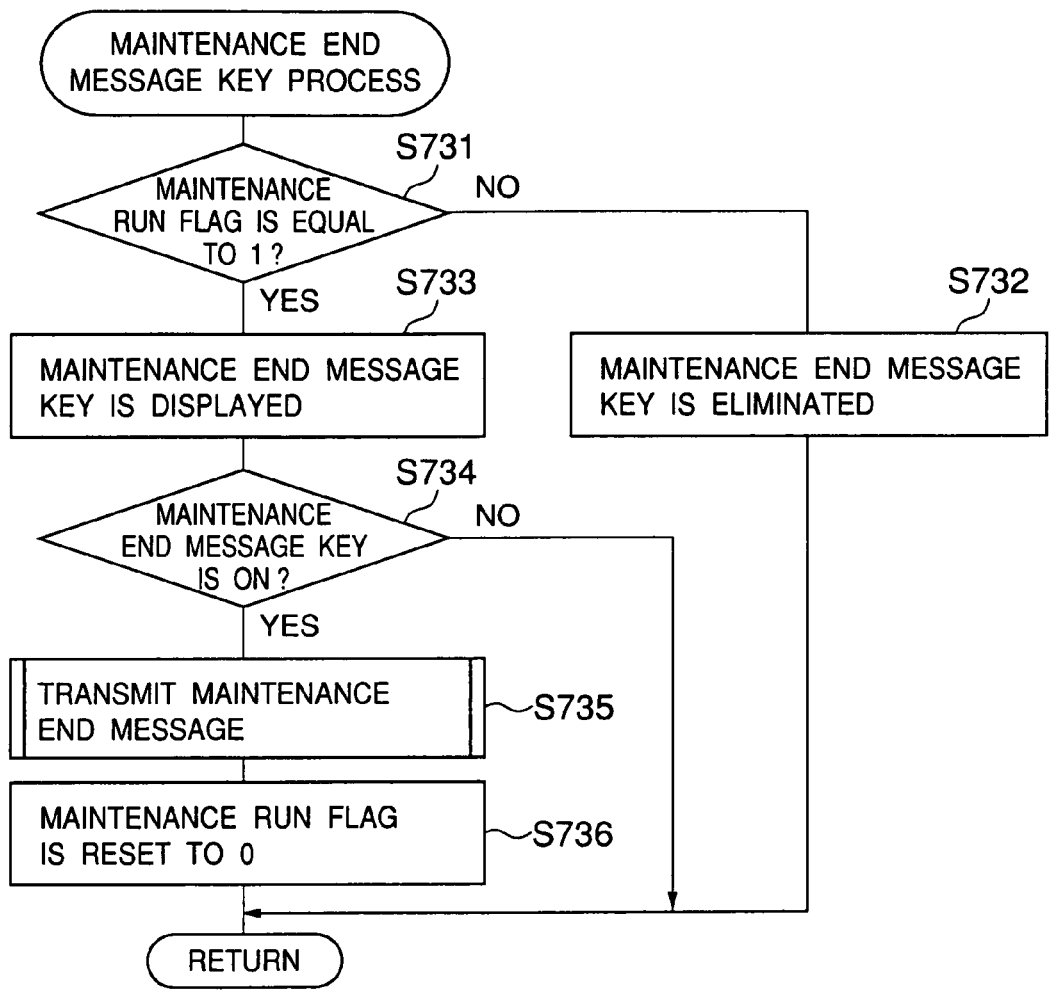
FIG. 73 is a flowchart for explaining a maintenance service end message process performed by the image forming device in the sixth embodiment.

FIG. 73 shows a maintenance service end message process performed by the CPU 500 of the image forming device 400 in the present embodiment.

As shown in FIG. 73, the CPU 500 at step S731 determines whether the maintenance run flag is equal to "1". When the result at the step S731 is negative (or the maintenance run flag=0), the CPU 500 at step S732 eliminates the maintenance end message key from the character display part 83, regardless of the current condition of the service program mode indication displayed on the character display part 83. After the step S732 is performed, the CPU 500 ends the maintenance service end message process of FIG. 73. Hence, when the maintenance run flag is equal to "0", the automatic transmission of the maintenance service end message is inhibited.

When the result at the step S731 is affirmative (or the maintenance run flag=1), the CPU 500 at step S733 displays the maintenance end message key on the character display part 83, regardless of the current condition of the service program mode indication displayed on the character display part 83. After the step S733 is performed, the CPU 500 at step S734 determines whether the maintenance end message key is pressed or turned ON by the serviceman.

When the result at the step S734 is negative, the CPU 500 ends the maintenance service end message process of FIG. 73. On the other hand, when the result at the step S734 is affirmative, the CPU 500 at step S735 transmits the maintenance service end message through the DCD 420 to the CSS 460. After the step S735 is performed, the CPU at step S736 resets the maintenance run flag to "0". After the step S736 is performed, the CPU 500 ends the maintenance service end message process of FIG. 73. Hence, it is possible for the image forming device management system of the present embodiment to manage an accurate maintenance service end time of each of the image forming devices 400.

Further, the present invention is not limited to the above-described embodiments, and variations and modifications may be made without departing from the scope of the present invention.

What is claimed is:

1. An image forming device management system, comprising:
    a plurality of image forming devices;
    a central service station for providing a maintenance service for the image forming devices; and
    a communication control unit connected to each of the image forming devices by a signal line, the communication control unit connecting one of the image forming devices to the central service station by a communication network,
    each of the image forming devices being configured to detect a signal line separation from at least one of the central service station and the communication control unit over a predetermined period, the detection being periodically performed by each of the image forming devices, and to display a signal line separation message when the image forming device detects the signal line separation from at least one of the central service station and the communication control unit over the predetermined period,
    wherein each image forming device is one of a printer, a copier, and a facsimile machine.

2. The system according to claim 1, wherein each of the image forming devices is configured to detect the signal line separation from the communication control unit over the predetermined period based on a response of the image forming device to a selecting of the communication control unit to the image forming device.

3. The system according to claim 1, wherein each of the image forming devices is configured to detect the signal line separation from the central service station over the predetermined period based on a response of the image forming device to a selecting of the central service station to the image forming device.

4. The system according to claim 1, wherein each of the image forming devices is configured to detect the signal line separation from the communication control unit over the predetermined period based on a response of the image forming device to a polling of the communication control unit to the image forming device.

5. The system according to claim 1, wherein each of the image forming devices includes a communication interface unit having a terminal connected to the communication control unit, and each of the image forming devices is configured to detect the signal line separation from the communication control unit over the predetermined period based on a detected voltage of the terminal of the communication interface unit.

6. The system according to claim 1, wherein each of the image forming devices includes a connection detecting circuit having an input connected to the communication control unit, and each of the image forming devices is configured to detect the signal line separation from the communication control unit over the predetermined period based on an output of the connection detecting circuit.

7. The system of claim 1, wherein each of the image forming devices is configured to detect directly the signal line separation, without receiving a report from a second device that indicates that the signal line separation was detected by the second device.

8. An image forming device management system, comprising:
    a plurality of image forming devices;
    a central service station for providing a maintenance service for the image forming devices; and a communication control unit connected to each of the image forming devices by a signal line, the communication control unit connecting one of the image forming devices to the central service station by a communication network, each of the image forming devices being configured to detect a signal line separation of the communication control unit over a predetermined period, the detection being periodically performed by each of the image forming devices, and to display a signal line separation message when the image forming device detects the signal line separation from the communication control unit over the predetermined period, and wherein said display of the signal line separation message indicates a signal line separation along the signal line between the image forming device and the communication control unit, wherein each image forming device is one of a printer, a copier, and a facsimile machine.

9. An image forming device management system, comprising:

a plurality of means for image forming;

maintenance service means provided for the plurality of means for image forming; and means for communicating and controlling, connected to each of the means for image forming by a signal line, the means for communicating and controlling connecting one of the means for image forming to the maintenance service means by a communication network, each of the means for image forming being configured to detect a signal line separation from at least one of the maintenance service means and the means for communicating and controlling over a predetermined period, the detection being periodically performed by each of the means for image forming, and to display a signal line separation message when the means for image forming detects the signal line separation from at least one of the maintenance service means and the means for communicating and controlling over the predetermined period, wherein each of the means for image forming is one of a printer, a copier, and a facsimile machine.

10. The system according to claim 9, wherein each of the means for image forming is configured to detect the signal line separation from the means for communicating and controlling over the predetermined period based on a response of the means for image forming to a selecting of the means for communicating and controlling to the means for image forming.

11. The system according to claim 9, wherein each of the means for image forming is configured to detect the signal line separation from the maintenance service means over the predetermined period based on a response of the means for image forming to a selecting of the maintenance service means to the means for image forming.

12. The system according to claim 9, wherein each of the means for image forming is configured to detect the signal line separation from the means for communicating and controlling over the predetermined period based on a response of the means for image forming to a polling of the means for communicating and controlling to the means for image forming.

13. The system according to claim 9, wherein each of the means for image forming includes a communication interface unit having a terminal connected to the means for communicating and controlling, and each of the means for image forming is configured to detect the signal line separation from the means for communicating and controlling over the predetermined period based on a detected voltage of the terminal of the communication interface unit.

14. The system according to claim 9, wherein each of the means of image forming includes a connection detecting circuit having an input connected to the means for communicating and controlling, and each of the means for image forming is configured to detect the signal line separation from the means for communicating and controlling over the predetermined period based on an output of the connection detecting circuit.

15. A means for image forming management, comprising:

a plurality of means for image forming;

maintenance service means provided for the means for image forming; and means for communicating and controlling connected to each of the means for image forming by a signal line, the means for communicating and controlling connecting one of the means for image forming to the maintenance service means by a communication network, each of the means for image forming being configured to detect a signal line separation from the means for communicating and controlling over a predetermined period, the detection being periodically performed by each of the means for image forming, and to display a signal line separation message when the means for image forming detects the signal line separation from the means for communicating and controlling over the predetermined period, wherein each of the means for image forming is one of a printer, a copier, and a facsimile machine.

* * * * *